(12) United States Patent
Giarmana

(10) Patent No.: US 8,748,833 B2
(45) Date of Patent: Jun. 10, 2014

(54) RADIATION DETECTOR SYSTEM AND METHOD

(71) Applicant: Canberra France SAS, Loches (FR)

(72) Inventor: Olivier Gaëtan Giarmana, Blere (FR)

(73) Assignee: Canberra France SAS, Loches (FR)

( * ) Notice: Subject to any disclaimer, the term of this patent is extended or adjusted under 35 U.S.C. 154(b) by 0 days.

(21) Appl. No.: 13/892,621

(22) Filed: May 13, 2013

(65) Prior Publication Data
US 2014/0131583 A1 May 15, 2014

Related U.S. Application Data

(63) Continuation-in-part of application No. 13/453,024, filed on Apr. 23, 2012.

(30) Foreign Application Priority Data

Apr. 20, 2012 (EP) ..................................... 12165034
May 11, 2012 (FR) ..................................... 12 54351

(51) Int. Cl.
| | |
|---|---|
| *G01T 1/00* | (2006.01) |
| *G01T 3/00* | (2006.01) |
| *G01T 1/02* | (2006.01) |
| *G01T 3/06* | (2006.01) |
| *G01T 3/08* | (2006.01) |

(52) U.S. Cl.
CPC . *G01T 1/00* (2013.01); *G01T 1/023* (2013.01); *G01T 1/026* (2013.01); *G01T 3/06* (2013.01); *G01T 3/08* (2013.01)
USPC ............ 250/370.01; 250/370.11; 250/390.01; 250/390.11; 250/394; 250/395

(58) Field of Classification Search
CPC ........... G01T 1/02; G01T 1/023; G01T 1/026; G01T 1/10; G01T 3/00; G01T 3/06; G01T 3/08
USPC ............ 250/370.01, 370.05, 370.07, 370.08, 250/370.11, 390.01, 390.03, 390.11, 394, 250/395
See application file for complete search history.

(56) References Cited

U.S. PATENT DOCUMENTS

| | | | |
|---|---|---|---|
| 5,081,362 | A | 1/1992 | Vargo |
| 5,578,830 | A | 11/1996 | Olsher et al. |
| 6,740,260 | B2 | 5/2004 | McCord |
| 7,728,507 | B2 | 6/2010 | Winter et al. |
| 2001/0052572 | A1 | 12/2001 | Mikami et al. |
| 2004/0022358 | A1 | 2/2004 | Tomita |

FOREIGN PATENT DOCUMENTS

JP 58211682 9/1963

OTHER PUBLICATIONS

Oshler, et al.; "A New Neutron Dose Equivalent Meter"; Nuclear Science Symposium and Medical Imaging Conference; 1993 IEEE Conference Record; San Francisco, CA; Oct. 31-Nov. 6, 1993; New York, Ny, USA; 6 pp.

*Primary Examiner* — Mark R Gaworecki
(74) *Attorney, Agent, or Firm* — Davis W. Carstens; Kevin M. Klughart; Carstens & Cahoon, LLP

(57) ABSTRACT

A radiation detector dosimeter system/method implementing a corrected energy response detector is disclosed. The system incorporates charged (typically tungsten impregnated) injection molded plastic that may be formed into arbitrary detector configurations to affect radiation detection and dose rate functionality at a drastically reduced cost compared to the prior art, while simultaneously permitting the radiation detectors to compensate for radiation intensity and provide accurate radiation dose rate measurements. Various preferred system embodiments include configurations in which the energy response of the detector is nominally isotropic, allowing the detector to be utilized within a wide range of application orientations. The method incorporates utilization of a radiation detector so configured to compensate for radiation counts and generate accurate radiation dosing rate measurements.

40 Claims, 61 Drawing Sheets

GraviTech GRV-TP-080-W Characteristics
(TPE-S, Tungsten, Pellets)

| Mechanical properties | Test conditions | DIN EN ISO | Value |
|---|---|---|---|
| Shore A Hardness | | 53 505 | 85 Shore A |
| Tensile Strength | 23°C; 5 mm/min | 53 504 | 3 MPa |
| Elongation at break | 23°C; 5 mm/min | 53 504 | 200 % |
| Compression Set | RT / 72 h | DIN ISO 815 | 20% |
| Shielding properties | | | |
| Attenuation Coefficient | 511 keV | | 0.83 cm$^{-1}$ |
| Half Thickness | 511 keV | | 0.84 cm |
| Other properties | | | |
| Density | 23°C | 53479 | 8.0 g/cm$^3$ |
| Melt Volume Rate | 230°C / 5.0 Kg | 1133 | --- |
| Surface resistivity | | IEC 93 | 1E7 – 1E8 Ohm |
| Shrinkage | | | 0.5 - 1.5 % |

FIG. 44
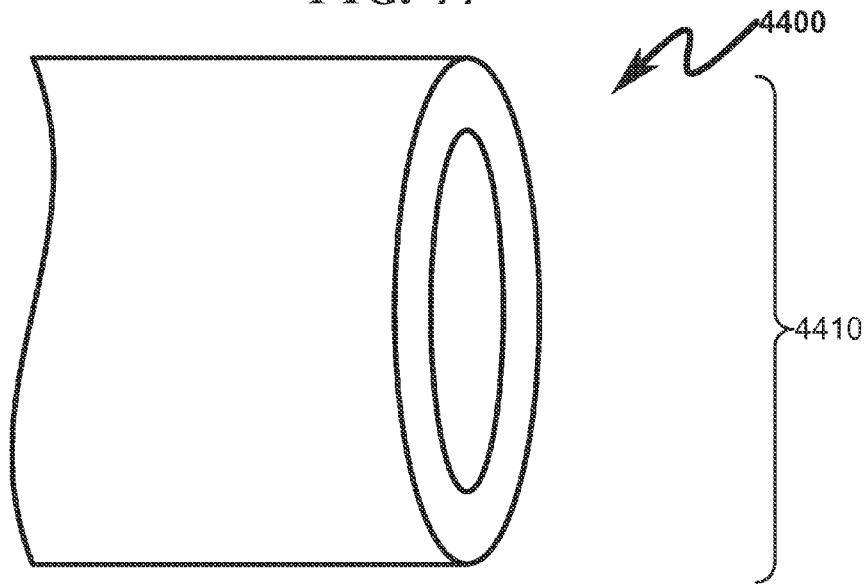
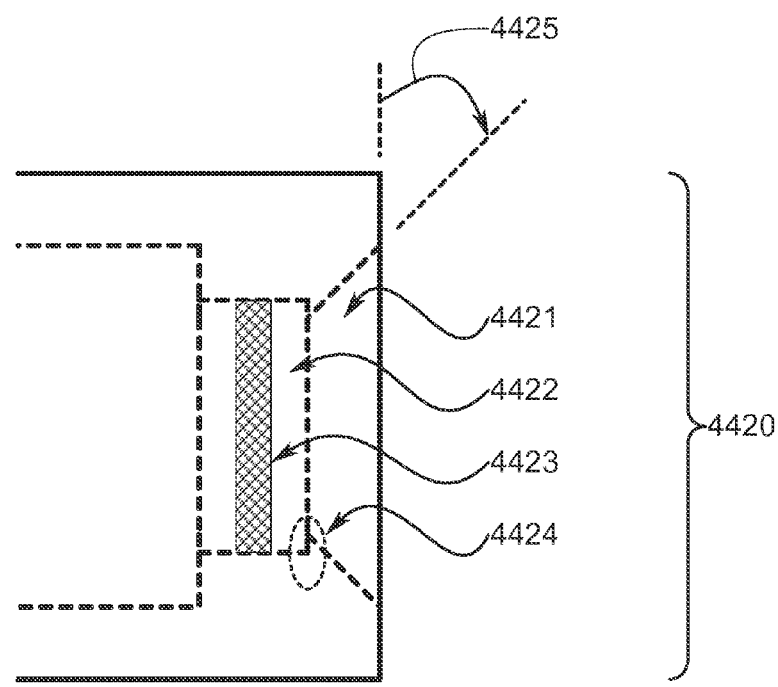

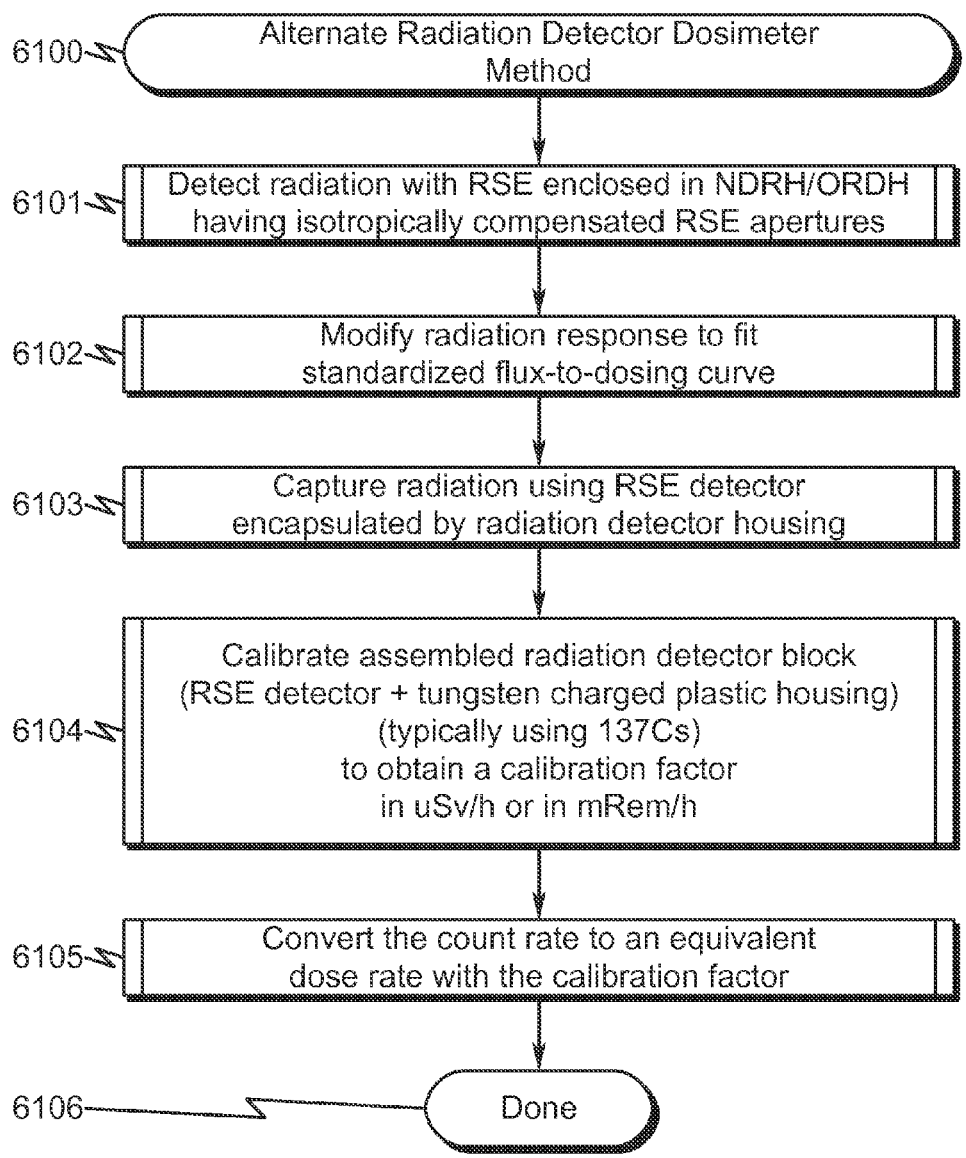

RADIATION DETECTOR SYSTEM AND METHOD

CROSS REFERENCE TO RELATED APPLICATIONS

Continuation Patent Applications

This application claims benefit under 35 U.S.C. §120 and is a Continuation-in-Part Patent Application and hereby incorporates by reference United States Patent Application for RADIATION DETECTOR SYSTEM AND METHOD, by inventor Olivier Gaëtan Giarmana, U.S. Patent Application No. 13/453,024, filed Apr. 23, 2012.

Foreign Patent Applications

This application claims benefit under 35 U.S.C. §119 and hereby incorporates by reference French Patent Application for RADIATION DETECTOR SYSTEM AND METHOD by inventor Olivier Gaëtan Giarmana, French Patent Application No. 1254351, filed May 11, 2012.

U.S. patent application Ser. No. 13/453,024, filed Apr. 23, 2012 claims benefit under 35 U.S.C. §119 and hereby incorporates by reference European Patent Application for RADIATION DETECTOR SYSTEM AND METHOD, by inventor Olivier Gaëtan Giarmana, European Patent Application No. 12165034.5, filed Apr. 20, 2012.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems, methods, and usage of highly flowable compounds/materials containing suspended tungsten or other high-density material to enable molding of any shape or form of devices/filters to provide flat isotropic energy response to detectors and more specifically to all fields of radiation detection. More particularly, but not by way of limitation, the present invention generally teaches the use of these devices/filters in situations where radiation detection must be accompanied by compensation to allow dose rate measurements to be accurately performed. While not limitive of the invention teachings, the present invention may in some circumstances be advantageously applied to categories including U.S. Patent Classifications 250/370.07 and 250/390.03 which correspond to International Patent Classifications G01T 1/02 and G01T 1/02/G01T 3/00 respectively.

The present invention proposes a radiation detector incorporating an integrated plastic injection molded radiation detection methodology that provides a compact and sensitive radiation detector for a variety of system applications. Specifically, the present invention permits correction of the energy response and/or the isotropy of a detector of radioactivity within a detector housing that incorporates tungsten charged injection molded plastic. This radiation detector allows the spread the range of energy of the detector device as well as its measuring range.

PRIOR ART AND BACKGROUND OF THE INVENTION

Applicable Standards

Applicable standards associated with dose rate measurements for radiation include ANSI 42.17A, IEC 60846, ANSI 40.32, and ANSI 40.33, which force the acceptable error on the measured dose rate based on:

the energy range; and
the measure range.

An ideal equivalent dose rate detector would be a detector which would have an identical sensitivity on all energy ranges. A calibration coefficient typically converts the measured conversion counting rate to an equivalent dose rate. For many applications the geometry of the detector is imposed by constraints other than the nuclear measurement (geometry of an existing device, manufacturing processes, interface with the other components). This generally results in non-isotropic and energy dependent behaviour of the dose rate detector. This behaviour is generally true irrespective of the type of specific radiation detector used (scintillator CsI (Tl), etc.).

Prior Art System Overview

Within the prior art of radiation detectors as applied to radiation dosing monitors, conventional prior art systems typically utilize energy compensation materials to tailor the energy detection profile of a given radiation detector used in this context. For example typical systems incorporate energy compensation materials with a high atomic number and high density. Typically materials in this context have the following drawbacks:

The materials are hard to machine (tungsten alloys, pure tungsten, etc.);
The materials are dangerous (lead, etc.);
The materials are not moldable into complex shapes without large investments in manufacturing infrastructure; and
The materials must be combined in many parts to achieve useful radiation detector configurations.

Within this context, there is an unmet need in the prior art to provide a methodology to create complex mechanical structures that permit energy compensation to occur within the housing of a radiation detector. This energy compensation is needed in situations where radiation dosage measurements are required to be taken in a variety of detector orientations. While the prior art does teach that in some circumstances these radiation detectors can be fabricated using the materials listed above, the resulting detectors are very expensive to manufacture and in some circumstances the mechanical structure of the detector is impossible to mass manufacture given the material properties presented above.

OBJECTIVES OF THE INVENTION

Accordingly, the objectives of the present invention are (among others) to circumvent the deficiencies in the prior art and affect the following objectives:
(1) Provide for a radiation detector system and method that permits more uniform detector isotropy to be achieved as compared to the prior art.
(2) Provide for a radiation detector system and method that permits a corrected energy response to be achieved as compared to the prior art.
(3) Provide for a radiation detector system and method that permits simple and fast assembly of the detector system as compared to the prior art.
(4) Provide for a radiation detector system and method that permits cost reduction of the detector system as compared to the prior art.
(5) Provide for a radiation detector system and method that permits detector sensitivity to be maintained with incorporated energy compensation as compared to the prior art.
(6) Provide for a radiation detector system and method that permits a non-toxic detector system to be constructed as contrasted to the prior art.
(7) Provide for a radiation detector system and method that permits injection molded plastic to be utilized to affect energy compensation.
(8) Provide for a radiation detector system and method that permits tungsten to be used within molded plastic to affect an easily machined energy compensation material.
(9) Provide for a radiation detector system and method that reduces the cost of radiation dosimeters.
(10) Provide for a radiation detector system and method that decreases the number of parts associated with radiation dosimeters.
(11) Provide for a radiation detector system and method that permits more complex radiation dosimeter geometries to be constructed that may be adapted to the needs of energy compensation and angular compensation.
(12) Provide for a radiation detector system and method that permits dose rate compensation to be adjusted by the tungsten doping within an injection molding process.
(13) Provide for a radiation detector system and method that permits radiation dosimeters to be constructed that are less rigid than currently available in the prior art.
(14) Provide for a radiation detector system and method that permits radiation dosimeters that are easily mounted.
(15) Provide for a radiation detector system and method that are more insensitive to vibration than that possible with the rigid designs of the prior art.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Overview

The present invention in various embodiments addresses one or more of the above objectives in the following manner.

First, the invention incorporates injection molded plastic that is tungsten charged to act as a methodology to provide corrected energy responses from a wide variety of radiation sources. Second, the formation of the detector housing this injection molding technique with appropriate positioning of radiation sensitive elements (RSEs) provides for isotropic response characteristics of the overall radiation detector as compared to that possible with the prior art. Finally, utilization of tungsten charged injection molded plastic permits easy machining of the resulting detector housing as well as generation of "snap-together" structures that can be assembled using multi-piece (two-piece, three-piece, four-piece, etc.) symmetric/anti-symmetric structures that can be fabricated using a single-piece injection mold. The combination of all these features permits a significant reduction in overall radiation detector cost as well as improved sensitivity to a broad spectrum of radiation consistent with the accurate measurement of radiation dosing. The present invention system may incorporate any selected combination of the above characteristics to achieve the overall design goals consistent with the objectives detailed above.

Method Overview

The present invention system may be utilized in the context of an overall radiation detection method, wherein the radiation detector system described previously incorporating the radiation sensitive elements (RSEs) is processed using analog circuitry to interpret the output of the RSEs. The output of this analog is fed into a shaping amplifier that produces a modified voltage in response to the detected radiation. This modified voltage is then interpreted by a counter to generate a radiation count. The radiation count can then be analyzed using a variety of prior art computer-based display and/or analysis techniques.

Integration of this and other preferred exemplary embodiment methods in conjunction with a variety of preferred exemplary embodiment systems described herein is anticipated by the overall scope of the present invention.

BRIEF DESCRIPTION OF THE DRAWINGS

For a fuller understanding of the advantages provided by the invention, reference should be made to the following detailed description together with the accompanying drawings wherein:

FIG. 41 illustrates typical physical characteristics of an exemplary tungsten charged plastic material useful as a construction material for some preferred embodiments of the present invention;

FIG. 44 illustrates a cross section view of a preferred exemplary embodiment of the present invention depicting the aperture port angle;

FIG. 61 illustrates a preferred exemplary method embodiment of the present invention as applied to a portable radiation dosimeter context incorporating a NRDH/ORDH RSE housing.

DESCRIPTION OF THE PRESENTLY PREFERRED EXEMPLARY EMBODIMENTS

Figure 1:
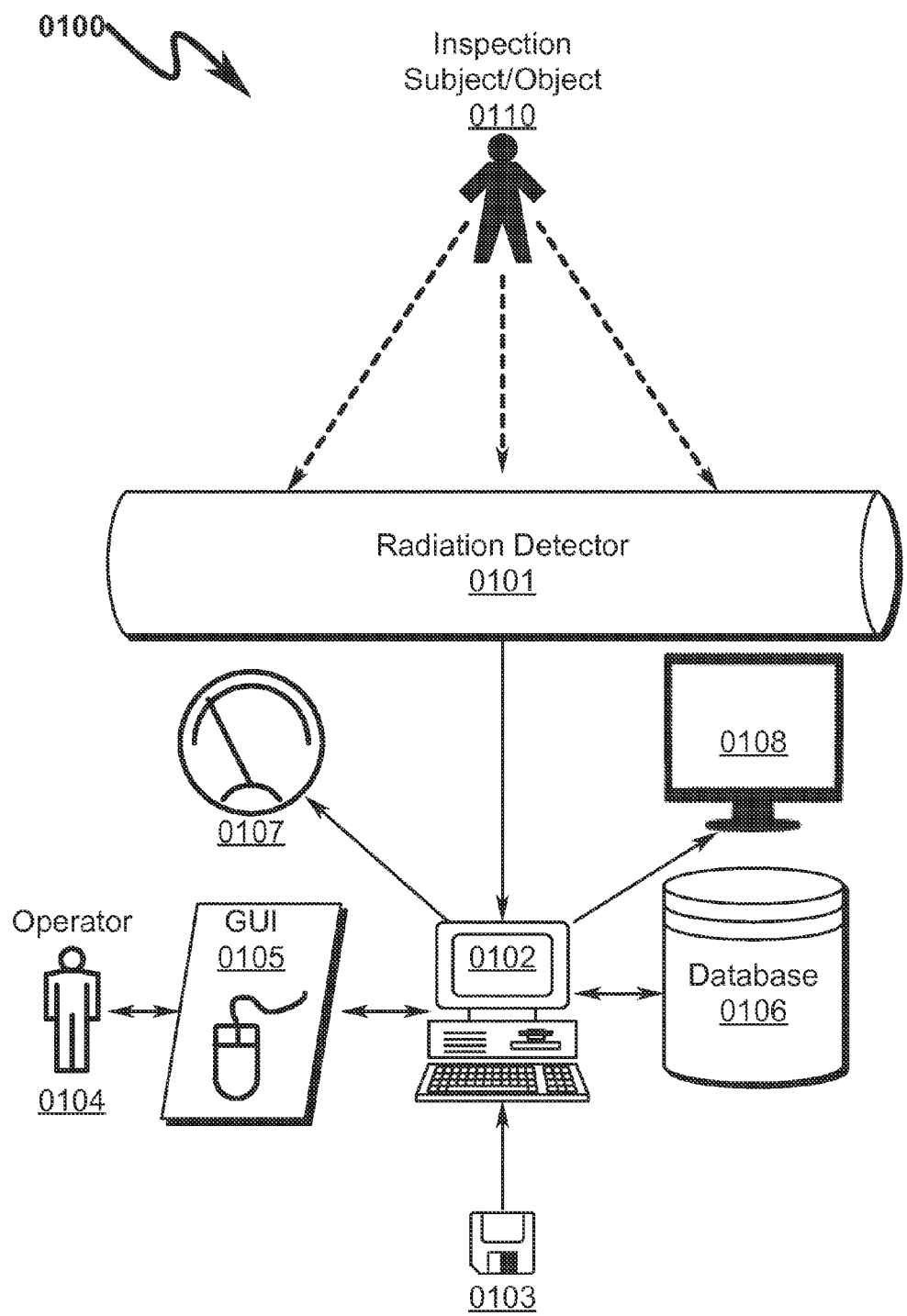
FIG. 1 illustrates a system diagram describing a presently preferred system context for the present invention.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a RADIATION DETECTOR SYSTEM AND METHOD.

However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Plastic Not Limitive

The present invention anticipates a wide variety of plastic materials may be used in the construction of the radiation detector described herein. Within this context, many preferred system embodiments will utilize injection molded thermoplastic elastomers (TPE) or other plastics comprising tungsten particles or other high Z (atomic number) particles (typically obtained from Row 6 and/or Row 7 of the Periodic Table) that have been uniformly distributed within the molten plastic prior to forming the body of the radiation detector.

Tungsten Charged Plastic Not Limitive

The present invention anticipates a wide variety of methods may be used to tungsten charge the injection molded plastic used to fabricate some preferred embodiments of the present invention. The tungsten injected plastic commonly used in many preferred system embodiment applications is more than 85% tungsten and has an optimally large specific gravity (density) value. Generally speaking, the system performance increases with the density of the injection molded plastic. While tungsten is thought to be optimal in this application, the present invention is not limited to the use of tungsten, and other metals, heavy metals, transition metals, and post-transition metals selected from elements within Row 6 or Row 7 of the Periodic Table may also be used in this application.

Thus, the use of "tungsten" is not limitive of the present invention scope. One skilled in the art will recognize that the absolute density value of the plastic and percentage of tungsten (or other element in Row 6 or Row 7 of the Periodic Table) injection will be highly application specific and as such the present invention is not limited to the specific values provided above. Therefore, the term "charged plastic" will be used herein to be broadly construed to incorporate elements or combinations thereof selected from Row 6 or Row 7 of the Periodic Table combined within an injection molded plastic material. While many preferred embodiments of the present invention may utilize tungsten, uranium, or lead as the "charging" element for the injection molded plastic, the present invention is not limited to these preferred elements (or combinations thereof) in construction. One skilled in the art will also recognize that in the plastic injection arts there will be a wide variety of ways in which the plastic may be injected to form the detector housings as detailed herein.

Detector Application Not Limitive

The present invention may be utilized as a radiation detector in a wide variety of contexts which may include radiation monitoring and/or scanning applications. Thus, the term "detector" or "detection" should be given its broadest possible meaning to include, among other things, radiation monitoring and/or radiation scanning.

Detector Not Limitive

While the present invention may be applied using a wide variety of radiation sensitive elements (RSEs) that are responsive to radiation detection, the following exemplary list of RSEs are specifically anticipated to be applicable to configurations taught by the present invention:

Organic scintillators;
Inorganic scintillators (CsI, NaI, LaBr, BGO, etc.);
Gas detectors (Geiger-Müller counters, ionization chamber, proportional counters, etc. . . . ); and
Semiconductors (CdTe, CZT, Ge, etc. . . . ).

One skilled in the art will recognize that this list is not exhaustive and that other RSEs may be utilized within the teachings of the present invention.

Aperture Port Angle Not Limitive

The aperture port angles associated with the RSEs detailed herein are optimally configured for 45-degrees in many preferred embodiments. However, the present invention makes no limitation in the aperture port angle for any invention embodiment, although aperture port angles of between approximately 15° and approximately 90° are preferred in many exemplary invention embodiments, depending on the energy compensation characteristic desired in the overall radiation detection system.

Rectangular Frusta Not Limitive

Some preferred embodiments of the present invention may incorporate the use of rectangular frustum structures associated with the RSE apertures in the radiation detector housing body. Within this context, the term "frustum" or "frusta" should be broadly interpreted to incorporate square frustum/frusta, rectangular frustum/frusta pyramidal frustum/frusta, and/or cone frustum/frusta.

Frusta Formation Not Limitive

While the present invention in many preferred embodiments utilizes excavated frusta within the overall radiation detector housing to affect port apertures to RSEs that are contained within the radiation detector housing, the present invention anticipates other forms of frusta formations that may be fabricated using drilling and/or milling techniques applied to a "blank" radiation housing structure. These drilling/milling techniques may take a wide variety of forms and may in some circumstances be customized and/or automated via the use of CNC drilling/milling techniques well known in the mechanical arts.

RSE Electronics Not Limitive

While a wide variety of anticipated electronics interfaces are anticipated for use with the plethora of different RSEs that may be incorporated in the present invention, some configurations may be preferred in some embodiments. Specifically, in the case of a photodiode RSE, this configuration solders the photodiode to a preamplification PCB that is connected to a data acquisition PCB via a ribbon cable. The preamplifier PCB may have a variety of configurations, but may in some preferred embodiments be circular and nominally 17 mm in diameter. Yet another housing comprising two cylindrical pieces (nominally 17 mm OD and 20 mm OD) may be utilized in some preferred embodiments to contain the tungsten charged plastic detector housing, preamplifier, and scintillator in a unified assembly.

Nominal Dimensions Not Limitive

Within the discussions herein the term "nominal" does not limit the scope of the present invention but is merely presented to provide a typical value associated with one or more preferred exemplary embodiments of the present invention.

RSE Sham Not Limitive

The present invention anticipates that a wide variety of RSE shapes may be incorporated into the invention, including but not limited to parallelepipedic, cubic, spherical, ovoidal, cylindrical, etc.

Cylindrical Sham Not Limitive

The present invention anticipates that the "cylindrical" or "tubular" shape of the radiation detector housing as described herein may form cubic, cylindrical, or spherical, elliptical or other curved surface at each distal face of the detector housing. Thus, the term "cylinder" and "cylindrical surface" within the context of the present invention is to be given a broader meaning than is normally provided by the strict mathematical definition of the term "cylinder". The present invention specifically anticipates that other solid formations may utilize the teachings of the present invention to create radiation detectors that have uniform isotropic radiation detection characteristics.

Symmetric/Asymmetric Construction Not Limitive

The exemplary preferred embodiments detailed herein may exhibit symmetric or asymmetric (anti-symmetric) construction, but these characteristics are not limitive of the present invention scope. Specifically, in some preferred exemplary embodiments detailed herein one side of the radiation detector housing may be constructed in a slightly different manner in order to incorporate space for a photodiode and/or preamplifier printed circuit board (PCB). In this preferred exemplary embodiment, this asymmetric configuration may reduce low energy contribution to the detected energy response to achieve an overall isotropic response, with compensation on the opposite aperture port to maintain uniform detector response. While this technique may be preferred in some embodiments, it is not necessarily an essential element of the claimed invention.

Multi-Piece Construction Not Limitive

Many preferred exemplary embodiments of the present invention utilize complementary injection molded construction in two-piece or multi-piece configurations to both make assembly of the overall radiation detector system simple and cost effective with respect to fabrication of necessary injection molds, etc. Within this context, the present invention in many preferred embodiments utilizes two-piece construction techniques, but the present invention is not limited to this particular construction technique and a plethora of multi-piece construction techniques may be used to fabricate the radiation detector housing. Furthermore each of these techniques may have a number of attachment and/or fastening techniques to combine the multi-piece parts into an integrated assembly. While not specifically dictated herein, these attachment means are well known to those skilled in the art and include but are not limited to glue, adhesive, plastic welding, fasteners, plastic and/or metal clips, plastic enclosures, and the like.

System Overview (0100)

The present invention may be seen in an overview context as generally illustrated in FIG. 1 (0100), wherein the radiation detector (0101) may operate in conjunction with a computer system (0102) running under control of software read from a computer readable medium (0103) to interact with an operator (0104) who typically interfaces with the computer system (0102) and/or software application/operating system (0103) using a graphical user interface (0105). Radiation data retrieved from the radiation detector (0101) and interpreted by the computer system (0102) is typically logged in one or more databases (0106). Not shown here are typical analog interface circuitry electronics between the radiation detector (0101) and computer system (0102) that may condition and discriminate data obtained from the radiation sensitive elements (RSEs) contained within the radiation detector (0101). These interface circuits are well known to those skilled in the art and depend heavily on the exact application context and RSE type utilized within the radiation detector (0101). Within this context a radiation rate meter (0107) and/or monitor (0108) may be employed to provide audio/visual feedback on measured radiation doses and exposures.

Other variations on this system configuration theme are possible, including an integrated radiation detector with the detector electronics mounted in a probe connected to a computer or monitor to directly display measured radiation; a radiation monitor implementing a dose/rate meter that displays to the user a direct measure of radiation dosing; and a plastic injection molded case comprising photodiode detector, RSE, and frontend electronics.

Within this overall application context an inspection subject/object (0110) that is the source for the radiation to be detected may represent a wide variety of contexts and applications. However, many preferred invention applications utilize the radiation detector (0101) in the context of determining radiation dosing data to be associated with human exposure. Within this context it is highly desirable to have radiation detectors (0101) that provide isotropic (spatially uniform) detection capabilities that are both sensitive and capable of discriminating between high energy radiation and low energy radiation, while simultaneously being easy to manufacture, assemble, and of low cost. These detector characteristics have been difficult if not impossible to achieve using the prior art manufacturing and construction techniques.

Radiation Detector Overview (0200)

Figure 2:
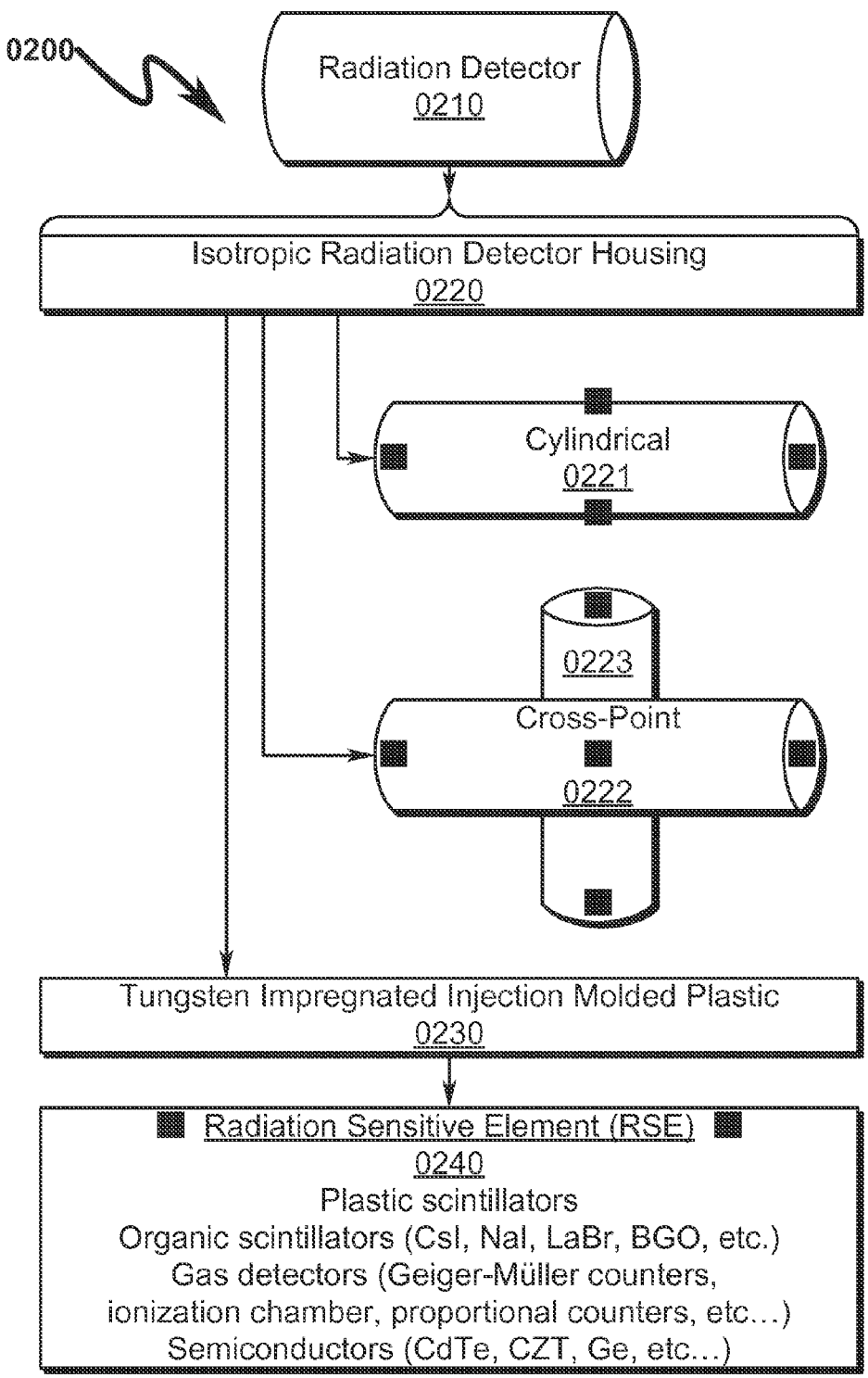
FIG. 2 illustrates a system block overview diagram describing a presently preferred embodiment of the present invention.

The radiation detector system may best be described in an overview fashion as illustrated in FIG. 2 (0200), wherein the radiation detector (0210) comprises a tubular radiation detector housing (0220) comprising charged (tungsten or other impregnated material) injection molded plastic (0230) in which one or more radiation sensitive elements (0240) are housed. The anticipated RSEs include but are not limited to the following:
- Organic scintillators;
- Inorganic scintillators (CsI, NaI, LaBr, BGO, etc.);
- Gas detectors (Geiger-Müller counters, ionization chamber, proportional counters, etc. . . . ); and/or
- Semiconductors (CdTe, CZT, Ge, etc. . . . ).

However, many preferred embodiments of the present invention utilize a RSE comprising a scintillator CsI(Tl) (nominally 42×8×8 $mm^3$) to create light from radiation and a photodiode to transform light to electrical signal for further analysis.

Various forms of the tubular radiation detector housing (0220) are anticipated within the scope of the invention, including but not limited to a cylindrical housing (0221) comprising six (6) RSE windows (one on each cylinder end and four equally spaced at the cylinder midpoint), and a cross-point housing (0222) comprising six (6) RSE windows (one on each cross-point cylinder distal end and two placed at the cylinder cross-point intersection top and bottom planes).

Exemplary System Compensation Context (0300)

Figure 3:
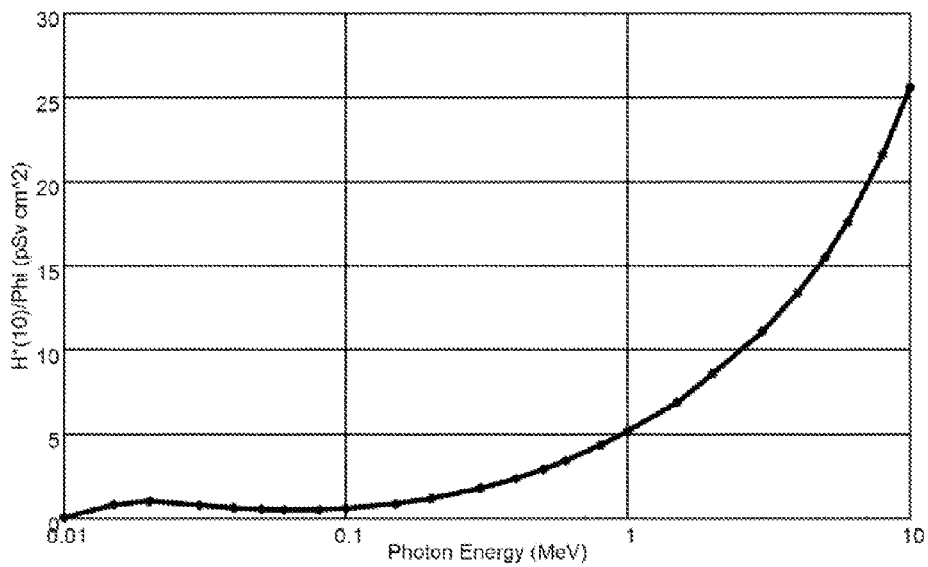
FIG. 3 illustrates an exemplary compensation dataset and graphical curve associated with compensating dosing values as they relate to incident radiation levels.

One of the stated goals of the present invention is to correct for the energy response of the RSE to account for ICRP/ICRU coefficients associated with dose rates. A typical compensation characteristic (dataset and graphical plot) that relates dose rates to photon energy is depicted in FIG. 3 (0300). Here it is seen that dosing rates do not linearly track photon energy and therefore must be compensated for to achieve accurate dose rate measurements.

The detector sensitivity depends on the energy of the incident particles. By modifying the sensitivity of the RSE using a modulating enclosure, it is possible to transform the radiation count rate to a radiation dose rate simply by applying a coefficient factor (the same factor for all energy ranges) to the measured count rate. This greatly simplifies the accumulation of data for measured dose rates.

Typically, a radiation counter counts pulses associated with a given RSE output response. Within this context, the measurement range of the detector depends on the count rate. For example, if the maximum count rate is nominally MCini c/s (maximum count rate initial) counted with typical RSE interface electronics. As an example and referencing the data in FIG. 3 (0300), if the RSE does not have the same sensitivity in all energy ranges, the energy with the maximum sensitivity (for example, 100 keV) will have for example 0.5 mSv/h for MCini c/s when another energy (for example 1000 keV) will have 10 mSv/h for MCini c/s. From this it can be seen that correcting sensitivity reduces count rate at low energy levels and increase measurement range: for 100 keV, with the tungsten charged plastic radiation housed sensor, it is possible to measure 4 mSv/h. While these values are only exemplary of typical values, they do provide some insight into the capabilities of the present invention.

Some preferred embodiments of the present invention have as an application goal to correct totally the energy response of the detector to fit the ICRP/ICRU coefficients which gives coefficients to convert radiation flux to dose as a function of the energy (as generally depicted in FIG. 3 (0300). Within this specific context many preferred exemplary invention embodiments have a nominal sensitivity at 10 MeV that is five times the measurement sensitivity at 1 MeV.

Preferred Exemplary Method Embodiment (0400)

Figure 4:
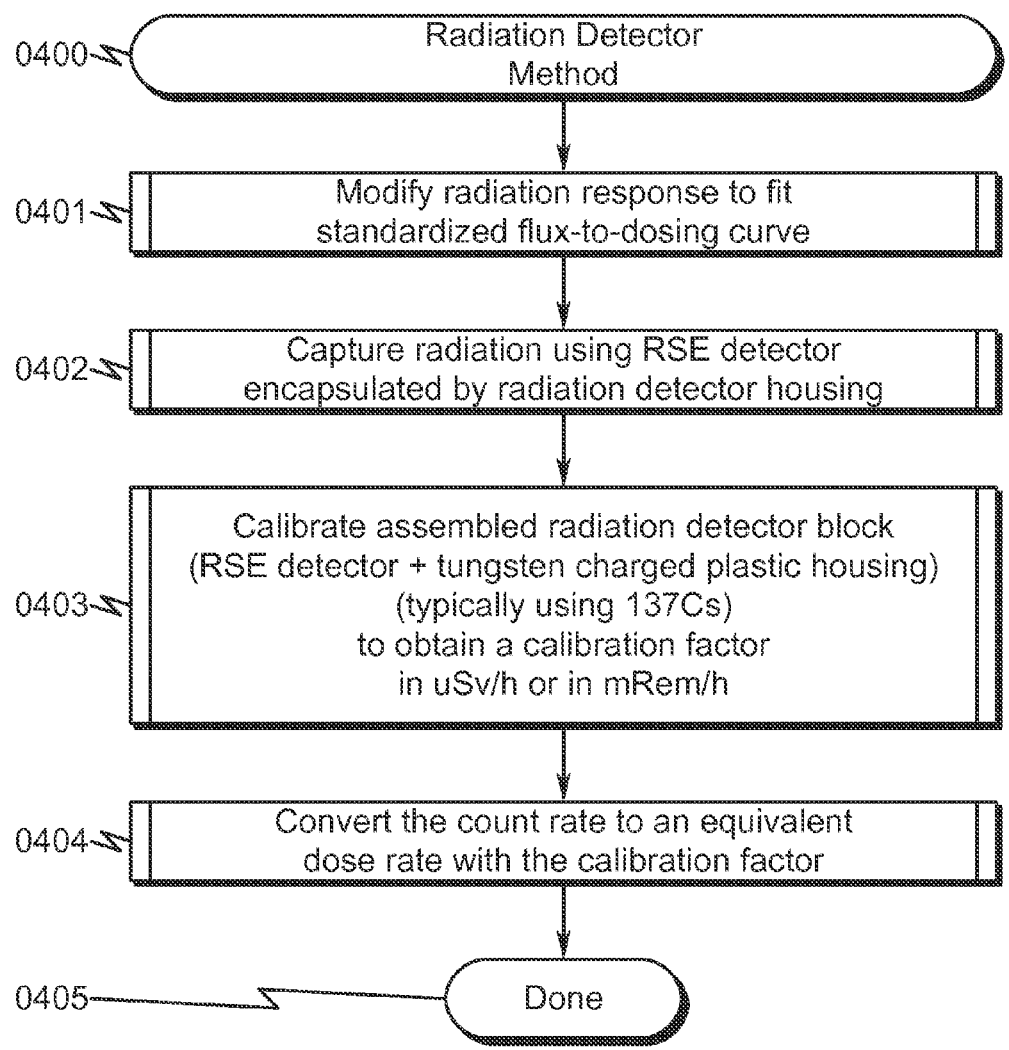
FIG. 4 illustrates a flowchart describing a presently preferred method embodiment of the present invention.

As generally seen in the flowchart of FIG. 4 (0400), the present invention method associated with determining a radiation dose rate may be generally described in terms of the following steps:
(1) Modifying the radiation response of a RSE to fit a standardized flux-to-dosing curve (0401);
(2) Capturing radiation using the RSE detector encapsulated by a charged plastic molded radiation detector housing (0402);
(3) Calibrating the assembled radiation detector block (RSE detector+charged plastic injection molded housing) (typically using 137Cs) to obtain a calibration factor (in uSv/h or in mRem/h) (0403);
(4) Converting the count rate of the RSE to an equivalent dose rate with the calibration factor (0404); and
(5) Terminating the radiation detection method (0405).
One skilled in the art will recognize that these method steps may be augmented or rearranged without limiting the teachings of the present invention.

Note that this method may incorporate displays, audible alarms, or other type of human and/or computer interfaces in conjunction with data logging and/or mathematical analysis of the collected radiation pulse count information. This general method summary may be augmented by the various elements described herein to produce a wide variety of invention embodiments consistent with this overall design description.

Exemplary Embodiment Design Principles

While many factors may direct the specific design of a particular invention embodiment, the following principles generally dictate specific application construction details:
- The invention is constructed of charged (typically tungsten) plastic injection molded that is capable of correcting the detection response of a photon detector or other RSE.
- The use of injection molded charged plastic allows the energy response of the RSE to be modified.
- The use of injection molded charged plastic in conjunction with specific radiation detector housing construction allows the energy response of the RSE to be isotropic.

These characteristics will now be discussed in further detail.

Energy Compensation

The maximum overall dimensions of a preferred exemplary embodiment in cylindrical form are a cylinder of diameter nominally 17 mm on 50 mm high. By modelling or by measuring the energy response ((c/s) per (pSv/hour)) of this detector on the energy range of interest permits the thickness of the housing walls to be modified as needed to correct for the desired energy response.

Many target applications for the present invention attempt to be the most sensitive possible with the widest range of possible energy. For the charged plastic utilized in the present invention, the following characteristics dictate the energy response:

The thickness of the detector housing material;
The percentage of surface of detection covered for:
Maintaining a high level for the energy response curve;
Maintaining the high energy sensitivity as high as possible; and
Maintain the sensibility with low energy at least equal to the sensibility with high energy.
The output data of this first design stage include:
The maximum thickness of material; and
The proportion of the detector (RSE) which is left naked (uncovered).

Generally speaking, the present invention incorporates dose rate compensation based on charged (thermo) plastic enclosure which results in:

reduced low energy response;
limited damage to high energy responses;
isotropic detector behavior; and/or
a mechanical barrier that wraps and protects the detector and light collector.

Dose rate compensation reduces the difference between low and high energy responses. The apparatus as described is applicable in a large range of measurement environments and generally results in a high dose rate limit that is improved by a factor ten in some preferred embodiments.

Detector Isotropy

The geometry of the naked detector is determined by the interface with the RSE detector electronics. To have the best isotropy possible in the overall dimensions of the radiation detector, the preferred design utilizes a full cylinder that integrates six (6) aperture windows into six (6) orthogonal directions. To have a detector isotropic in this configuration the six windows are modified with nominal 45° aperture angles for seeing the same naked surface from all incidence angles.

General Detector Housing Design—Dose Rate Compensation

While a number of methods may be used to design the detector housing that encloses the RSE to provide for dose rate compensation, the following steps may be found useful in many circumstances:

The detector housing thickness is chosen with "linear attenuation" calculations. Knowing the characteristics of the charged plastic material (density and isotopic composition), standard tables may provide the attenuation coefficients associated with the material. With this information the calculate attenuation for all energy ranges depending on thickness can be calculated. Typically the thickness is chosen to reduce the middle energy response and to keep the high energy response.

For a non-nude window, the lower energy (below 150 keV) response is completely cut-off.

With respect to the overall detector housing geometry, some preferred embodiments utilize a nude window for two reasons:

This keeps low energy sensitivity at least as high as high energy sensitivity; and This provides for a low energy sensitivity generally the same from all directions. Since the overall detector housing cannot be closed because of the RSE (photodiode) and associated preamp, what is needed in many preferred embodiments is to have the constructed system be symmetric in all 6 directions (i.e., with identical or very similar nude window dimensions).

One skilled in the art will recognize that this design methodology is only exemplary of many that are applicable to the teachings of the present invention.

Preferred Exemplary Embodiment (0500, 0600)

Figure 5:
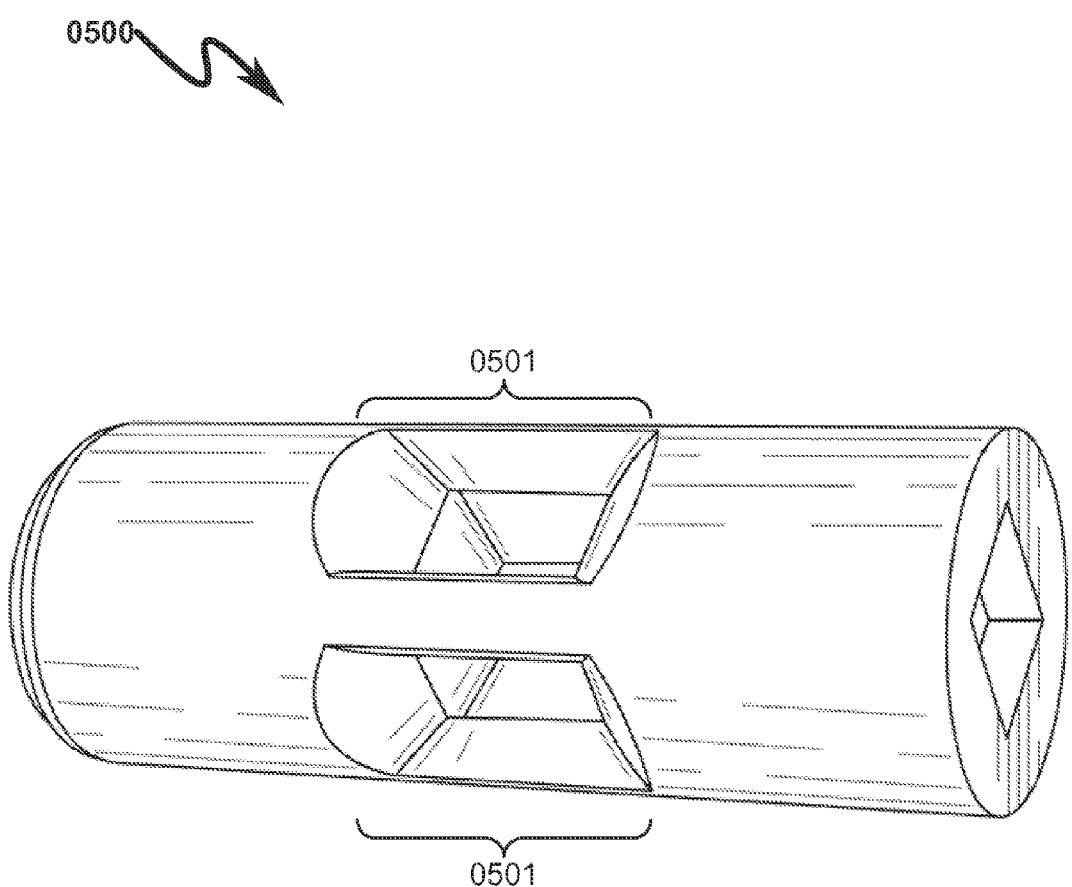
FIG. 5 illustrates a perspective view of a preferred exemplary embodiment of the present invention system.
Figure 6:
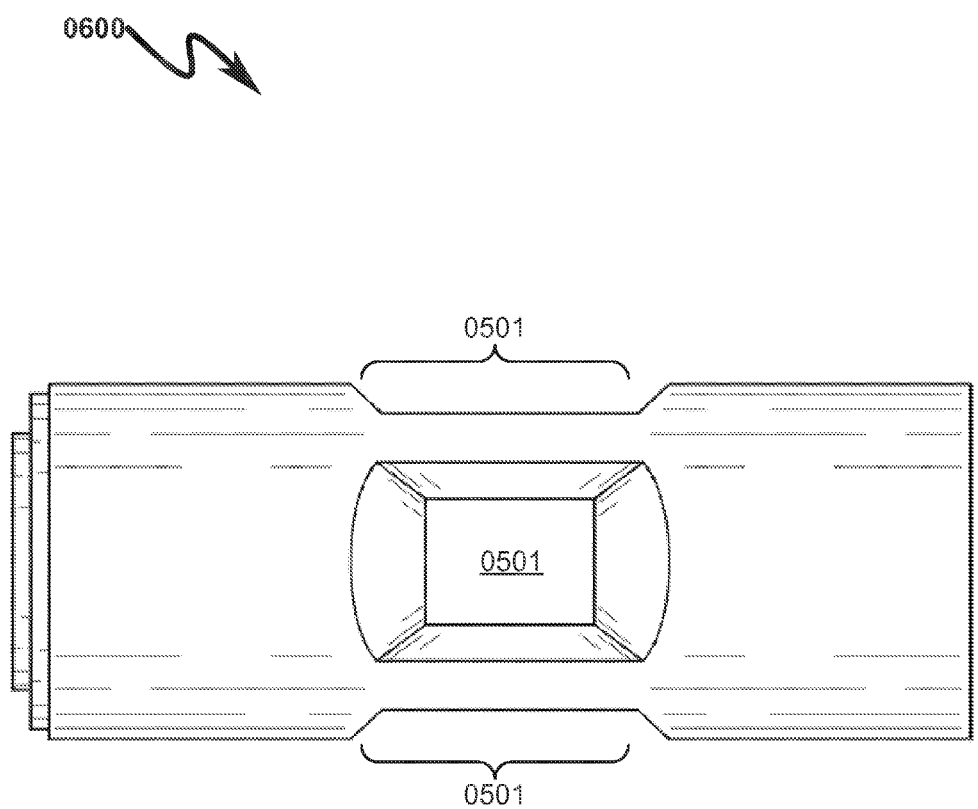
FIG. 6 illustrates a perspective view of a preferred exemplary embodiment of the present invention system.

As generally seen in the perspective views of FIG. 5 (0500) and FIG. 6 (0600), the present invention may in some preferred exemplary embodiments be configured as a cylinder having six (6) aperture ports (0501) in which radiation sensitive elements (RSEs) are configured for detection of radiation. While the optimal aperture port angle in many configurations is thought to be 45-degrees, the present invention is not limited to this configuration.

Generally speaking the outer cylindrical surface of the tubular radiation detector housing comprises a number of aperture ports (0501) configured to expose RSEs (in whole or in part) to correct energy levels associated with impinging radiation and thus modulate the response of the RSE in response to incident radiation. The aperture ports (0501) as detailed in FIG. 5 (0500) and FIG. 6 (0600) can be configured as "evacuated frusta" in which material from the tubular radiation detector housing is removed to expose the underlying RSE (in whole or in part) or as "filled" frusta in which a radiation-transparent material is placed in the "evacuated frusta" cavity. Alternative embodiments discussed elsewhere permit the use of "drilled frusta" or "drilled-filled frusta" that are formed without full evacuation of the tubular radiation detector housing material, but rather by using selective drilling/milling of a "blank" radiation housing with one or more holes placed in the tubular radiation detector housing by a drilling/machining and/or injection molding operation. As illustrated in FIG. 5 (0500), the distal cylinder ends need not be identical and may vary based on application.

Alternate Preferred Exemplary Embodiment (0700, 0800)

Figure 7:
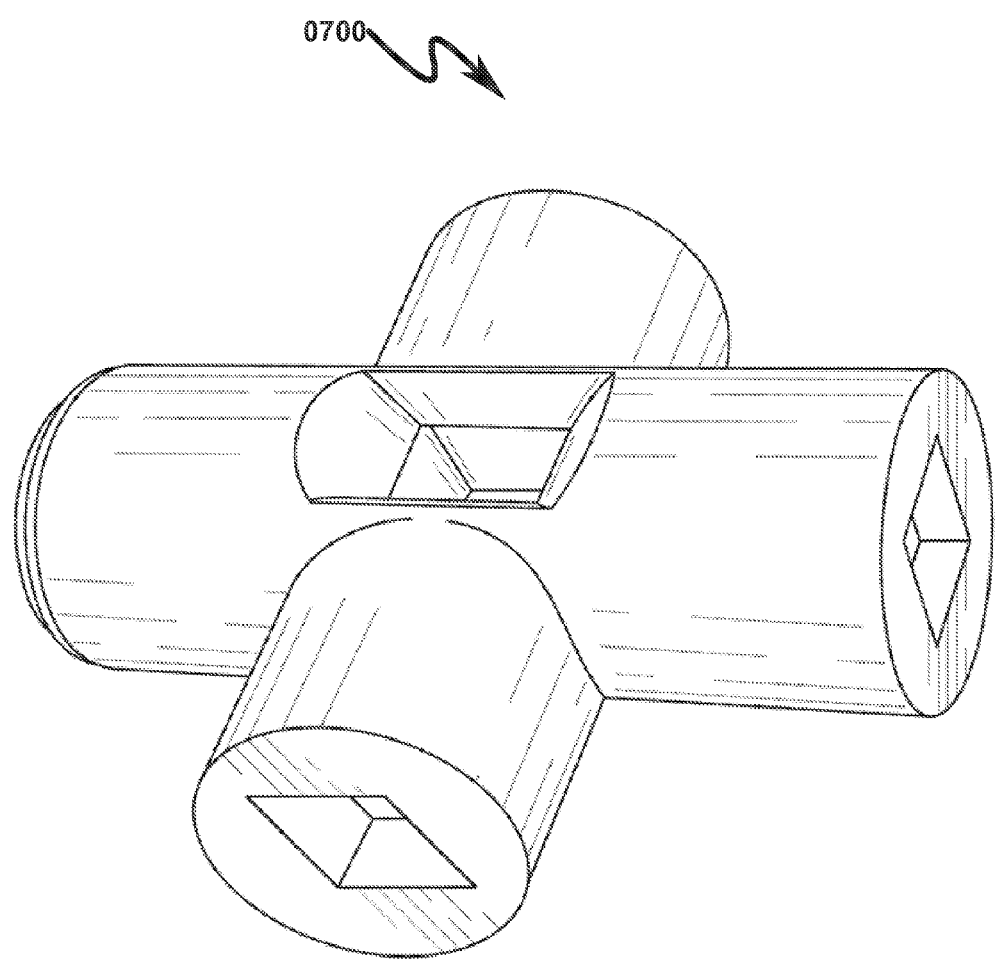
FIG. 7 illustrates a perspective view of an alternate preferred exemplary embodiment of the present invention system.
Figure 8:
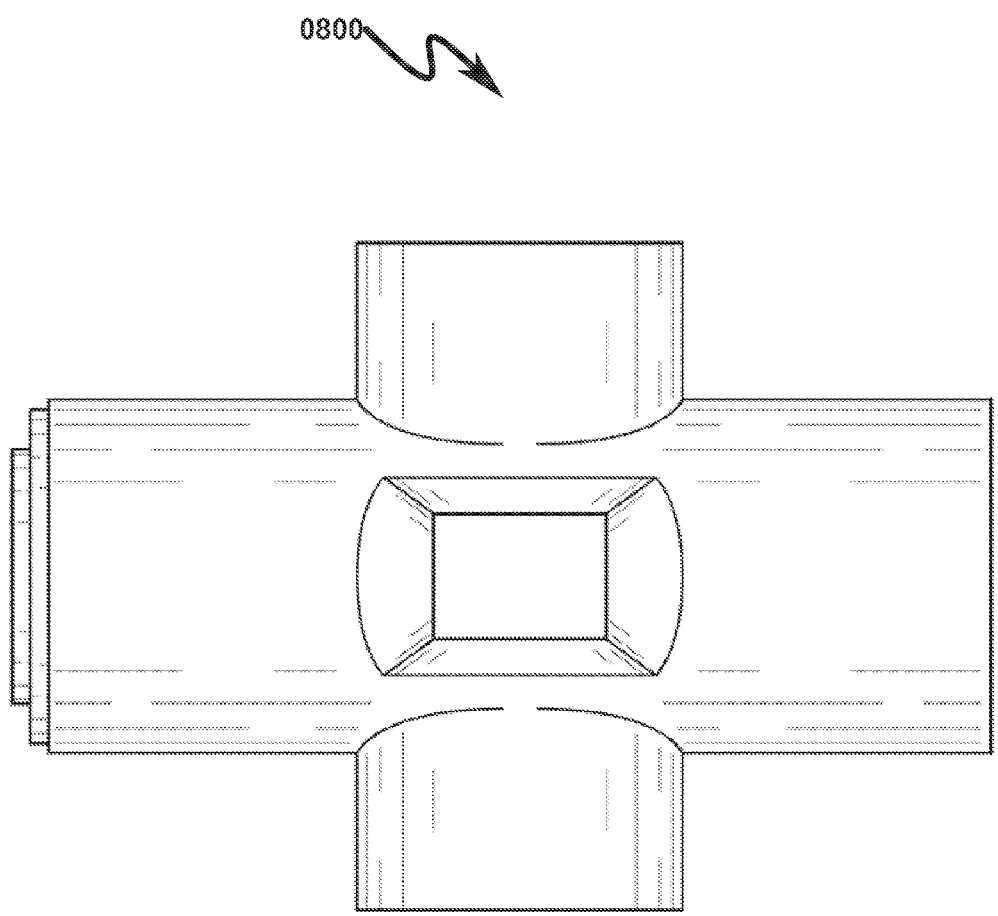
FIG. 8 illustrates a perspective view of an alternate preferred exemplary embodiment of the present invention system.

As generally seen in the perspective views of FIG. 7 (0700) and FIG. 8 (0800), the present invention may in some preferred exemplary embodiments be configured as in a crossed-cylinder configuration having six (6) aperture ports in which radiation sensitive elements (RSEs) are configured for detection of radiation. While the optimal aperture port angle in many configurations is thought to be 45-degrees, the present invention is not limited to this configuration.

This alternate preferred embodiment is similar to that illustrated in FIG. 5 (0500) and FIG. 6 (0600), with the exception that the configuration is formed using cross-point cylinders having four aperture ports (one at each distal end of each cylinder branch) as well as two additional aperture ports located on the intersection plane formed by the intersection of the cylinders. While the intersection is shown at the midpoint of the cylinders in FIG. 7 (0700) and FIG. 8 (0800), the present invention is not limited to a midpoint cross-point intersection.

Preferred Exemplary Cylinder Embodiment (0900)-(1600)

Figure 9:
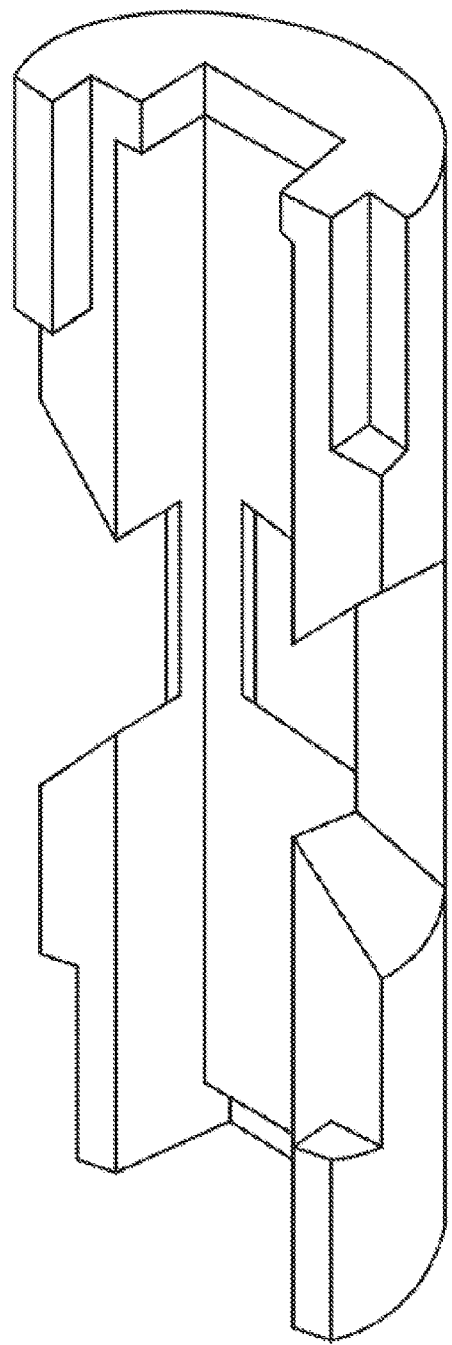
FIG. 9 illustrates an isometric view of a preferred exemplary embodiment of the present invention system.
Figure 16:
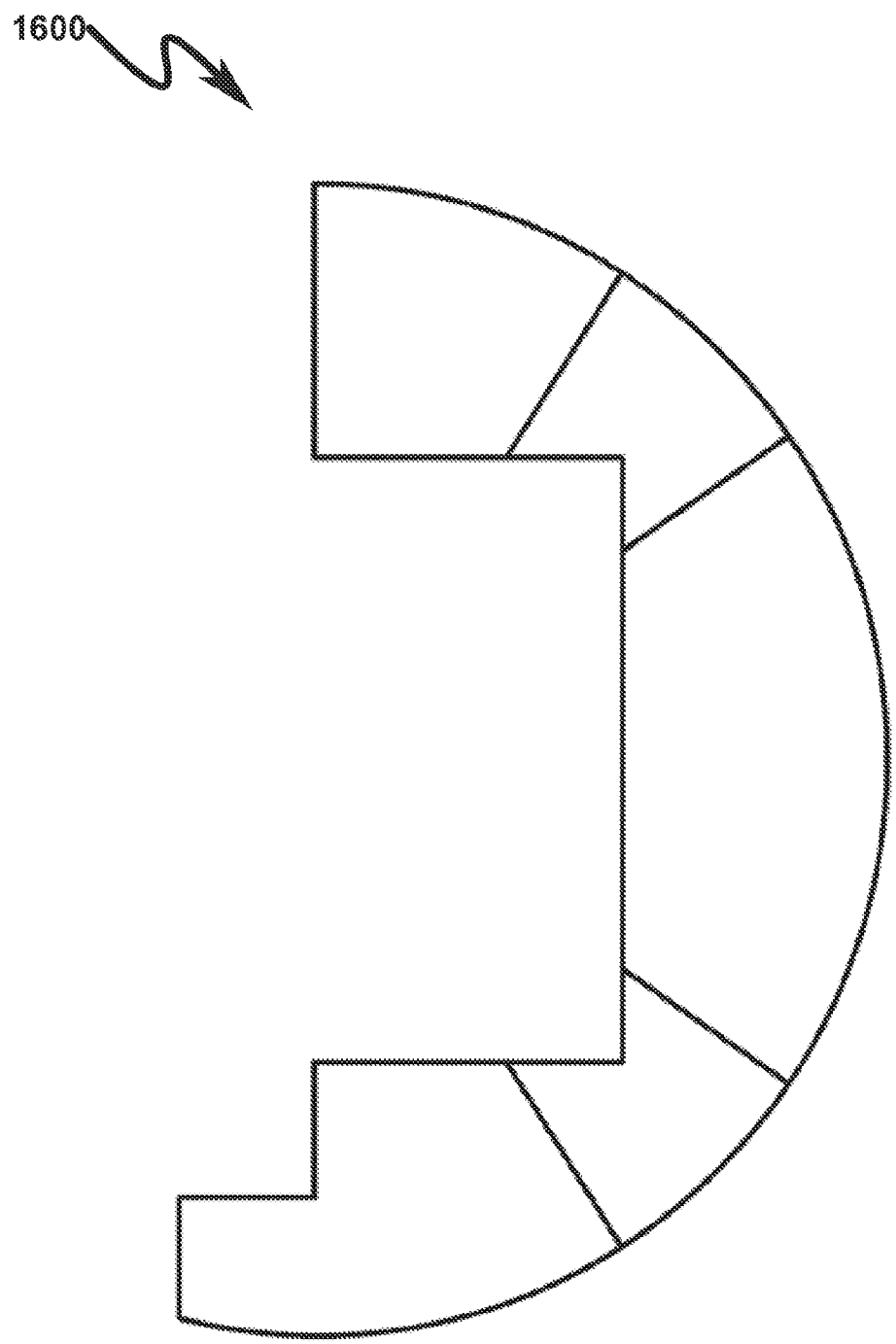
FIG. 16 illustrates a middle sectional view of a preferred exemplary embodiment of the present invention system.

The present invention may in some preferred embodiments take the form of a cylinder configuration as generally illustrated in FIG. 5 (0500), FIG. 6 (0600), and FIG. 9 (0900)—FIG. 16 (1600). In this preferred form, the cylinder structure contains RSE apertures at each distal end of the cylinder as well as one or more RSE apertures located on the circumference of the cylinder at approximately the midpoint between the two distal ends of the cylinder.

In this configuration the number of RSEs positioned at the midpoint between the two distal ends of the cylinder is optimally four, but can also be two or three in some alternate preferred embodiments.

Alternate Exemplary Cross-Point Embodiment (1700)-(2400)

Figure 17:
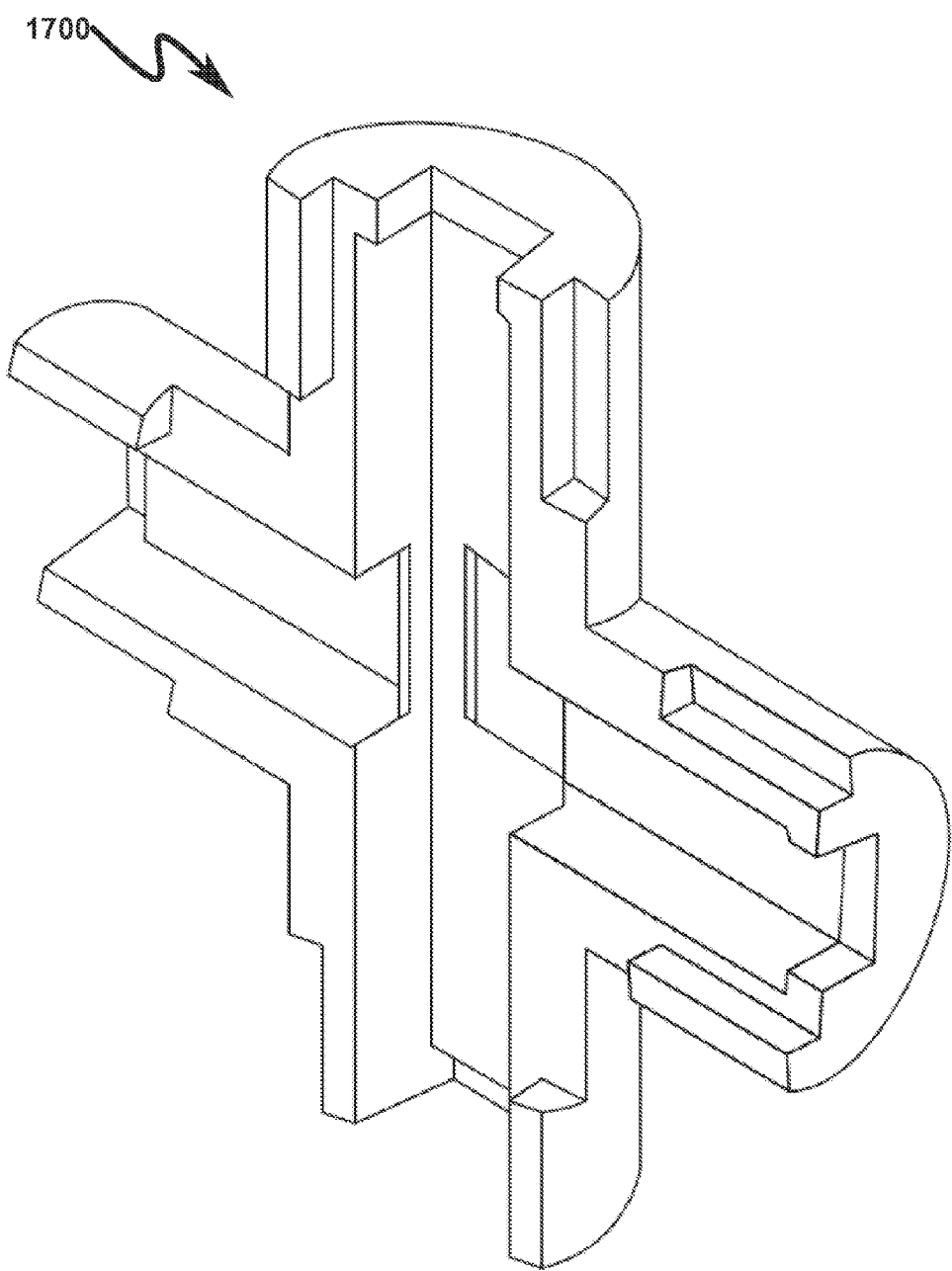
FIG. 17 illustrates an isometric view of an alternate preferred exemplary embodiment of the present invention system.
Figure 24:
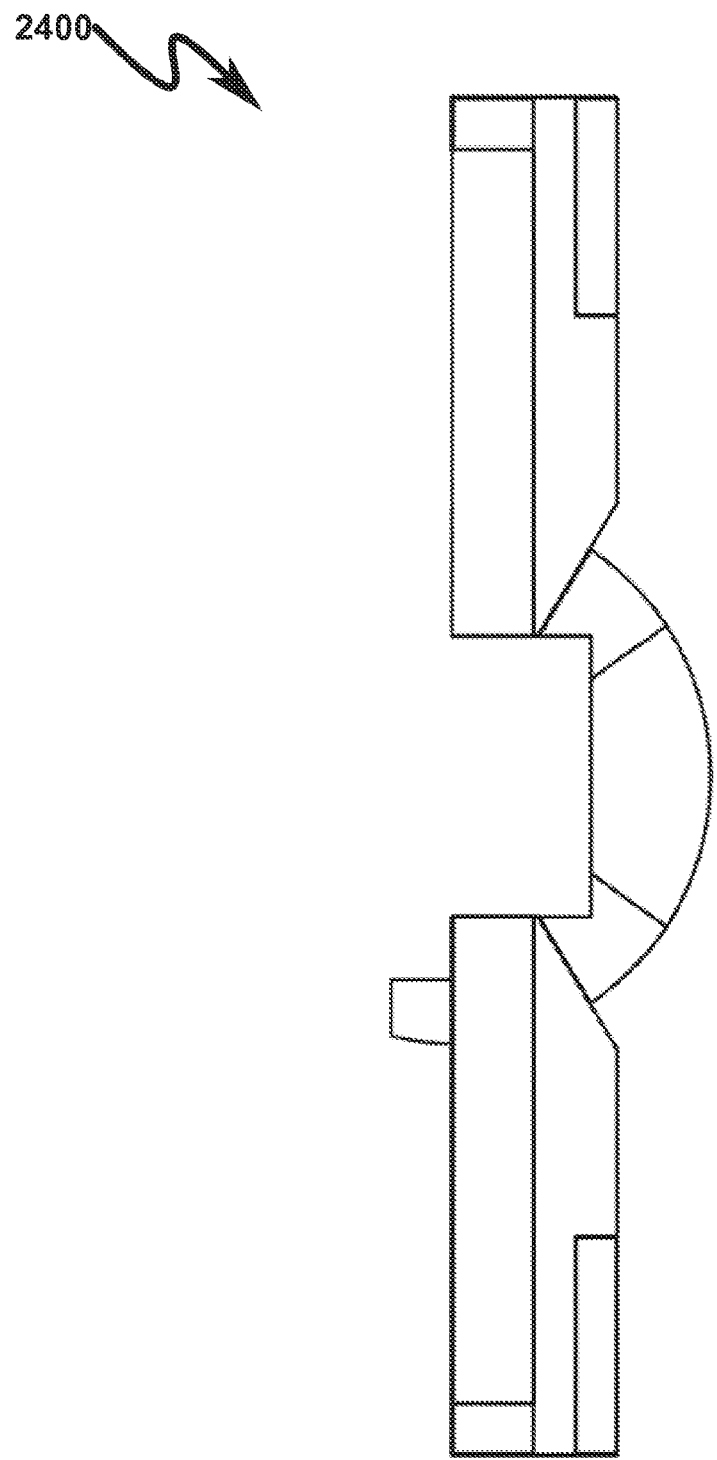
FIG. 24 illustrates a middle sectional view of an alternate preferred exemplary embodiment of the present invention system.

The present invention may in some preferred alternate embodiments take the form of a cross-point cylinder configuration as generally illustrated in FIG. 7 (0700), FIG. 8 (0800), and FIG. 17 (1700)-FIG. 24 (2400). In this alternative form, two cylinder structures are merged to form a cross-point configuration in which the RSEs are located at the distal ends of the orthogonal cylinders as well as at the upper/lower (top/bottom) planes formed by the intersection of the two cylinders.

Injection Molding Variations

Figure 10:
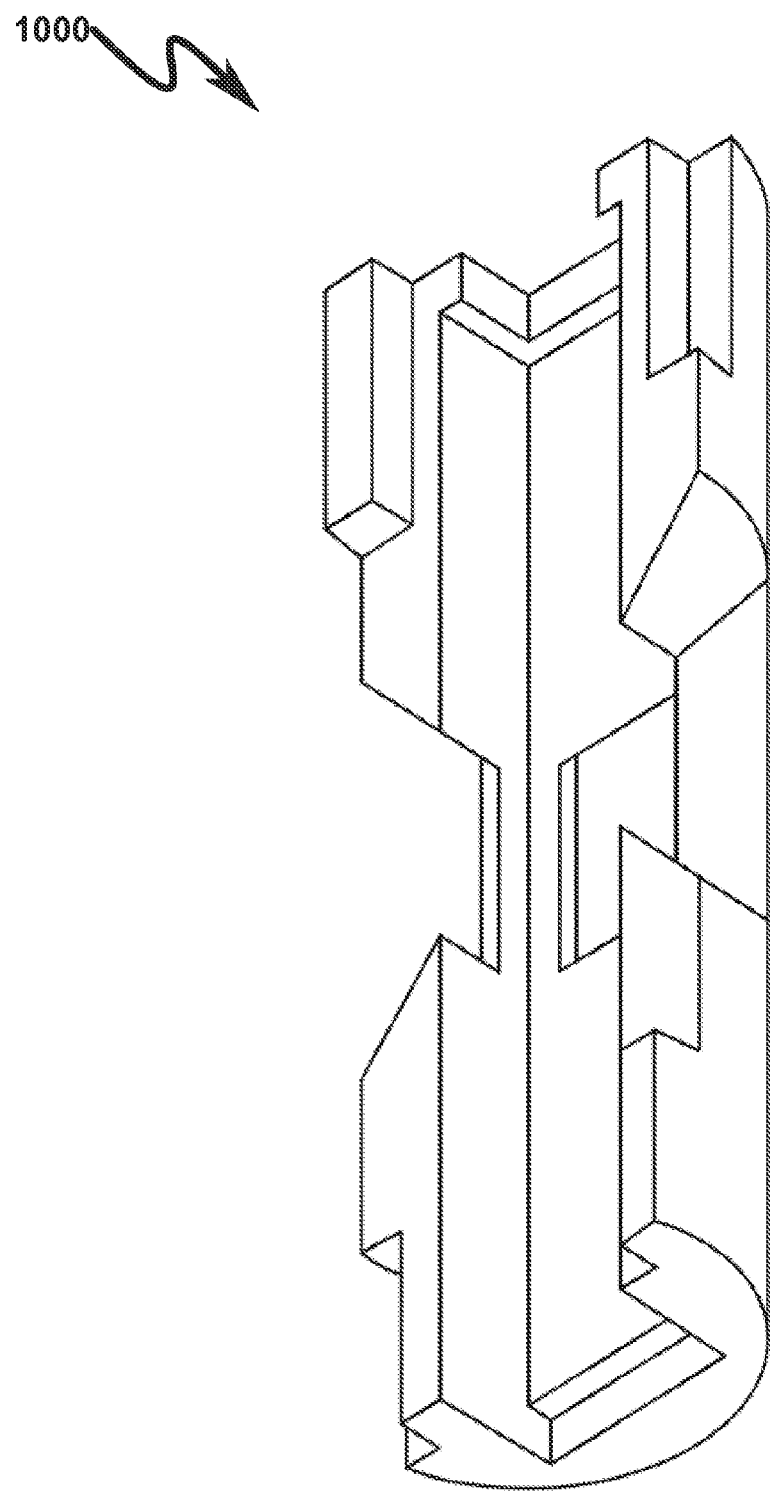
FIG. 10 illustrates an isometric view of a preferred exemplary embodiment of the present invention system.
Figure 11:
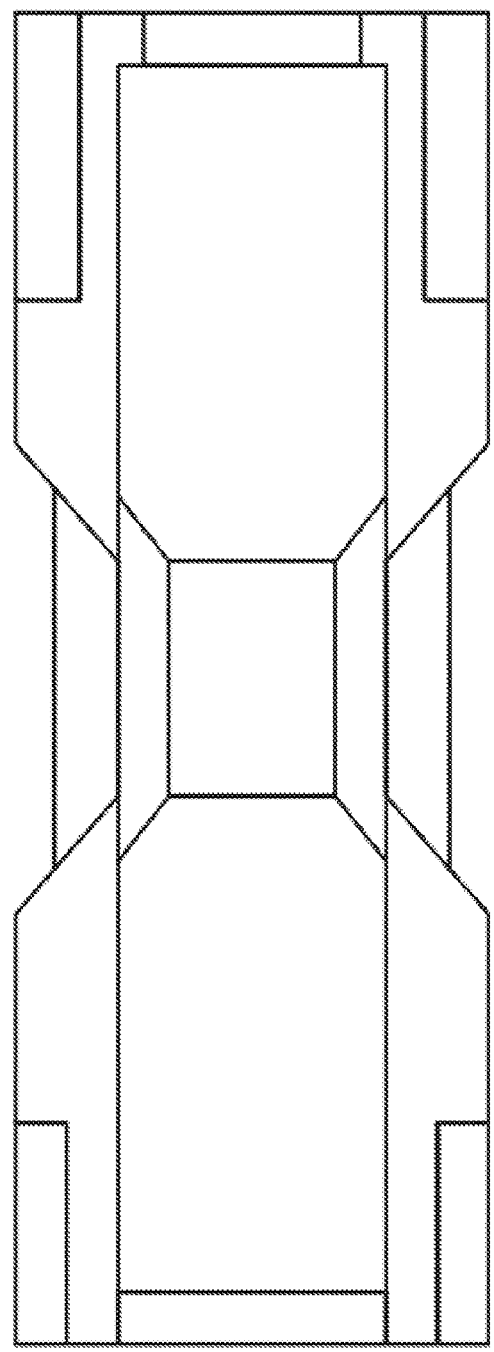
FIG. 11 illustrates a side sectional view of a preferred exemplary embodiment of the present invention system.
Figure 12:
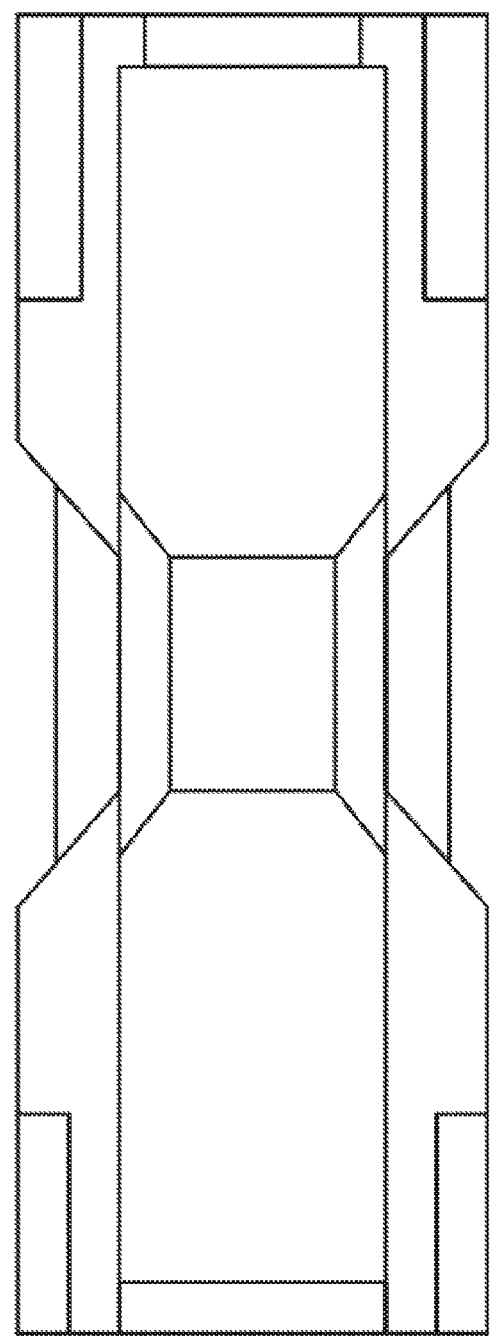
FIG. 12 illustrates a side sectional view of a preferred exemplary embodiment of the present invention system.
Figure 13:
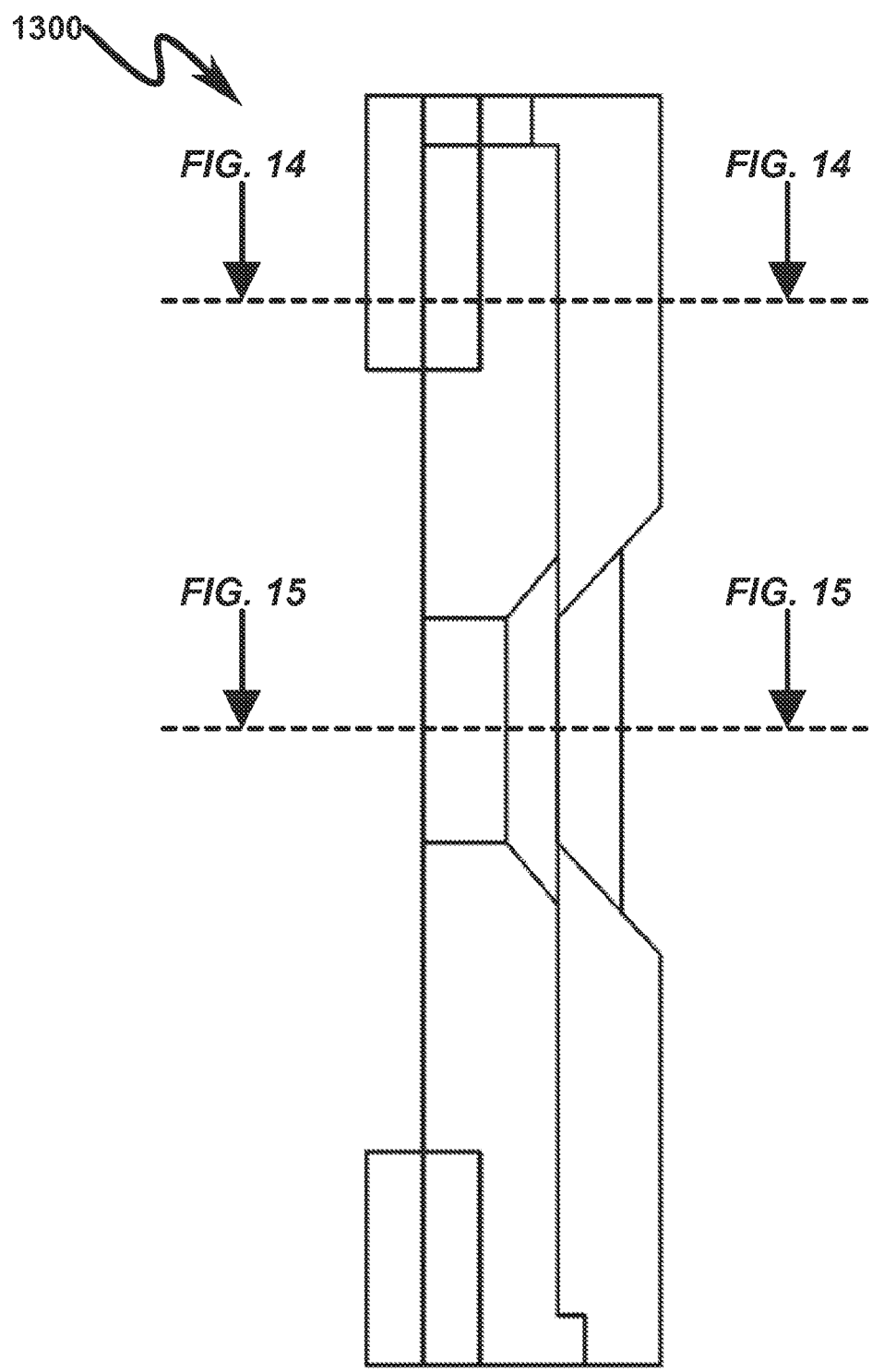
FIG. 13 illustrates a side sectional view of a preferred exemplary embodiment of the present invention system.
Figure 14:
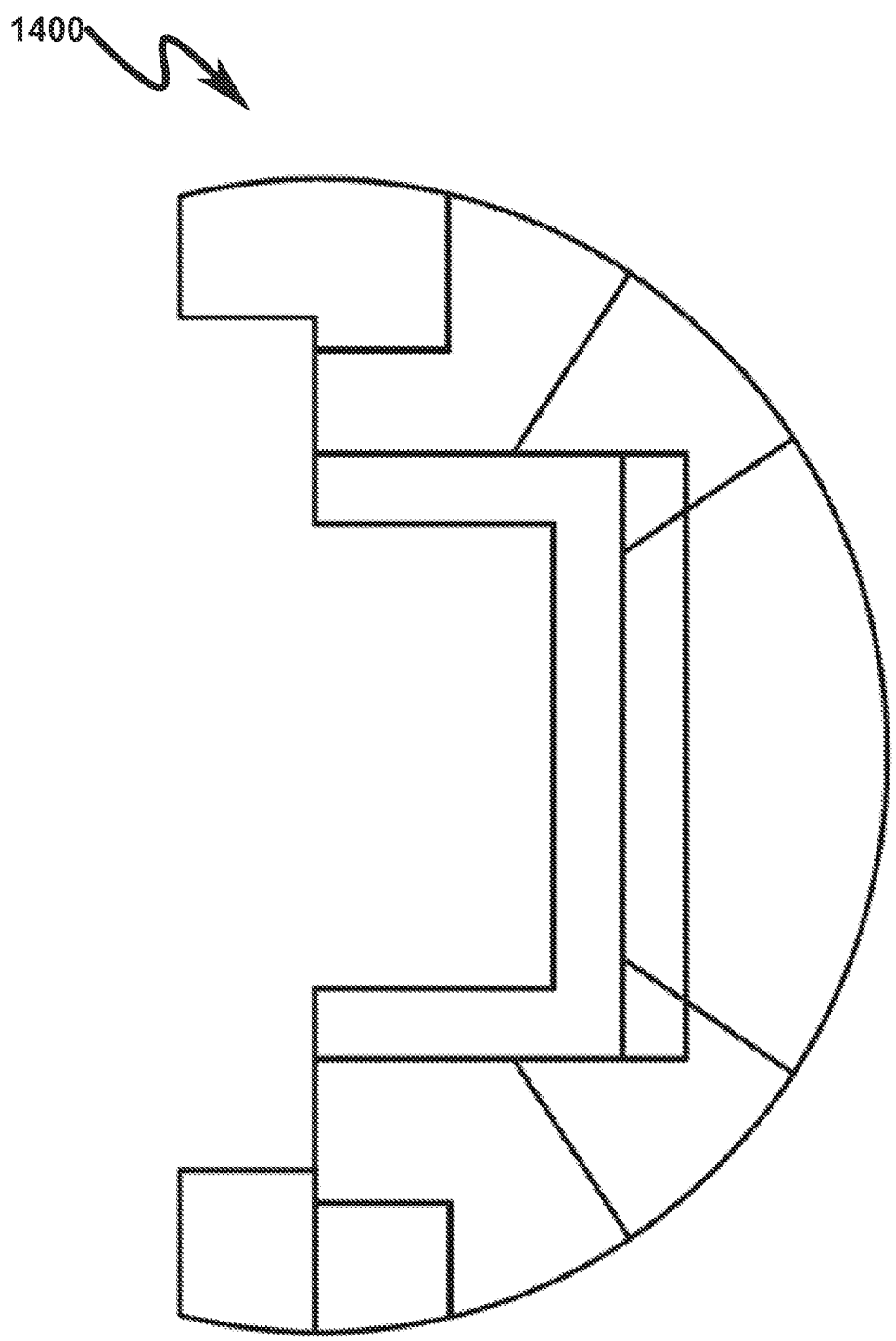
FIG. 14 illustrates a top view of a preferred exemplary embodiment of the present invention system.
Figure 15:
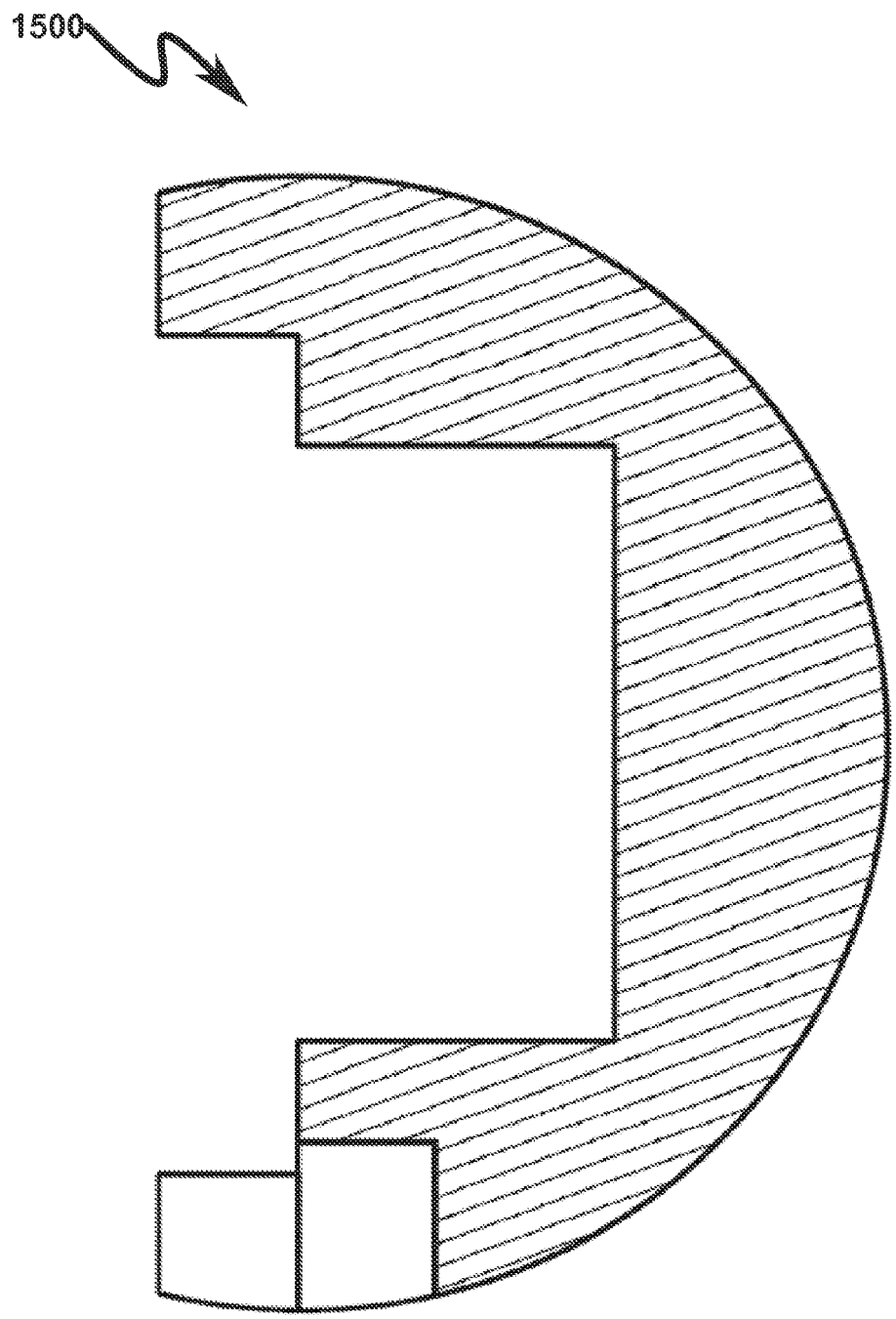
FIG. 15 illustrates a top sectional view of a preferred exemplary embodiment of the present invention system.
Figure 18:
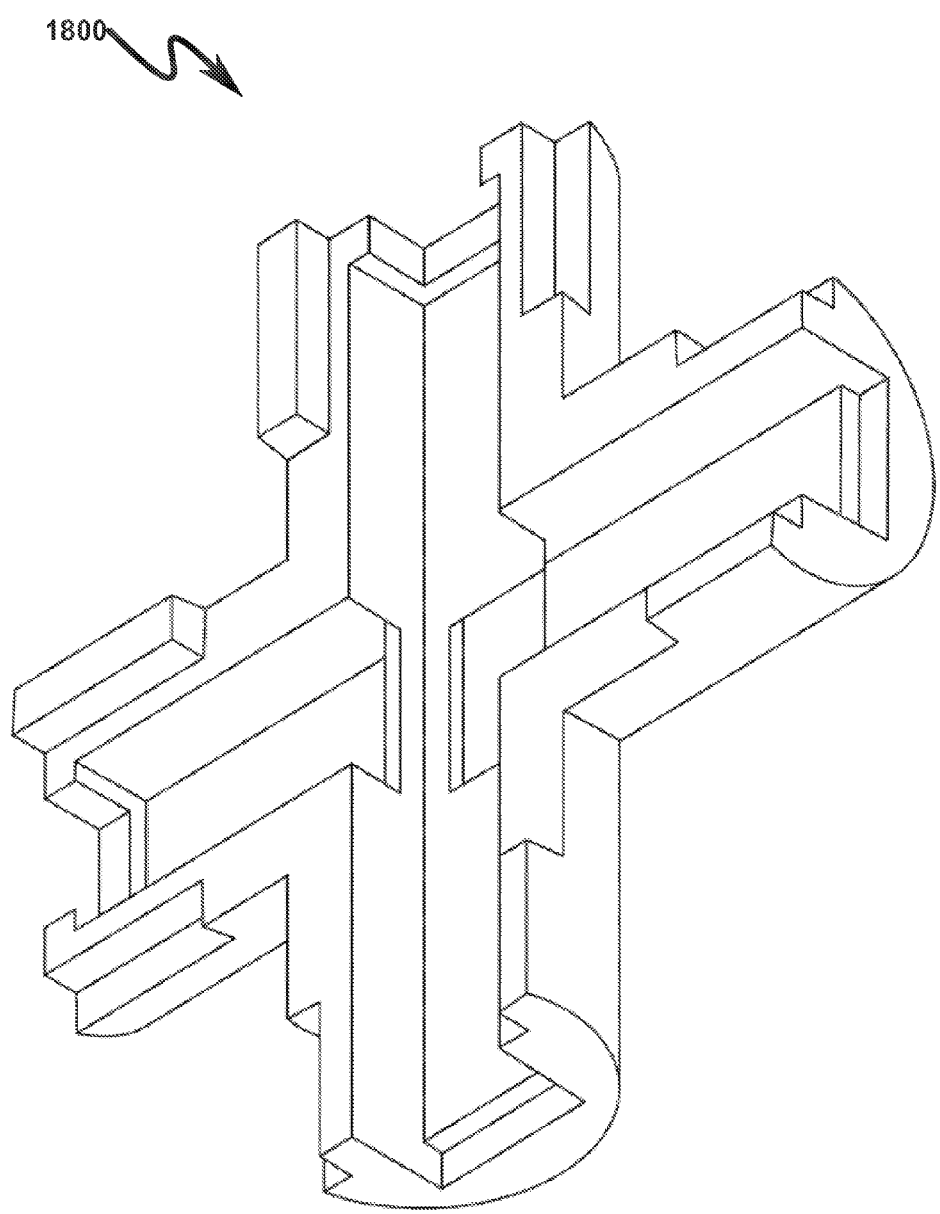
FIG. 18 illustrates an isometric view of an alternate preferred exemplary embodiment of the present invention system.
Figure 19:
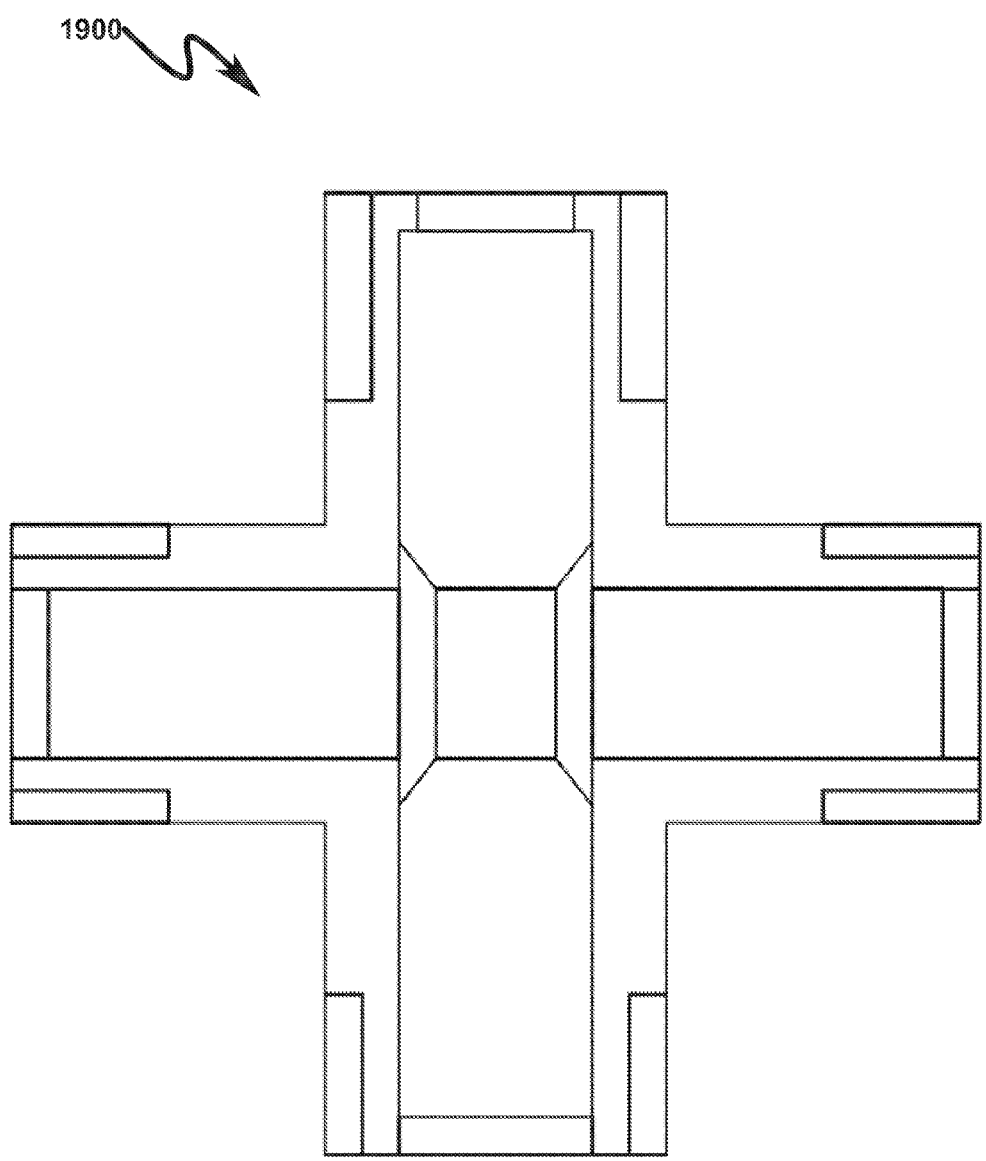
FIG. 19 illustrates a side sectional view of an alternate preferred exemplary embodiment of the present invention system.
Figure 20:
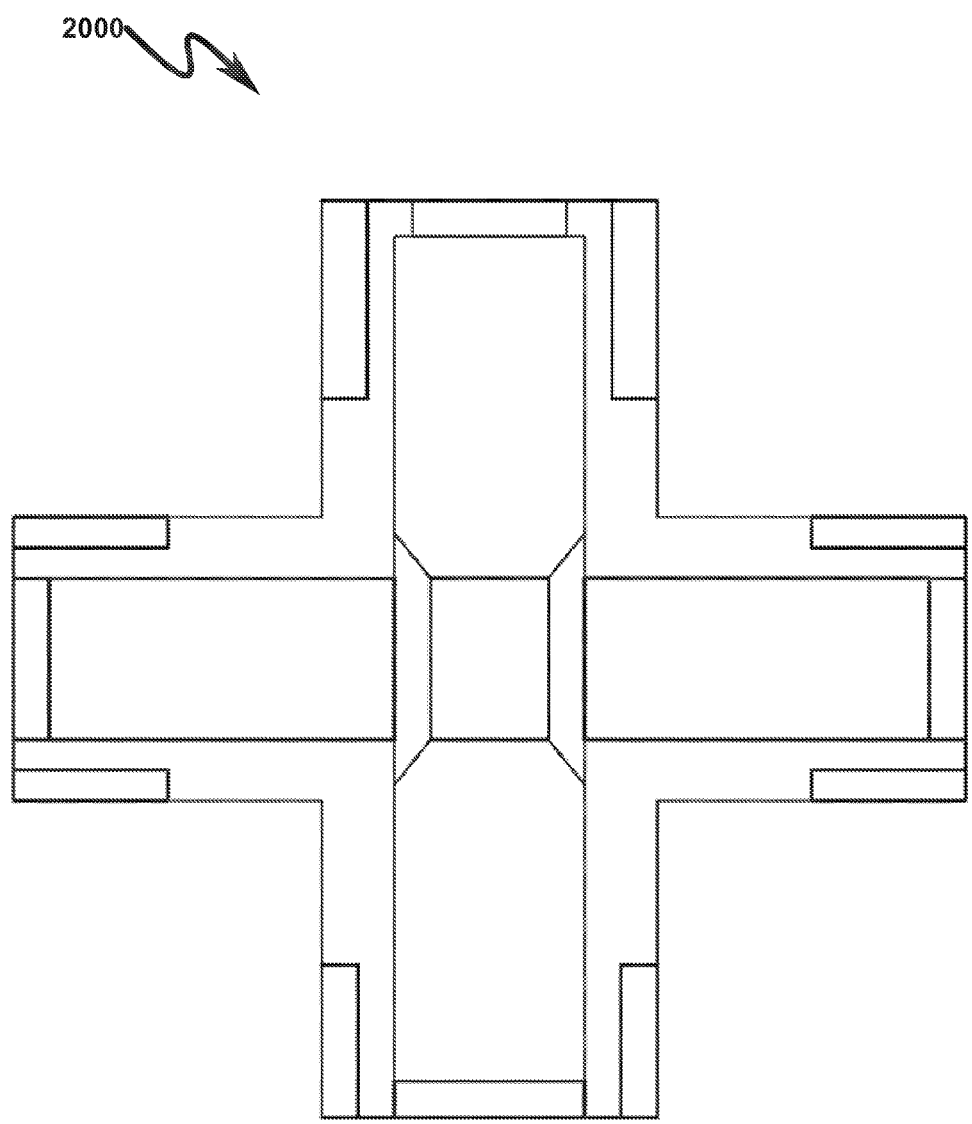
FIG. 20 illustrates a side sectional view of an alternate preferred exemplary embodiment of the present invention system.
Figure 21:
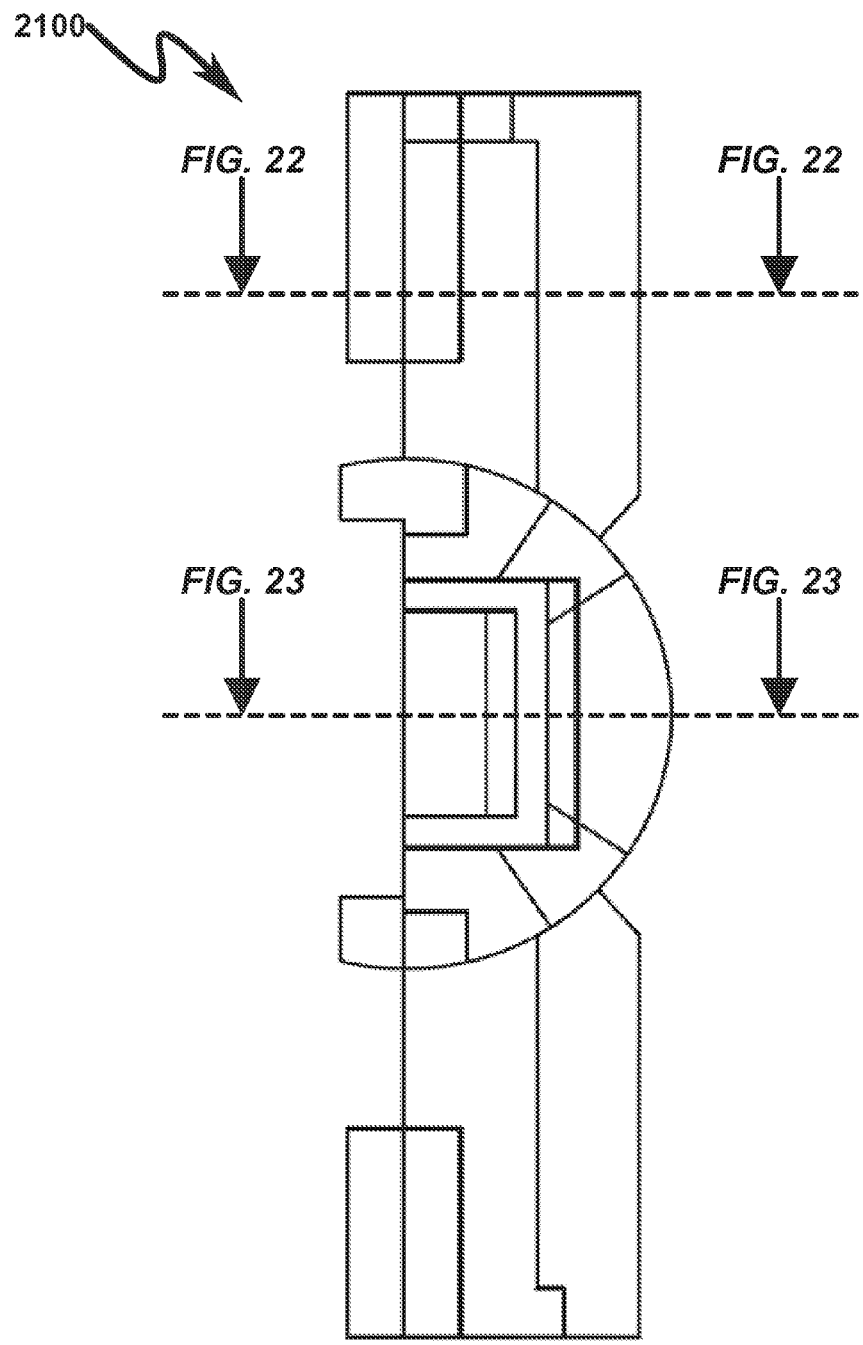
FIG. 21 illustrates a side sectional view of an alternate preferred exemplary embodiment of the present invention system.
Figure 22:
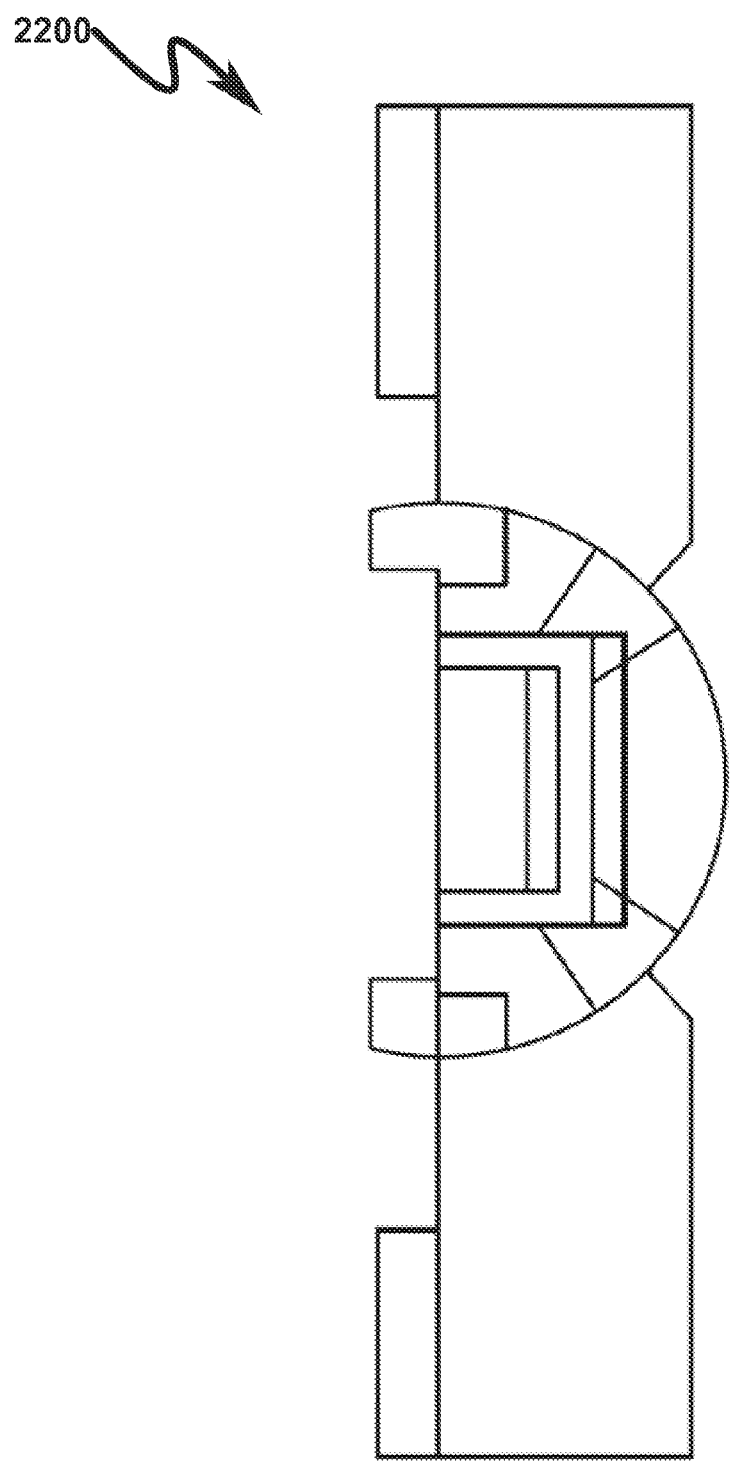
FIG. 22 illustrates a top view of an alternate preferred exemplary embodiment of the present invention system.
Figure 23:
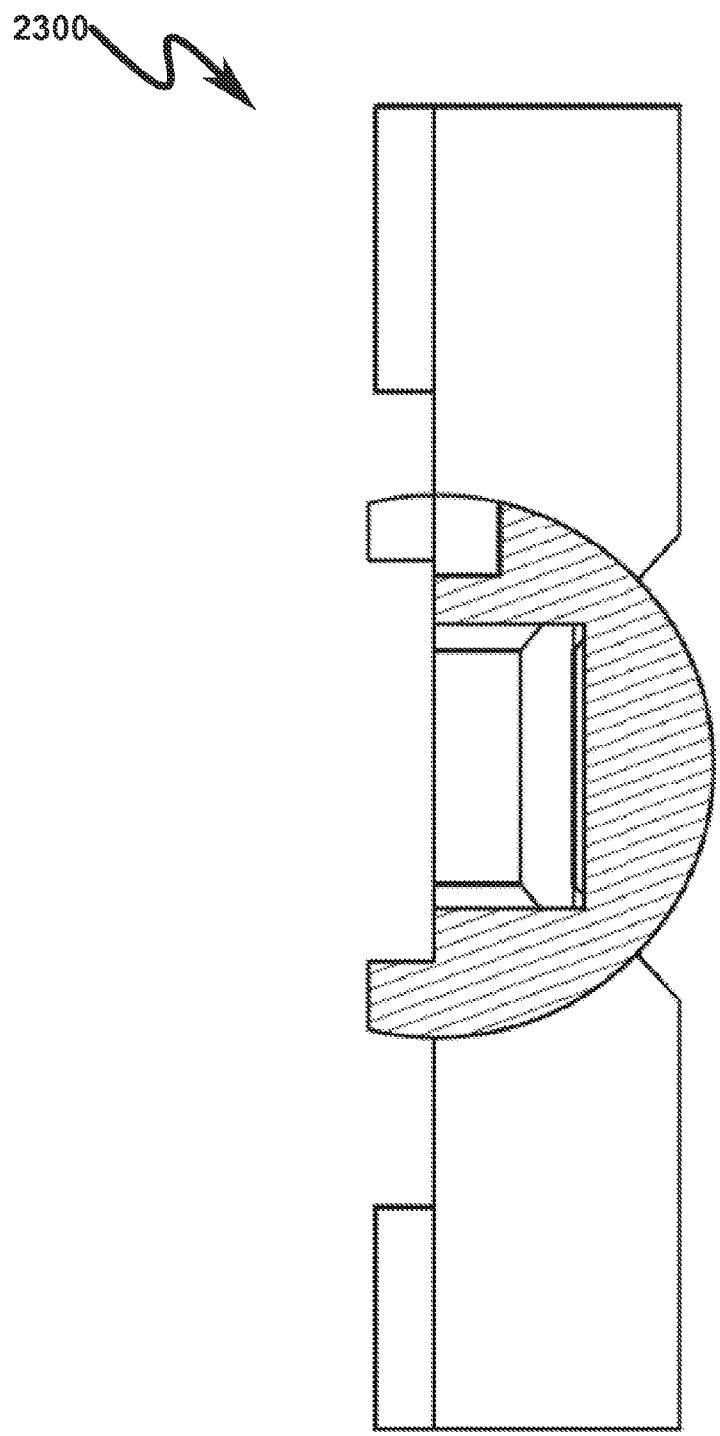
FIG. 23 illustrates a top sectional view of an alternate preferred exemplary embodiment of the present invention system.

The exemplary embodiments generally illustrated in FIG. 5 (0500)-FIG. 24 (2400) may in some preferred embodiments be implemented using a two-part mold assembly as generally illustrated in FIG. 9 (0900)/FIG. 10 (1000) and FIG. 17 (1700)/FIG. 18 (1800) where in the radiation detector housing is split into two pieces that are molded using a single anti-symmetric mold. By "anti-symmetric" it is meant that plastic pieces formed from the mold can be rotated 90 or 180 degrees as applicable and turned to face one another and properly mate to form a unified cylinder or cross-point cylinder configuration. This fabrication optimization permits a single mold to generate both pieces of a two-piece housing assembly. Additionally, other multi-piece molding configurations are possible utilizing both symmetric and anti-symmetric orientation configurations. One skilled in the art will recognize that symmetric assemblies may also be used in this context.

Frusta Variations

While the exemplary embodiments generally illustrated in FIG. 5 (0500)-FIG. 24 (2400) depict square frusta apertures for the RSEs, one skilled in the art will recognize that these indentations in the surface of the cylinder structures could be rectangular, polygonal, or conical in construction without departing from the spirit of the invention.

Furthermore, the number and placement of the frusta on the circumference of the cylinder may vary according to application. While many variations are possible, the present invention specifically anticipates the use of two, three, and four frusta placed on the circumference of the cylinder. Other anticipated variations include variations in the spacing of the frusta on the cylinder periphery, with equidistant spacing being the preferred, but not necessarily the only, method of frusta placement.

Additional Anticipated Applications

The present invention may be applied in a wide variety of contexts, some of which are preferred. Additional anticipated application contexts for the present invention utilizing charged plastic include but are not limited to the following:
Compensation in ambient dose and ambient dose rate H*;
Compensation in directional dose and directional dose rate H';
Compensation in personal dose and personal dose rate Hp; and
Compensation in air kerma accumulated (Ka).
One skilled in the art will recognize that this list is only exemplary of many applications possible for the present invention.

Preferred Embodiment Too View Isotropy (2500, 2600,2700,2800)

Figure 25:
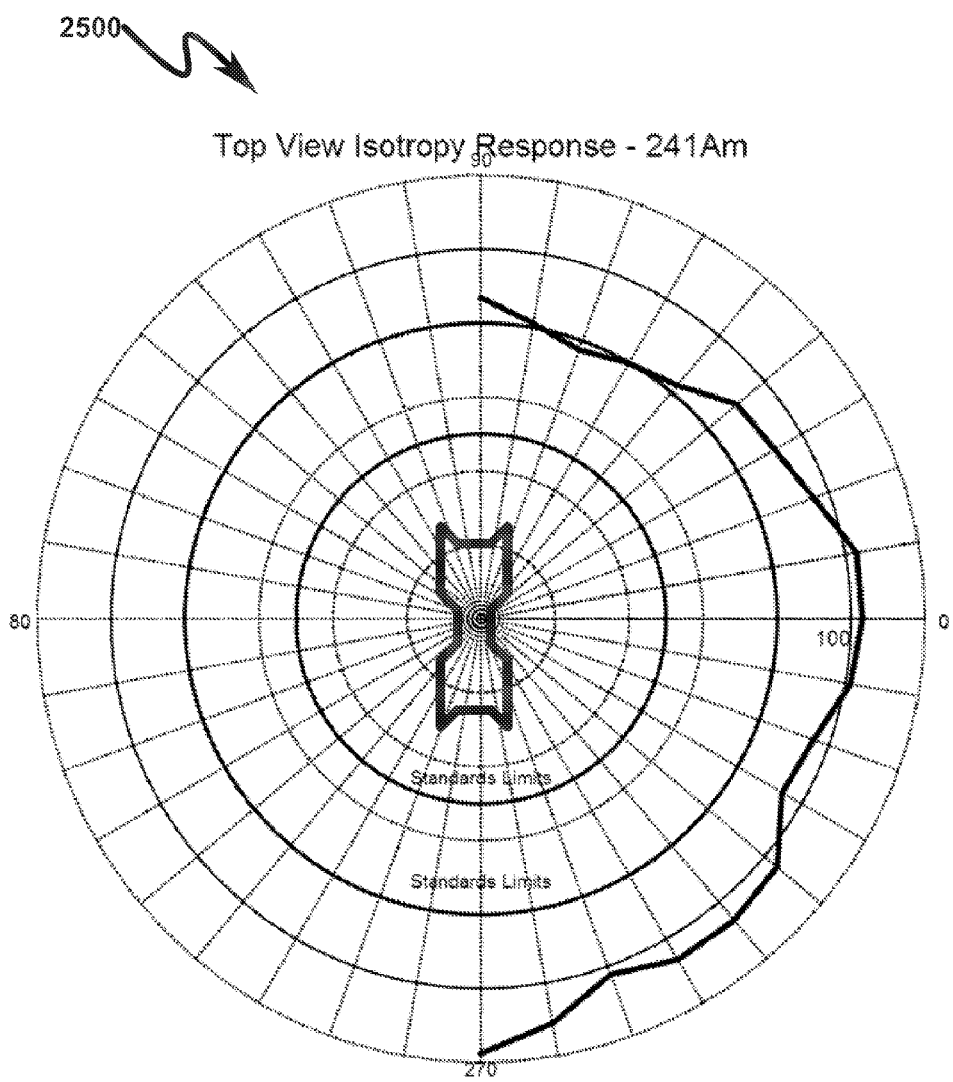
FIG. 25 illustrates an exemplary top view isotropy response curve for a preferred exemplary embodiment of the present invention for a 241Am radiation source.
Figure 26:
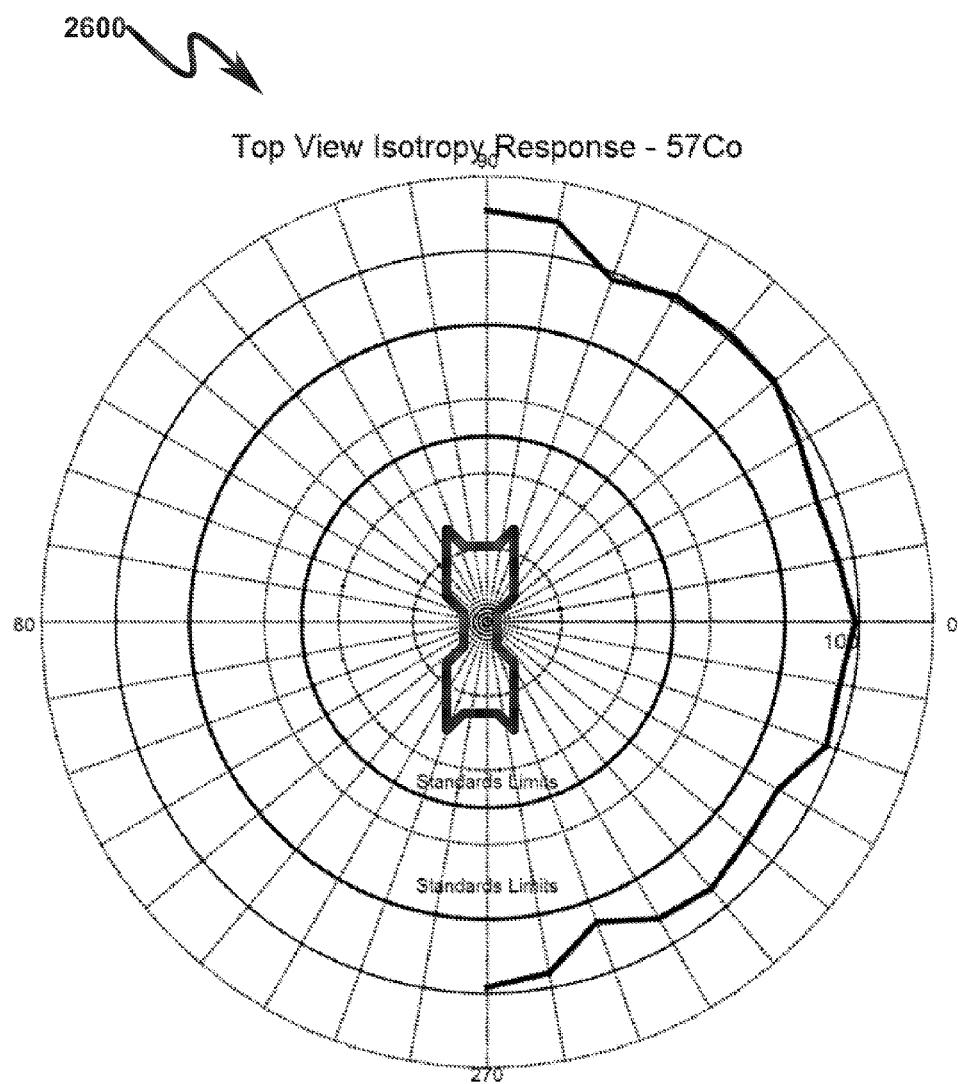
FIG. 26 illustrates an exemplary top view isotropy response curve for a preferred exemplary embodiment of the present invention for a 57Co radiation source.
Figure 27:
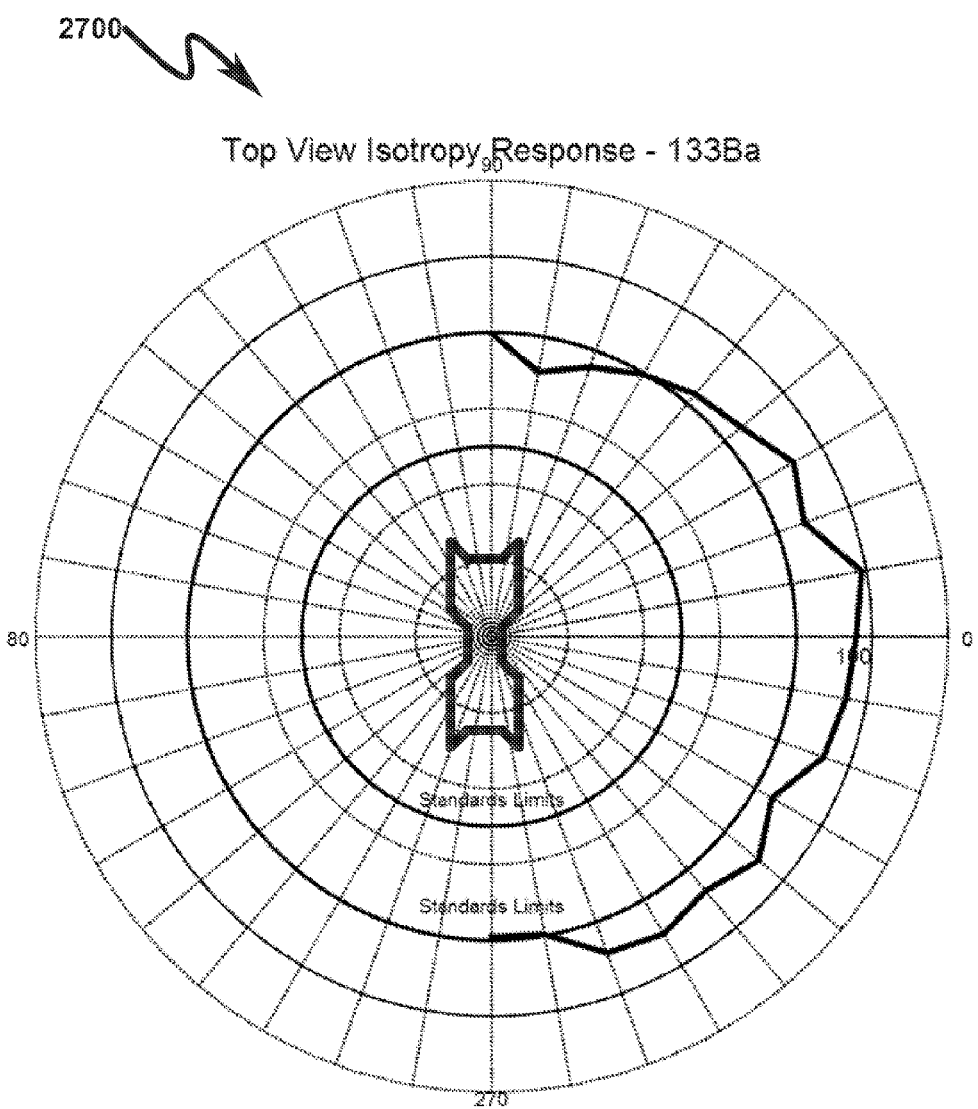
FIG. 27 illustrates an exemplary top view isotropy response curve for a preferred exemplary embodiment of the present invention for a 133Ba radiation source.
Figure 28:
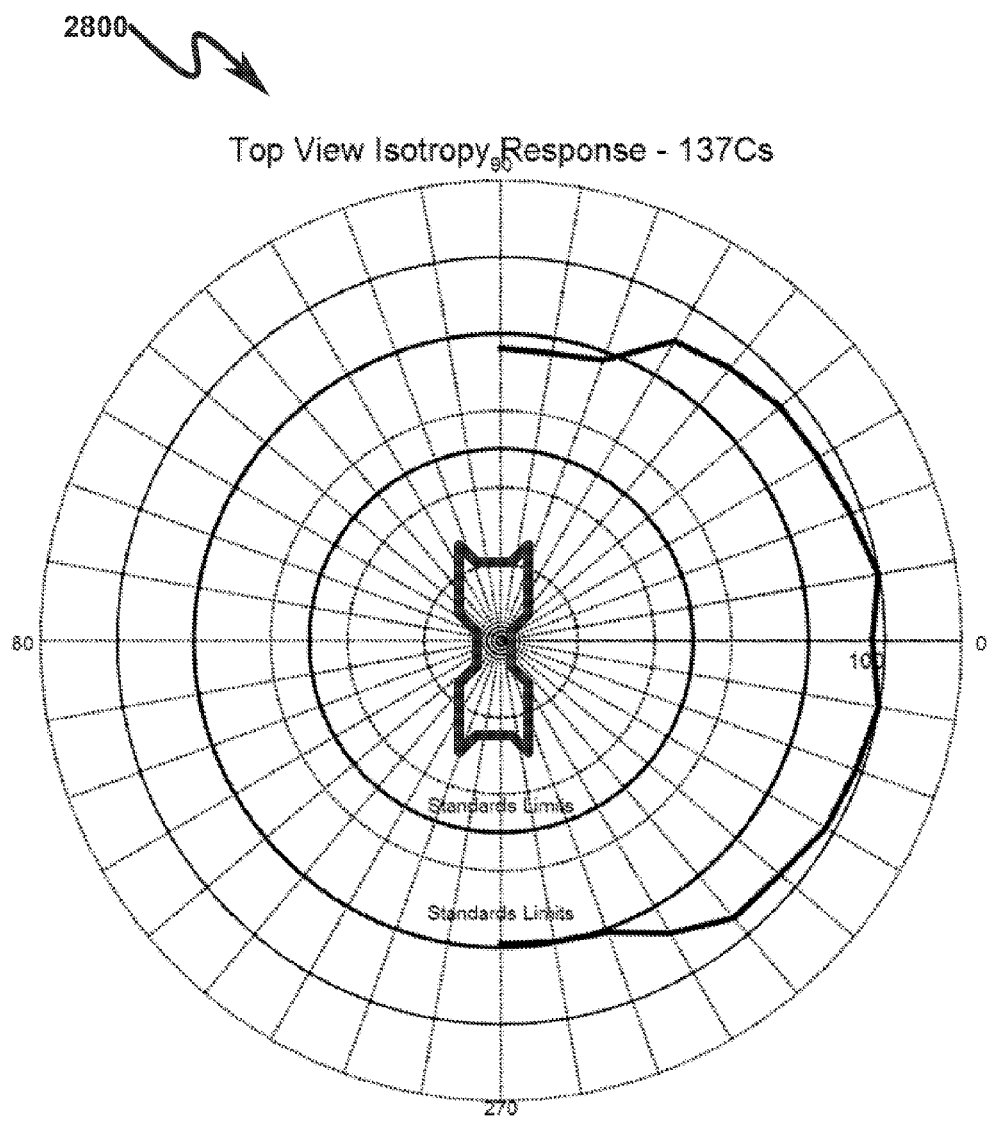
FIG. 28 illustrates an exemplary top view isotropy response curve for a preferred exemplary embodiment of the present invention for a 137Cs radiation source.

The preferred exemplary embodiment generally illustrated in FIG. 5 (0500), FIG. 6 (0600), and FIG. 9 (0900)-FIG. 16 (1600) may exhibit exemplary top view isotropy characteristics for a variety of radiation sources as generally illustrated in the measured responses of FIG. 25 (2500) (241Am), FIG. 26 (2600) (57Co), FIG. 27 (2700) (133Ba), and FIG. 28 (2800) (137Cs). These response graphs are normalized to 100% detection levels with appropriate standards limits as indicated.

Preferred Embodiment End View Isotropy (2900, 3000,3100,3200)

Figure 29:
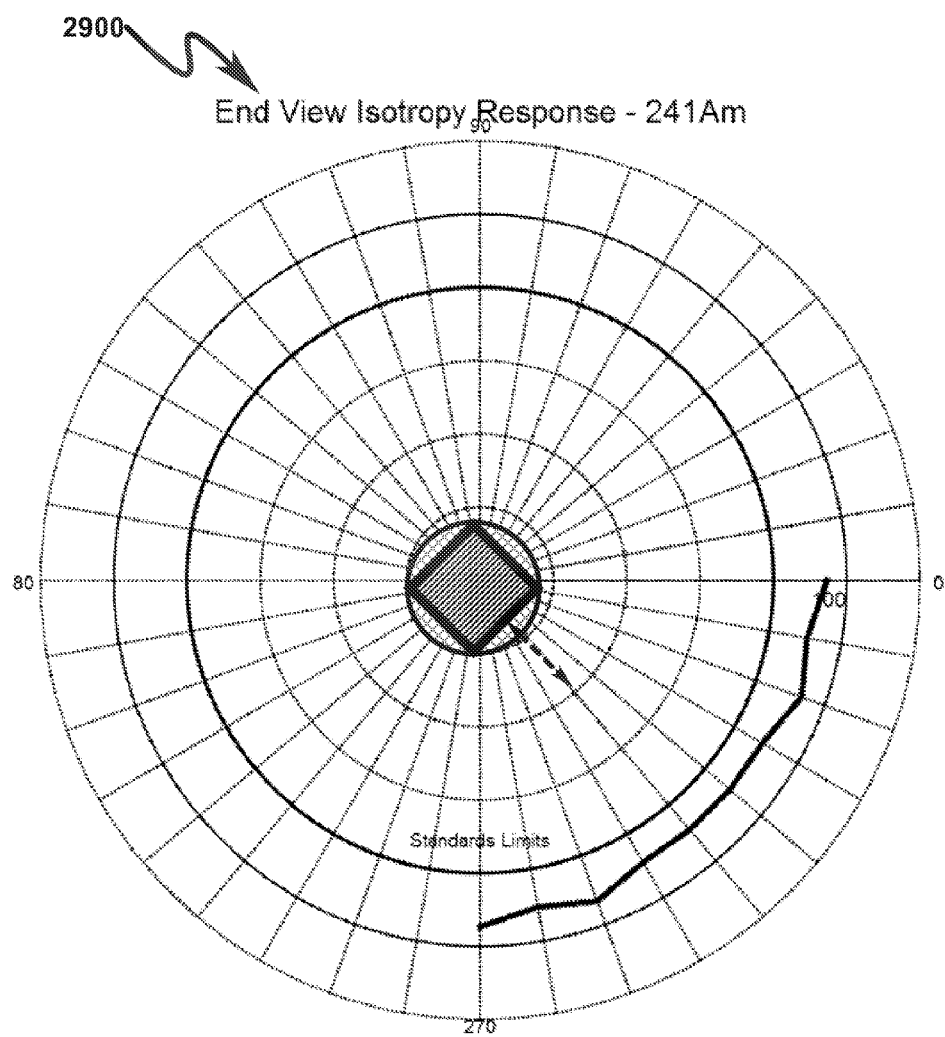
FIG. 29 illustrates an exemplary end view isotropy response curve for a preferred exemplary embodiment of the present invention for a 241Am radiation source.
Figure 30:
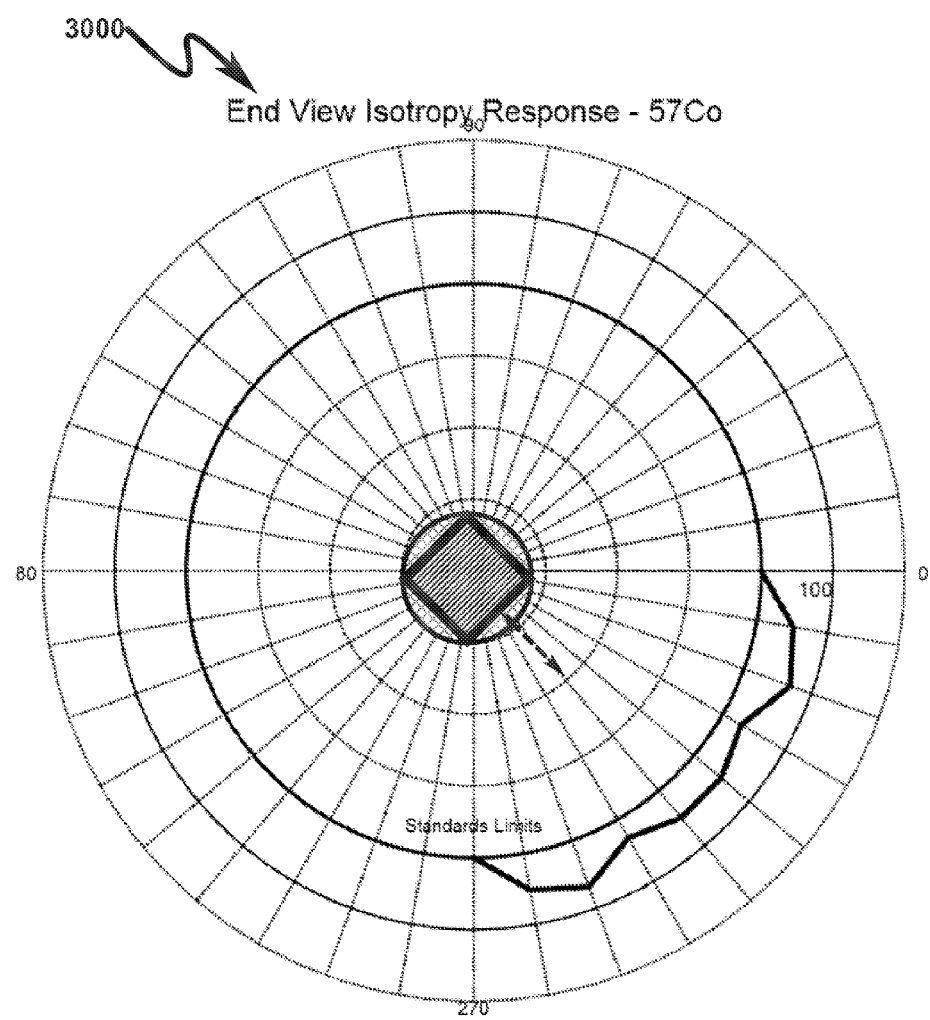
FIG. 30 illustrates an exemplary end view isotropy response curve for a preferred exemplary embodiment of the present invention for a 57Co radiation source.
Figure 31:
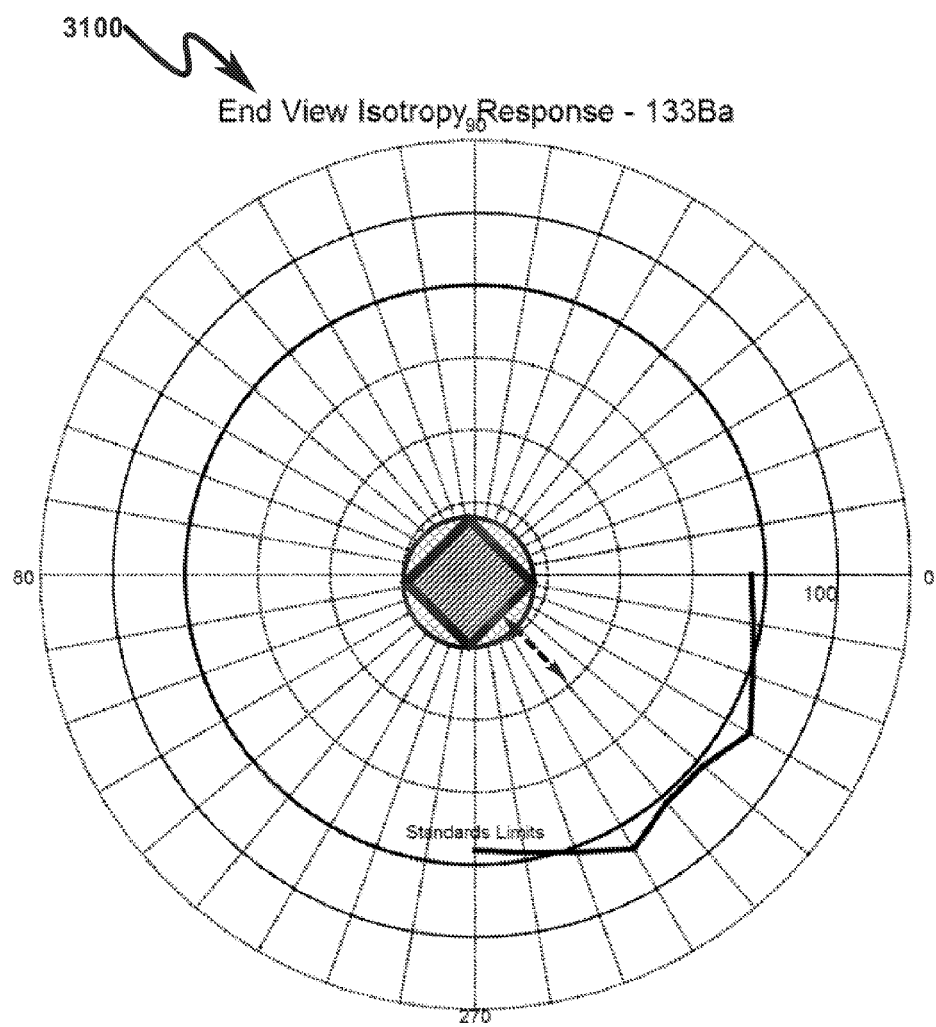
FIG. 31 illustrates an exemplary end view isotropy response curve for a preferred exemplary embodiment of the present invention for a 133Ba radiation source.
Figure 32:
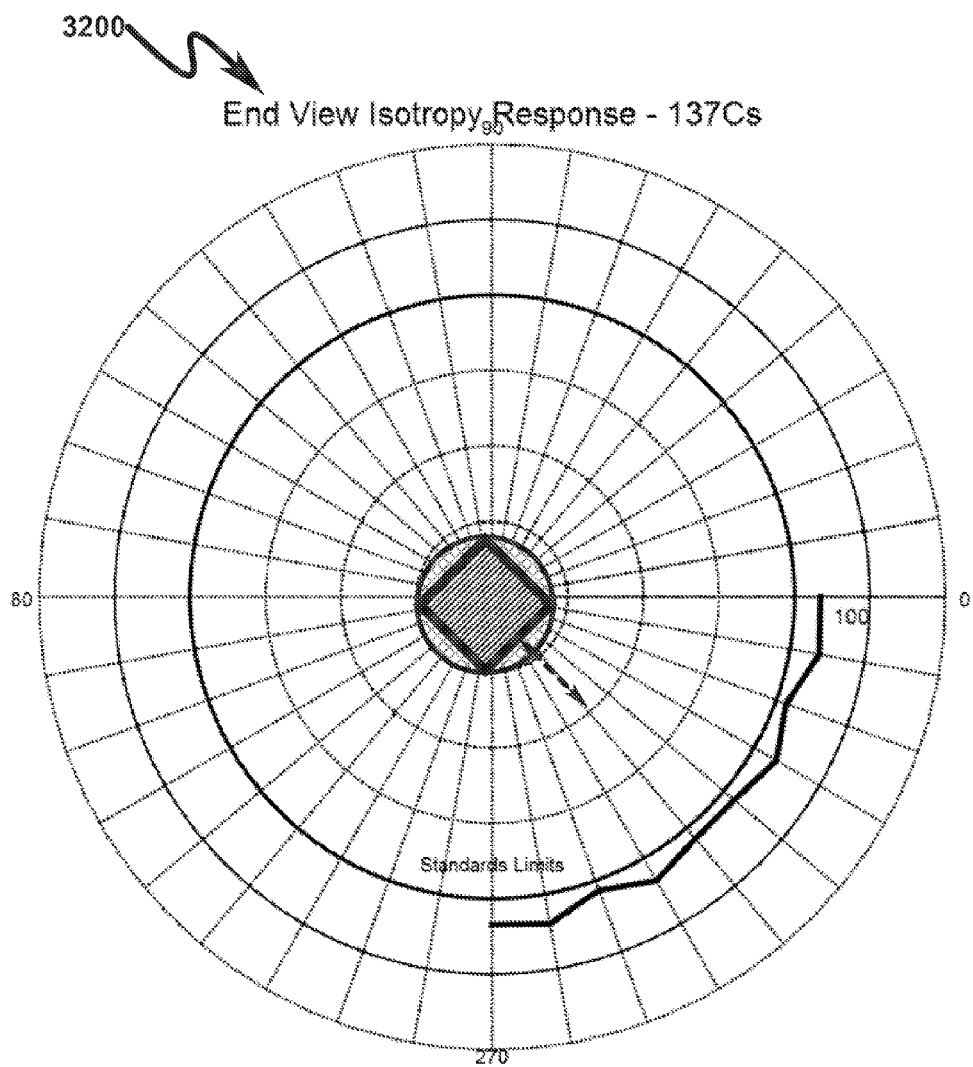
FIG. 32 illustrates an exemplary end view isotropy response curve for a preferred exemplary embodiment of the present invention for a 137Cs radiation source.

The preferred exemplary embodiment generally illustrated in FIG. 5 (0500), FIG. 6 (0600), and FIG. 9 (0900)-FIG. 16 (1600) may exhibit exemplary end view isotropy characteristics for a variety of radiation sources as generally illustrated in the measured responses of FIG. 29 (2900) (241Am), FIG. 30 (3000) (57Co), FIG. 31 (3100) (133Ba), and FIG. 32 (3200) (137Cs). These response graphs are normalized to 100% detection levels with appropriate standards limits as indicated.

Isotropy Standards Limits

With respect to the measured isotropy data depicted in FIG. 25 (2500)-FIG. 32 (3200), the following references determine the standards limits for acceptable isotropy when interpreting this data:
IEC 60846§8.4-VARIATION OF THE RESPONSE DUE TO PHOTON RADIATION ENERGY AND ANGLE OF INCIDENCE-8.4.1 MEASURING QUANTITY H*(0.07) OR H'(0.07)—The relative response due to radiation energy and angle of radiation incidence for photon radiation within the rated range of use shall be within the interval of 0.71 to 1.67 (with reference Table 5 in this standard). The minimum rated range of use covers energies between 10 keV and 250 keV and angles of radiation incidence between 0° and 45°. For angles of radiation incidence outside the rated range up to 90° the relative response shall be stated by the manufacturer for all radiation energies of the rated range.
ANSI 42.17A-§7.7—ANGULAR DEPENDENCE-7.7.1 REQUIREMENTS—The mean response of an instrument to a photon radiation incident at any angle not exceeding 45° from the direction of maximum response of the instrument shall be not less than 80% of this maximum response. At an angle of 90° from the direction of maximum response, the mean instrument reading shall be not less than 50% of the maximum response. These requirements apply for at least two representative photon energies. The mean response of an instrument to a beta radiation incident at any angle ≤45° from the direction of maximum response of the instrument should be ≥50% of this maximum response.

As can be observed from the measured data isotropy graphs of FIG. 25 (2500)-FIG. 32 (3200), the preferred exemplary embodiments of the present invention achieve substantial conformance with these radiation measurement standards.

Exemplary Energy Response Characteristics (3300)

Figure 33:
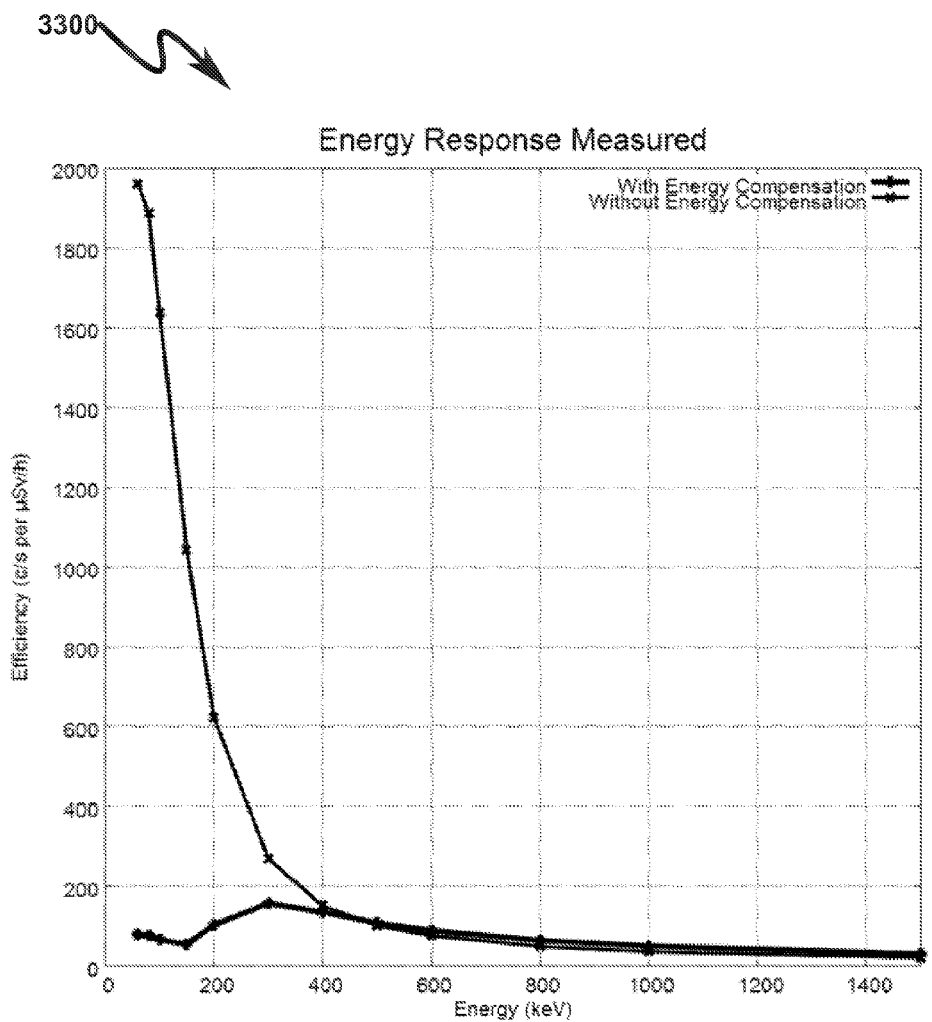
FIG. 33 illustrates an exemplary graph depicting energy response characteristics with and without energy response compensation as taught by the present invention.

FIG. 33 (3300) illustrates an exemplary graph depicting energy response characteristics with and without energy response compensation as taught by the present invention. As can be seen by the provided data, the present invention permits energy response compensation over a wide range of incident energy values.

Preferred Embodiment System Enclosure (3400)-(4000)

Figure 34:
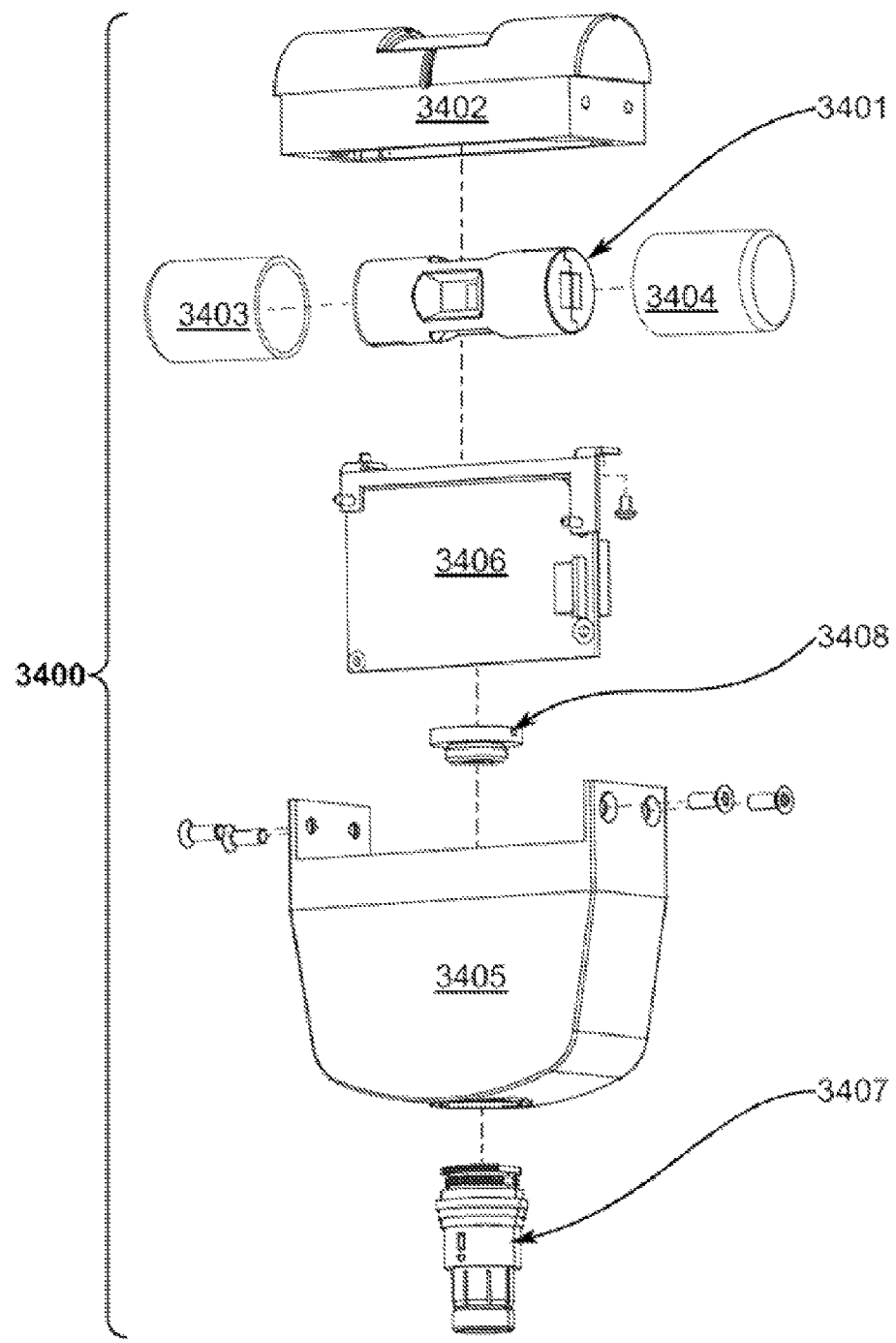
FIG. 34 illustrates an assembly view of an exemplary system enclosure suitable for some preferred application embodiments of the present invention.
Figure 40:
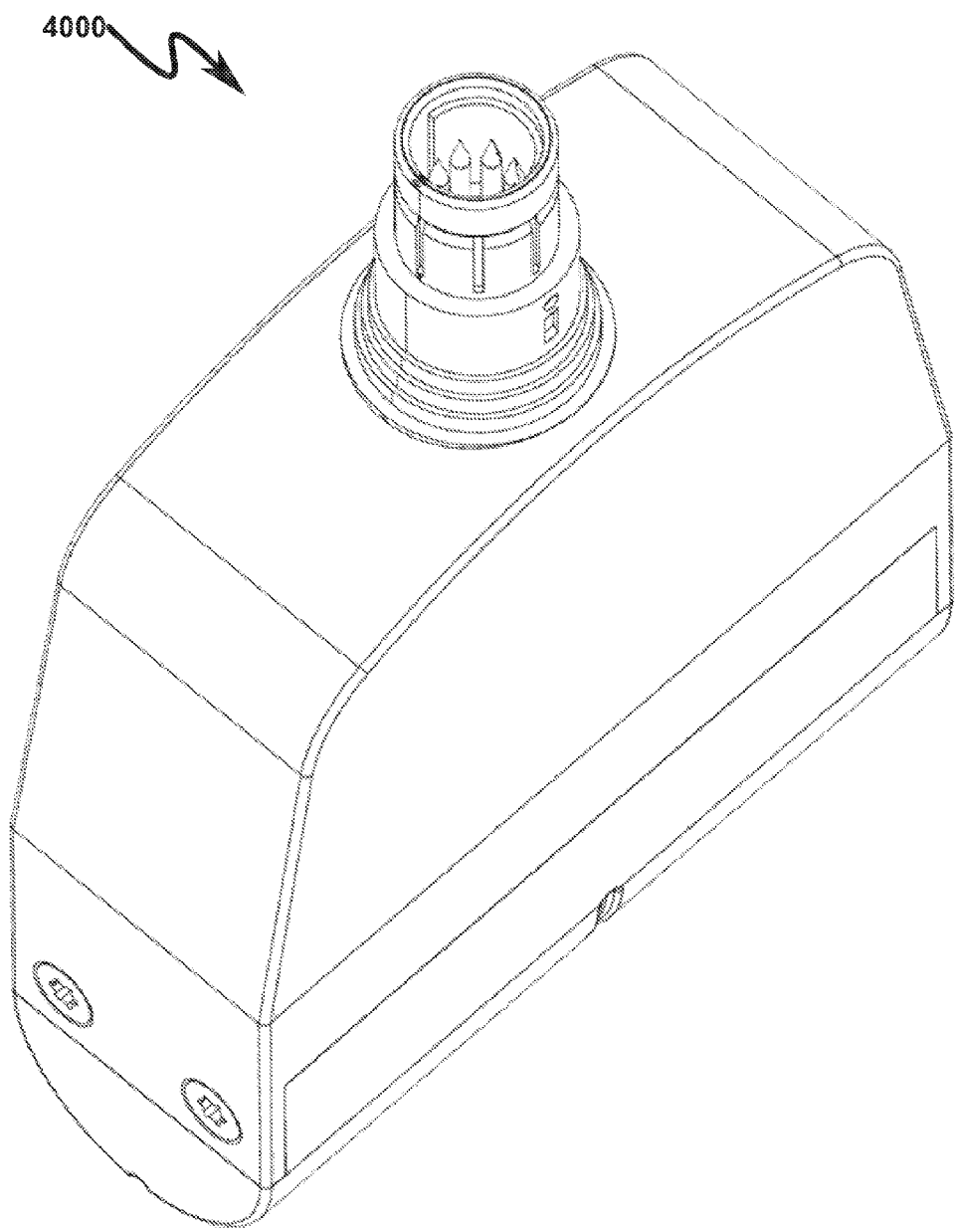
FIG. 40 illustrates a perspective view of an exemplary system enclosure suitable for some preferred embodiments of the present invention.

Many preferred exemplary system embodiments of the present invention may be configured in an integrated system enclosure as generally illustrated within FIG. 34 (3400)-FIG. 40 (4000). Note that these enclosures provide space for mounting the radiation detector housing (and associated RSEs) with associated conditioning circuitry on a printed circuit board (PCB) or other suitable substrate.

Figure 35:
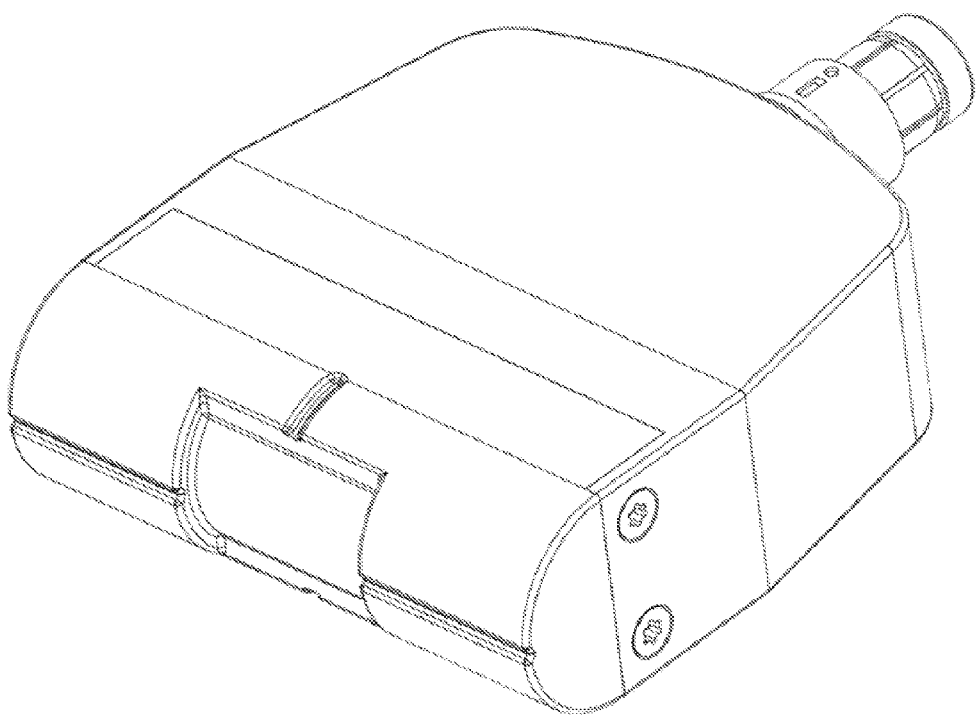
FIG. 35 illustrates a perspective view of an exemplary system enclosure suitable for some preferred embodiments of the present invention.
Figure 36:
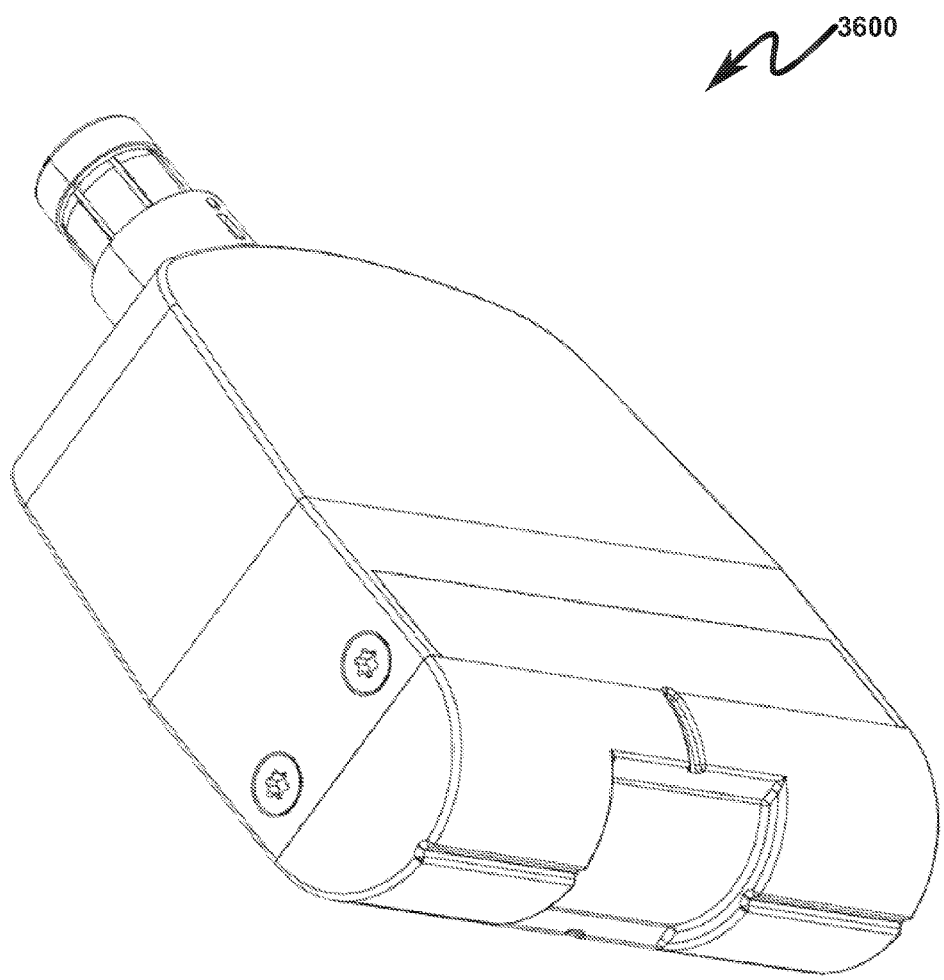
FIG. 36 illustrates a perspective view of an exemplary system enclosure suitable for some preferred embodiments of the present invention.
Figure 37:
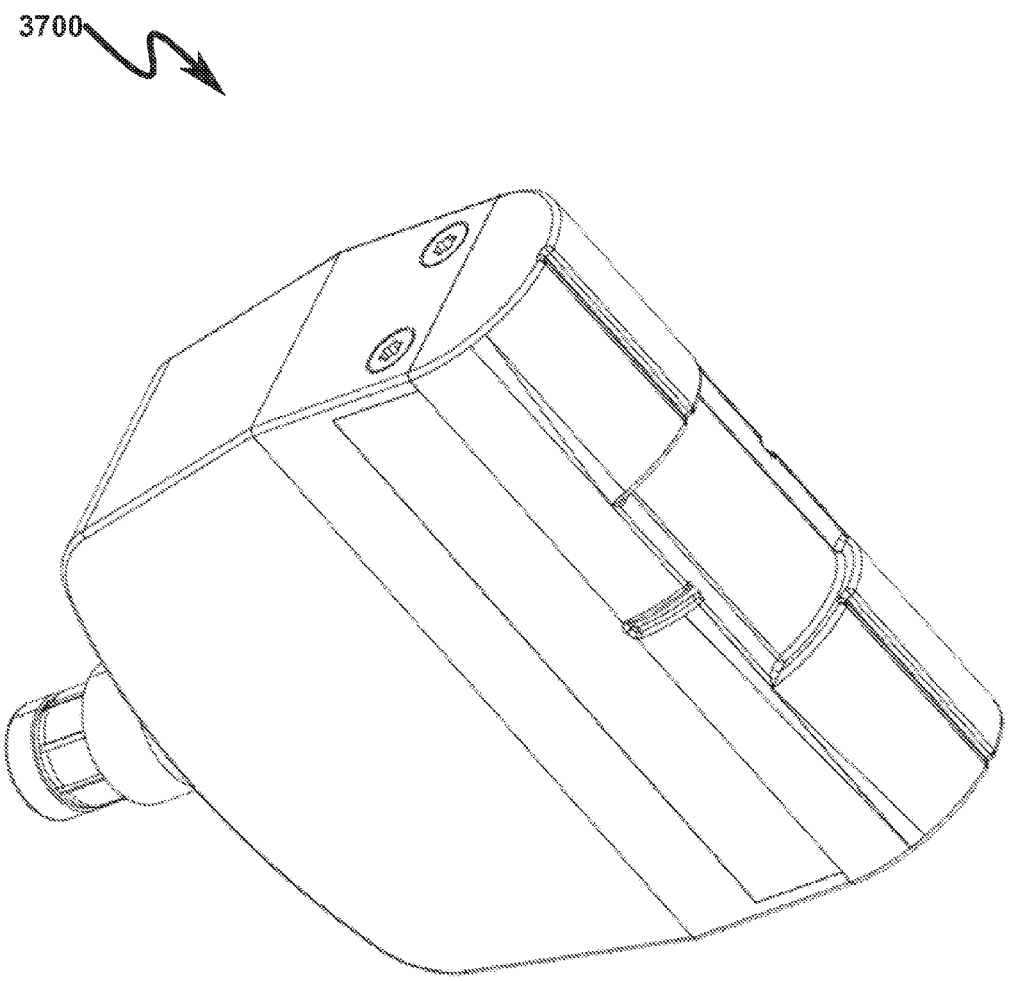
FIG. 37 illustrates a perspective view of an exemplary system enclosure suitable for some preferred embodiments of the present invention.
Figure 38:
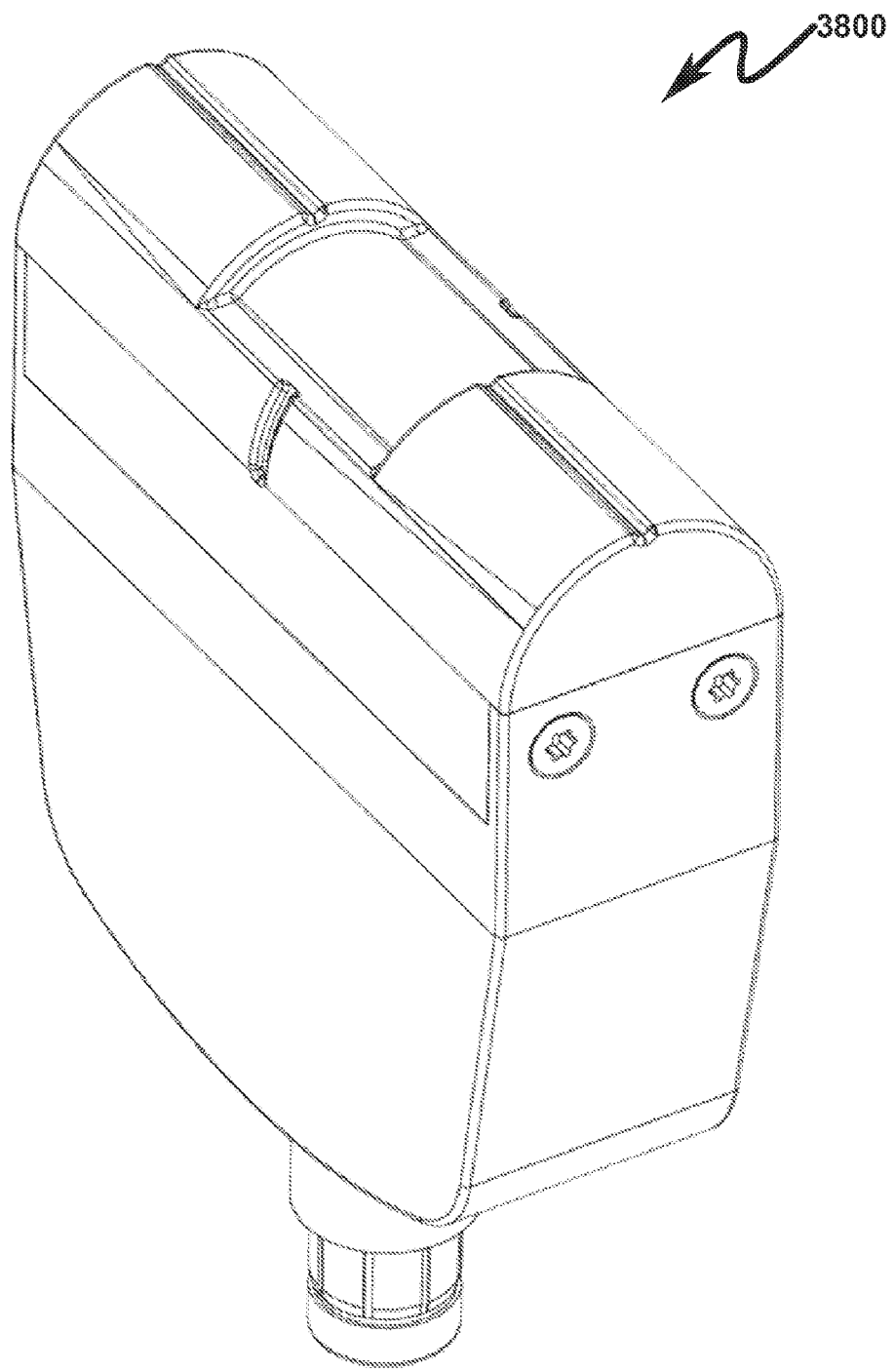
FIG. 38 illustrates a perspective view of an exemplary system enclosure suitable for some preferred embodiments of the present invention.
Figure 39:
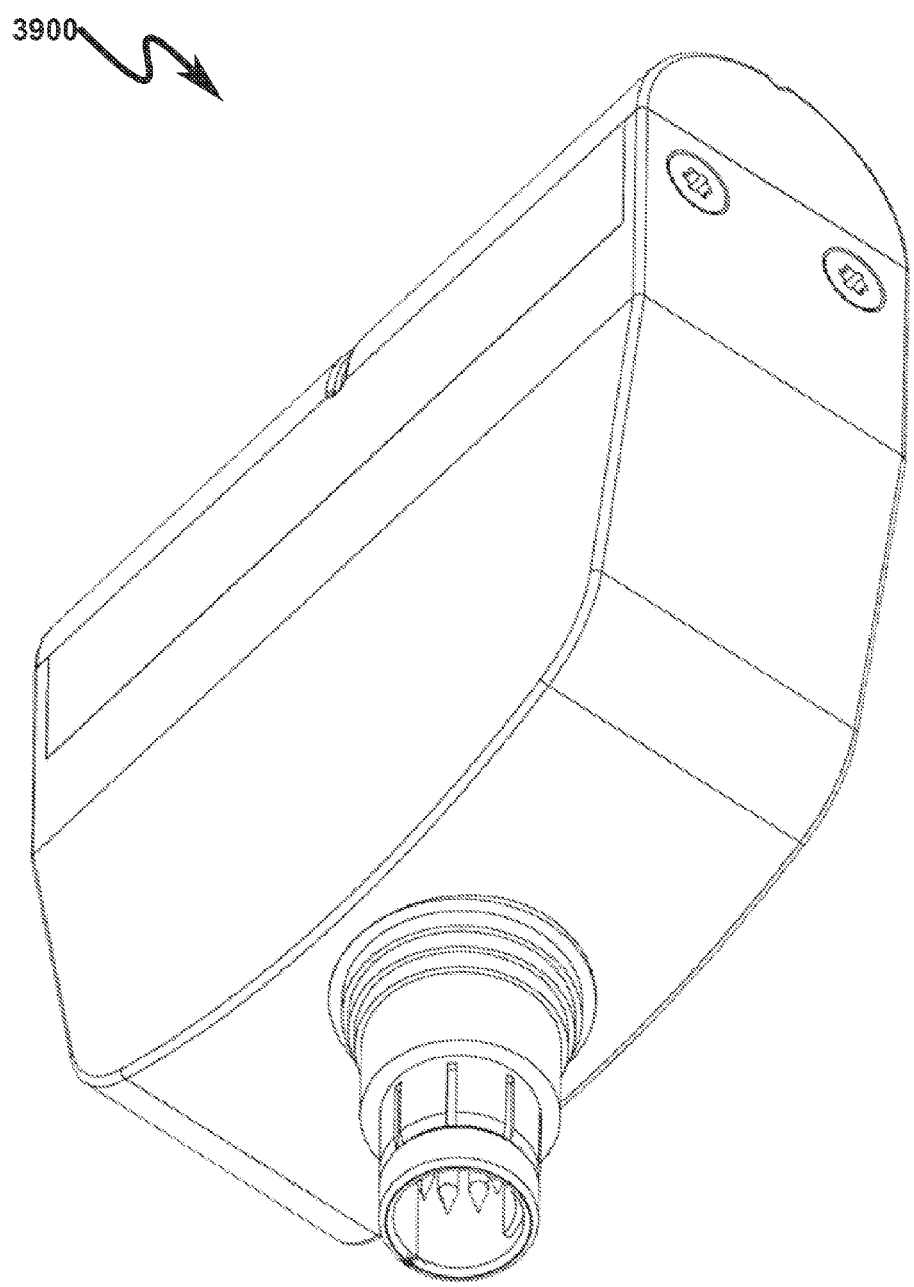
FIG. 39 illustrates a perspective view of an exemplary system enclosure suitable for some preferred embodiments of the present invention.

As generally illustrated by the assembly view of FIG. 34 (3400) and the perspective views of FIG. 35 (3500)-FIG. 40 (4000), an exemplary embodiment of the present invention (3401) in the form of a cylinder embodiment may be surrounded by a face shield (3402), end covers (3403, 3404), and system housing (3405) that may incorporate integrated circuit boards (3406) and interface connectors (3407) and connector retaining means (3408). One skilled in the art will recognize that this system enclosure configuration is only exemplary of many that are possible using the present invention.

As generally illustrated in FIG. 34 (3400), the form factor associated with the cylinder embodiment (3401) of the present invention in this context is near optimal, as this configuration permits safe enclosure of the radiation detector while simultaneously providing for isotropic response characteristics and dose rate compensation characteristics not possible using detectors as taught by the prior art.

Exemplary Tungsten Charged Plastic (4100, 4200, 4300)

Figure 42:
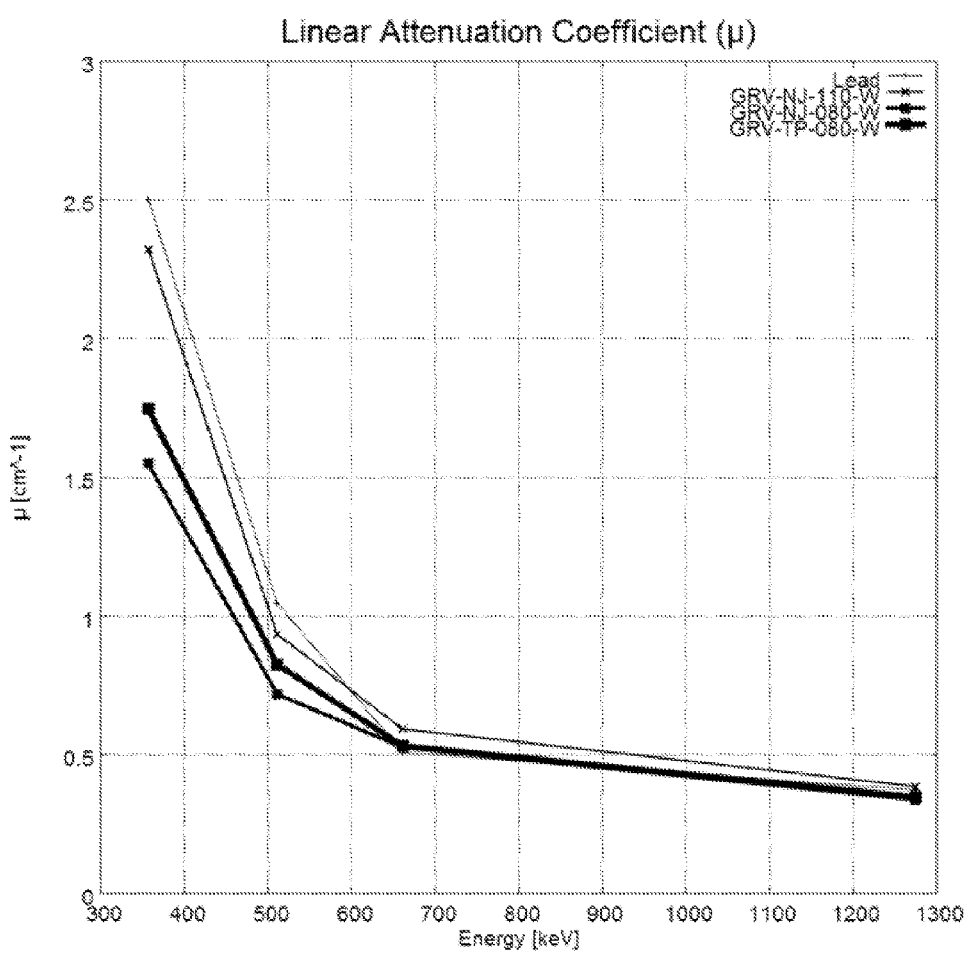
FIG. 42 illustrates typical attenuation characteristics of an exemplary tungsten charged plastic material useful as a construction material for some preferred embodiments of the present invention.
Figure 43:
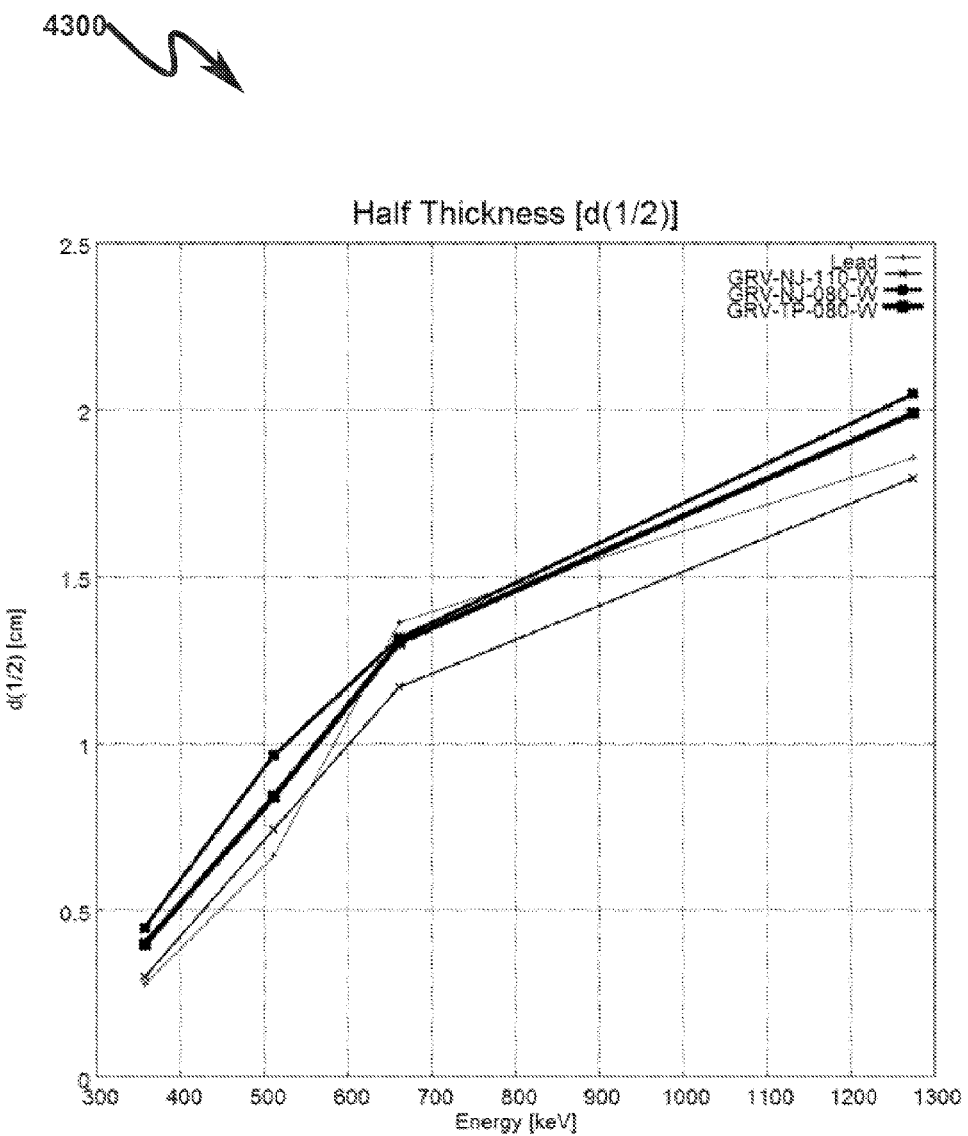
FIG. 43 illustrates typical half thickness characteristics of an exemplary tungsten charged plastic material useful as a construction material for some preferred embodiments of the present invention.

While the present invention teaches that a wide variety of materials may be used as the "charging" material for the charged plastic injection molded structures detailed within to enable energy compensation of the overall radiation detector, tungsten charged injection molded plastic is thought to be optimal in many preferred embodiments. Within this context, a typical tungsten charged plastic material that may be of use in some preferred embodiments is available from PolyOne Th. Bergmann GmbH, Adolf-Dambach-Straβe 2, 76571 Gaggenau, Germany under their GraviTech brand of plastics. Typical physical characteristics of this plastic (GRV-TP-080-W) are detailed in FIG. 41 (4100), with typical linear attenuation characteristics listed in FIG. 42 (4200) and typical half-thickness characteristics detailed in FIG. 43 (4300).

The present invention is not limited to the use of tungsten charged plastic or this particular brand of plastic, but this selection may be deemed optimal in many currently preferred invention embodiments. Note that the characteristics listed in FIG. 41 (4100)-FIG. 43 (4300) are typical characteristics and may vary widely in practice. One skilled in the art will no doubt be able to take the information from these figures and propose other types and sources of charged plastic to affect other variants of the present invention.

Aperture Port Angle Variations (4400)

While the exemplary embodiments generally illustrated in FIG. 5 (0500)-FIG. 24 (2400) depict frusta apertures having a 45-degree port angle (generally defined herein as the angle of the frusta surface with respect to the plane of the outer surface of the enclosure (for example, the distal end of the cylinder surface)) for the RSEs, one skilled in the art will recognize that the present invention is not necessarily limited to 45-degree frusta aperture port angles, and that other aperture port angles may be implemented without departing from the spirit of the invention.

As generally illustrated in FIG. 44 (4400) in the tubular embodiment of the radiation detector housing (4410) and the side sectional view (4420), the RSE port aperture (4421) serves to allow incident radiation to be received in a RSE cavity (4422) that contains the RSE (4423) within the detector housing. As detailed herein (4424), the RSE port aperture (4421) need not fully expose the RSE (4423) within the RSE cavity (4422). The port aperture angle (4425) as illustrated can vary widely depending on the particular application for the radiation detector and is here shown at 45°. However, the present invention anticipates that this angle may vary between approximately 15° to approximately 90° depending on the particular radiation detector application.

Aperture Port Variations (4500, 4600)

Figure 45:
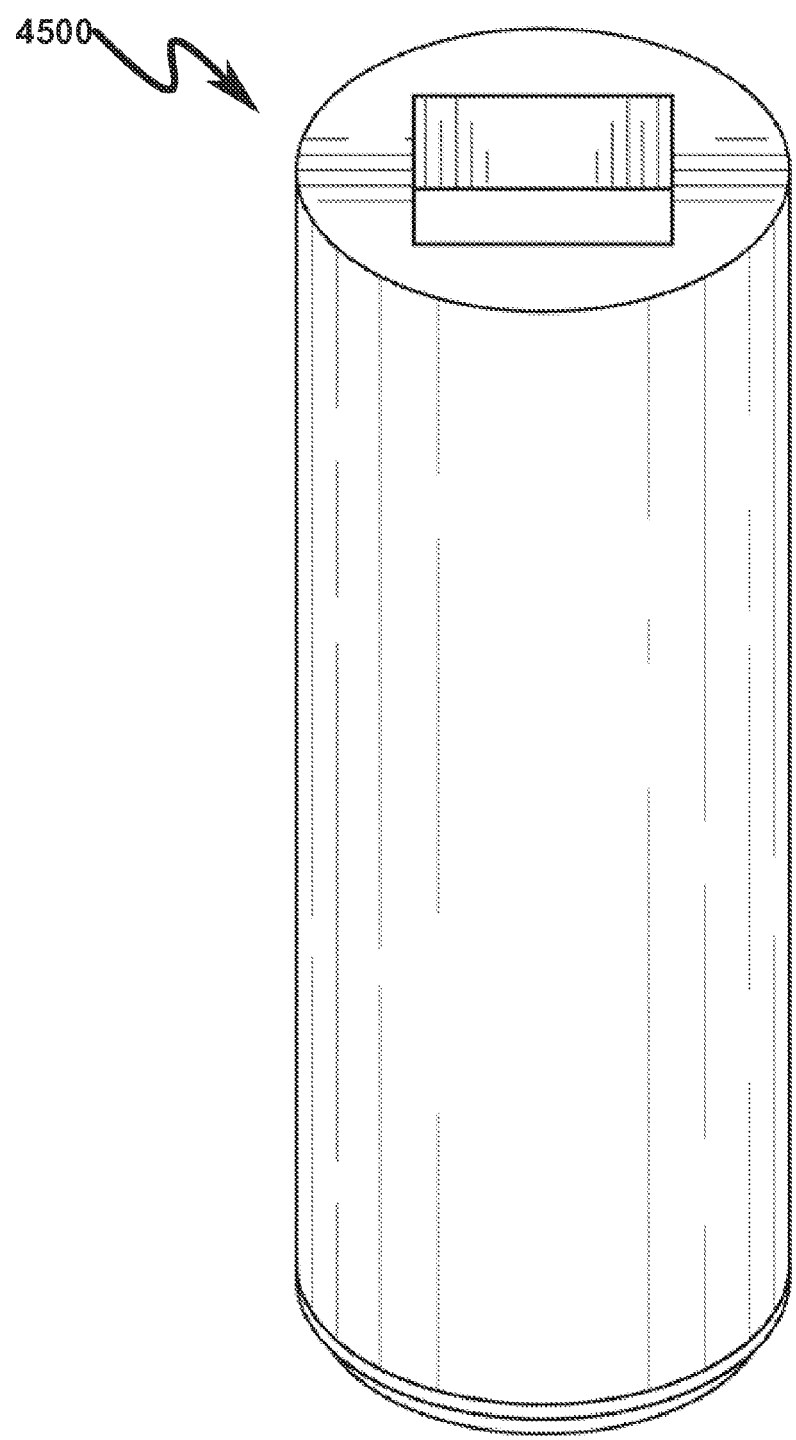
FIG. 45 illustrates a perspective view of a preferred exemplary embodiment of the present invention depicting a square aperture port.
Figure 46:
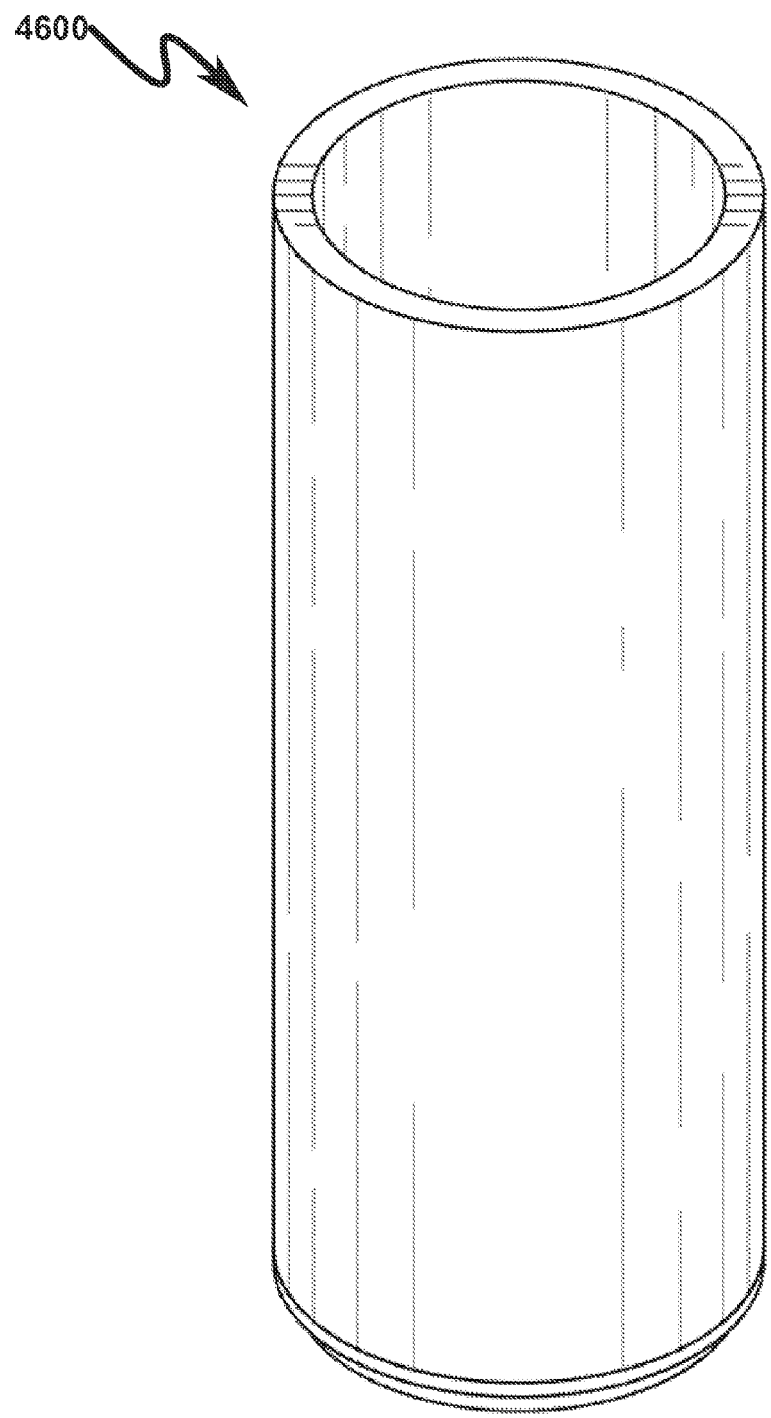
FIG. 46 illustrates a perspective view of a preferred exemplary embodiment of the present invention depicting a circular aperture port.

The present invention anticipates a wide variety of aperture port variations in the overall scope of the invention concept. As generally illustrated in FIG. 45 (4500), the aperture port can also be square (rectangular) and have 90° port aperture angles. Other polygonal structures are also anticipated and within the scope of the claimed invention. As generally illustrated in FIG. 46 (4600), the aperture port may also be cylindrical in structure.

These two examples illustrate that the frusta associated with the aperture port can have a wide degree of variation. Furthermore, it should be noted that the "cavities" associated with the aperture port need not be evacuated, but could be filled (using a thermoplastic injection technique) using a low-Z plastic that does not inhibit transmission of radiation. Thus, the aperture ports detailed herein may in fact be "filled" to the exterior surface of the radiation detector housing. Thus, frusta associated with the present invention may be "filled", or "evacuated", "drilled", and/or "drilled-filled" (as detailed below) based on a variety of application dependent requirements.

Drilled Frusta Variations (4700, 4800)

Figure 47:
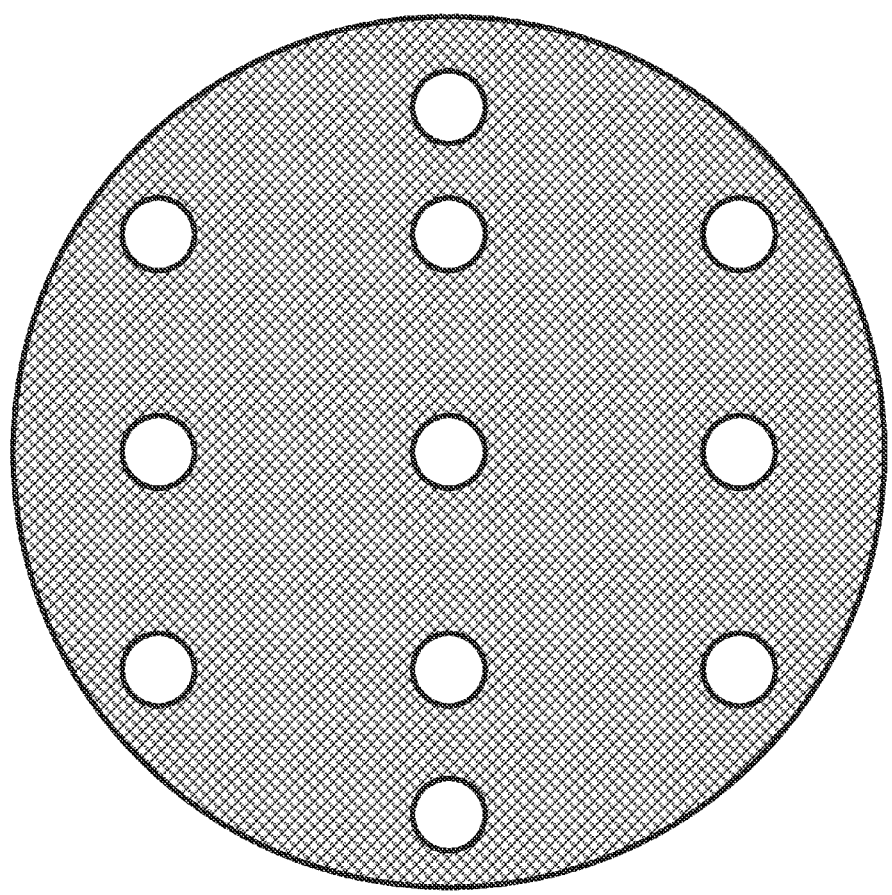
FIG. 47 illustrates a cross section view of a preferred exemplary embodiment of the present invention depicting a "drilled" frusta aperture port having non-uniform hole symmetry.

The frusta associated with the aperture ports in many preferred embodiments of the present invention may also be "drilled" as generally illustrated in FIG. 47 (4700) and FIG.

48 (4800). In these alternative embodiments the aperture port characteristics are determined by drilling/milling/molding holes within the aperture port to permit radiation to enter the radiation detector housing and impinge on the RSE.

Figure 48:
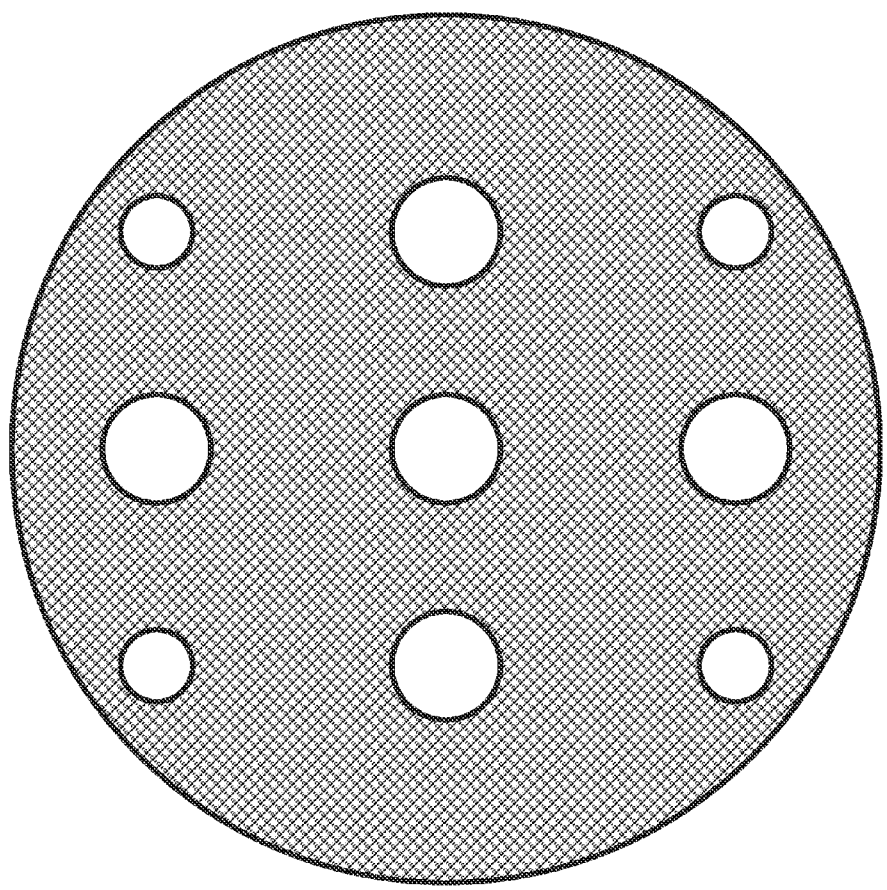
FIG. 48 illustrates a cross section view of a preferred exemplary embodiment of the present invention depicting a "drilled" frusta aperture port having differing sized holes.

As generally illustrated in FIG. 47 (4700), these holes may be placed in an (not necessarily symmetric) array, and may be comprised of different sized holes as generally illustrated in FIG. 48 (4800). This approach has practical manufacturing advantages because a "blank" radiation detector housing can be injection molded and then "drilled" using programmed CNC drilling/milling operations to generate a custom radiation detector based on just-in-time desired radiation detector characteristics. This allows rapid deployment of custom radiation detectors without the need for costly preparation and certification of injection molds and other apparatus. One skilled in the art will recognize that a variety of computer numeric controlled (CNC) drilling/milling/machining operations are possible to achieve the desired customized "drilled" frusta configurations illustrated in FIG. 47 (4700) and FIG. 48 (4800). Of course, injection molding can also be used to fabricate these structures as this is well within the skill level of the plastic injection molding industry.

Drilled Frusta Examples (4900)-(5400)

Figure 49:
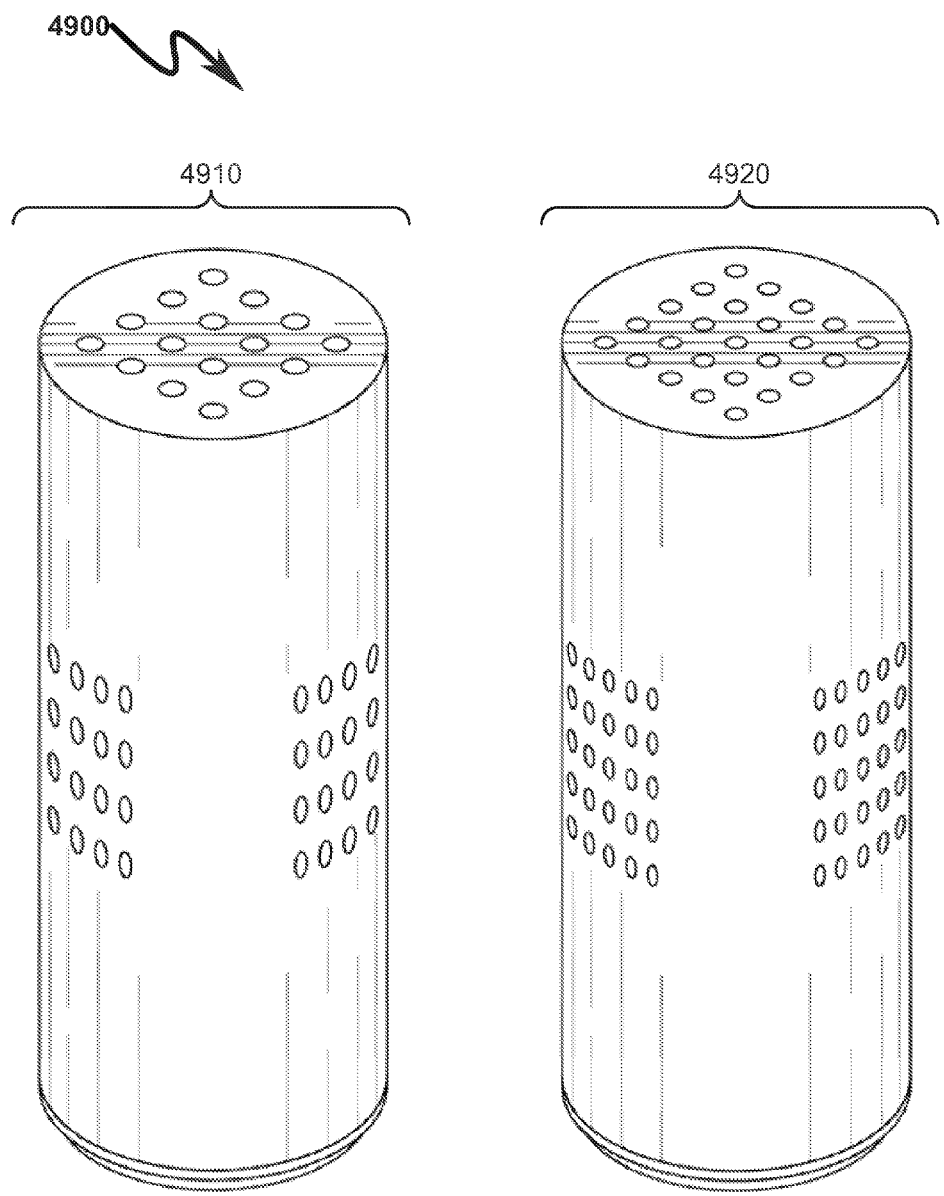
FIG. 49 illustrates perspective views of preferred exemplary embodiments of the present invention depicting a "drilled" frusta 4×4 aperture port and a "drilled" frusta 5×5 aperture port.
Figure 50:
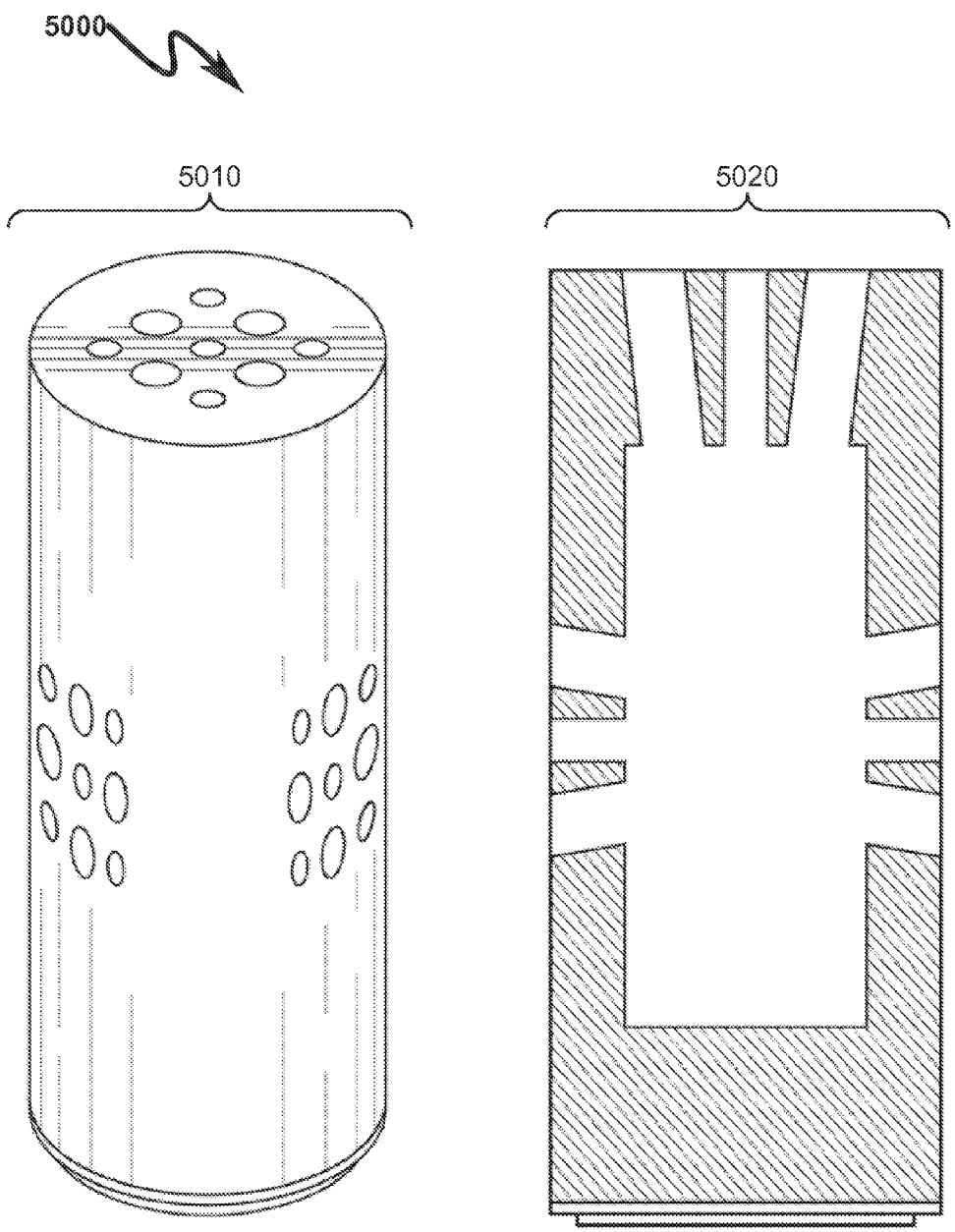
FIG. 50 illustrates perspective and sectional views of a preferred exemplary embodiment of the present invention depicting a "drilled" frusta 3×3 non-uniform aperture port.
Figure 51:
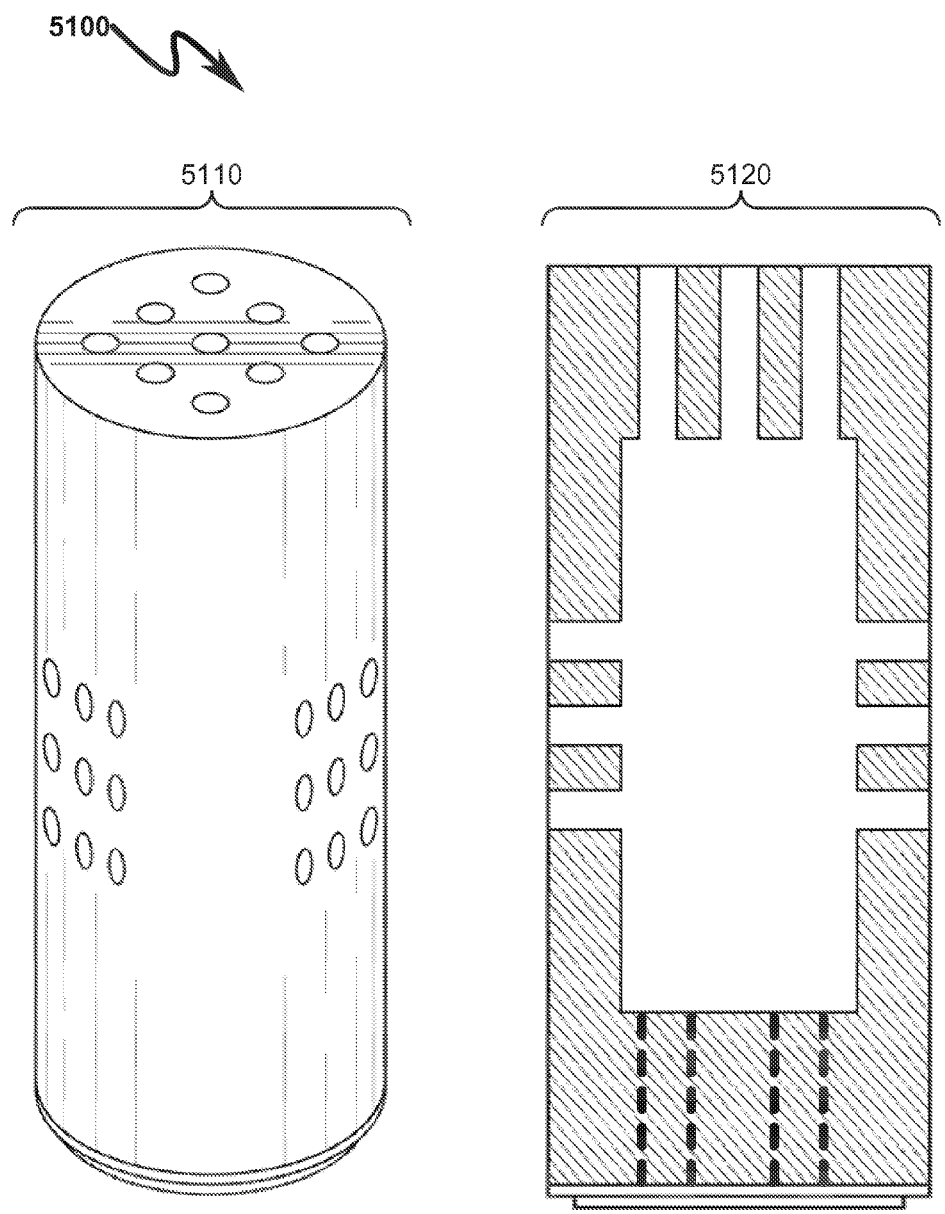
FIG. 51 illustrates perspective and sectional views of a preferred exemplary embodiment of the present invention depicting a "drilled" frusta 3×3 uniform aperture port having 90° aperture port angles.
Figure 54:
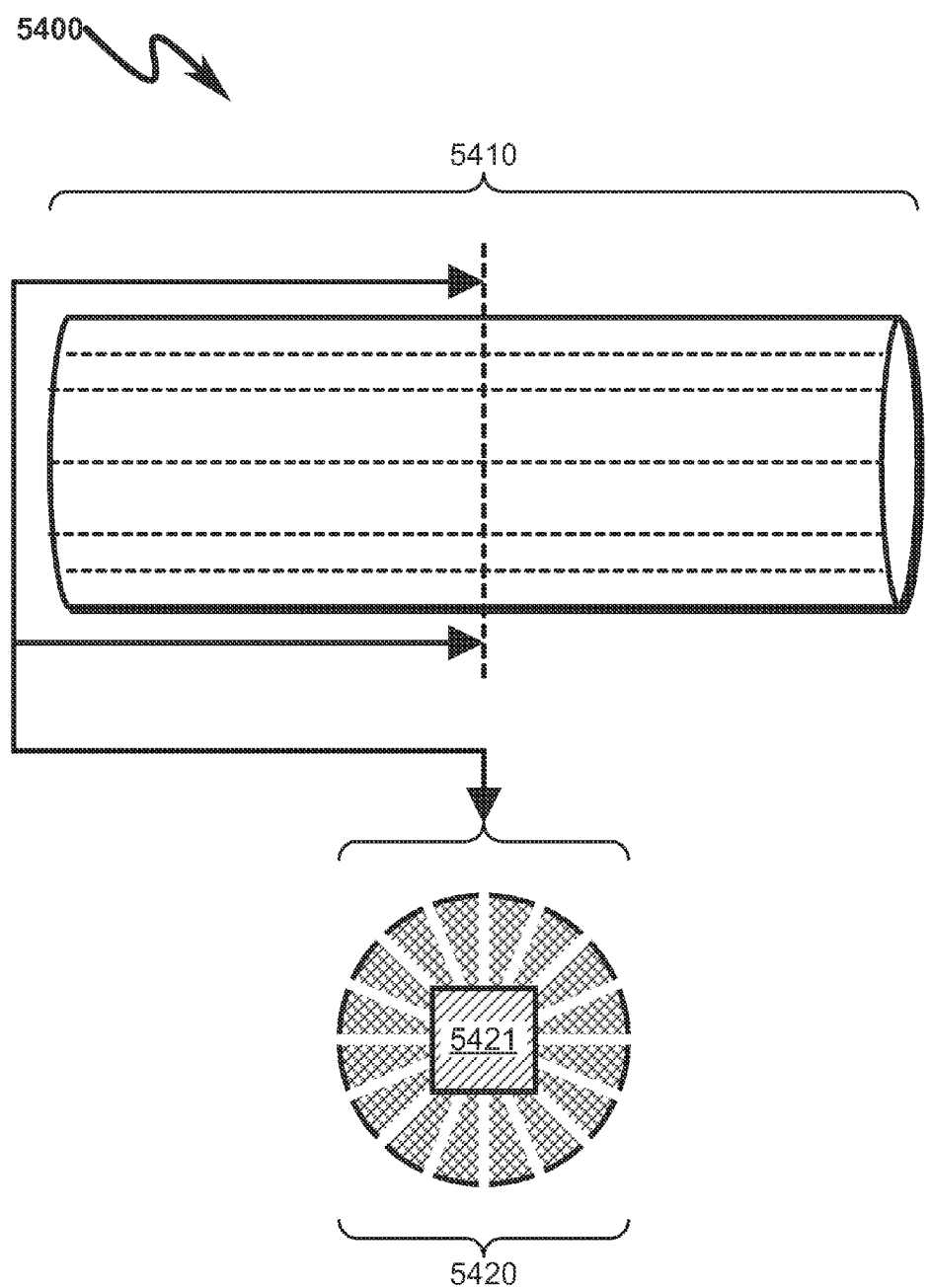
FIG. 54 illustrates perspective and sectional views of an exemplary system embodiment of the present invention incorporating "drilled" frusta.

While the use of "drilled" frusta within the scope of the present invention can have a wide range of application, several typical examples are generally illustrated in FIG. 49 (4900)-FIG. 54 (5400). In FIG. 49 (4900), a perspective view of a detector housing incorporating a 4×4 drilled frusta array (4910) is depicted along with a 5×5 drilled frusta array (4920), generally depicting that these drilled arrays can have a wide variety of symmetric and non-symmetric (anti-symmetric) configurations (see FIG. 47 (4700) and FIG. 48 (4800)). FIG. 50 (5000) illustrates the use of non-uniform drill sizing in the formulation of the drilled frusta in a perspective (5010) and sectional views (5020) and illustrates that the aperture port angle can still be achieved in using a drilled pattern. Also, not all sides of the radiation detector housing need be drilled to achieve an isotropic response from the overall detector. FIG. 51 (5100) illustrates a 3×3 drilled pattern perspective view (5110) and sectional view (5120) illustrating that the aperture port angle in some variants may be as high as approximately 90°.

Figure 52:
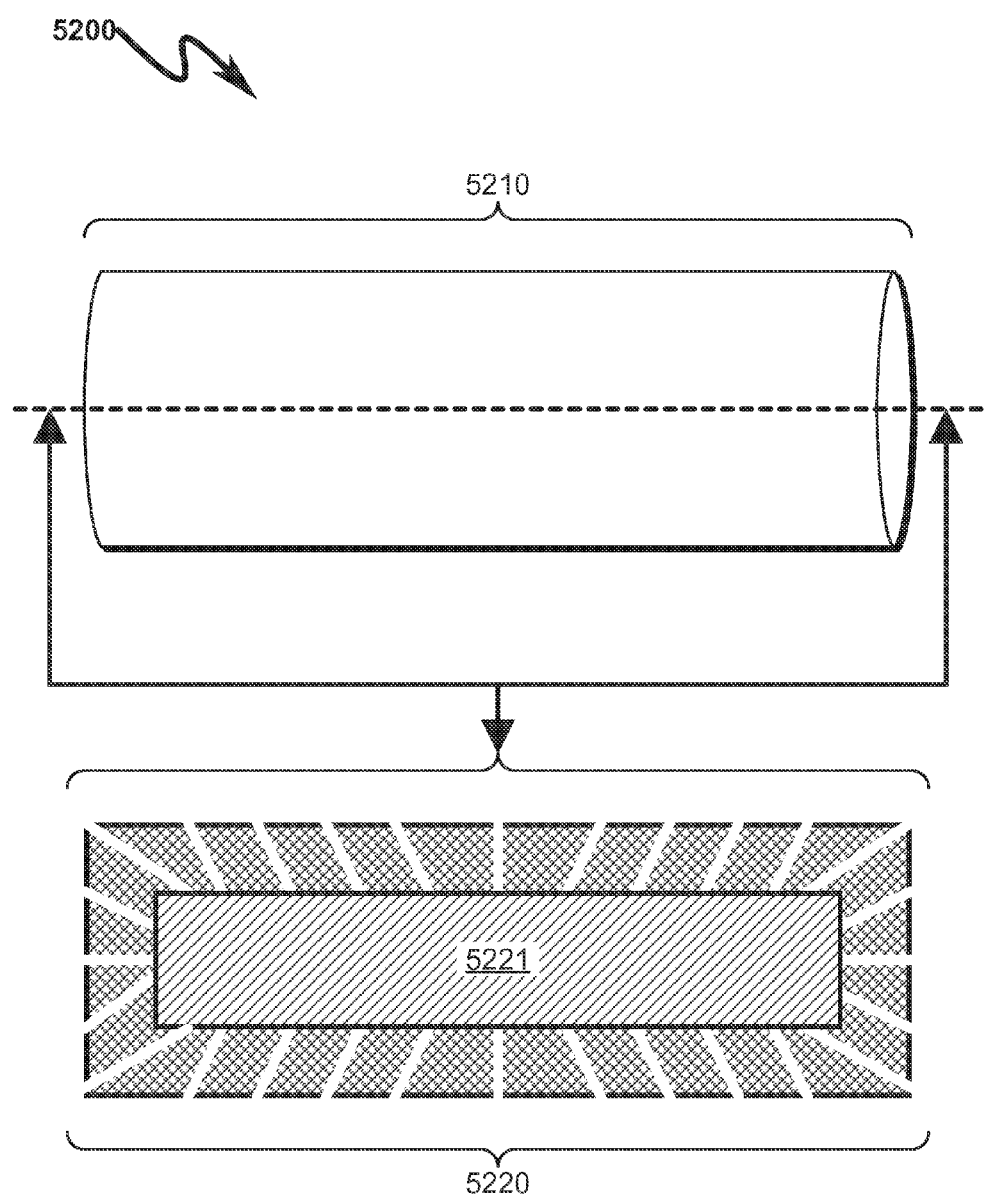
FIG. 52 illustrates perspective and sectional views of an exemplary system embodiment of the present invention incorporating "drilled" frusta.
Figure 53:
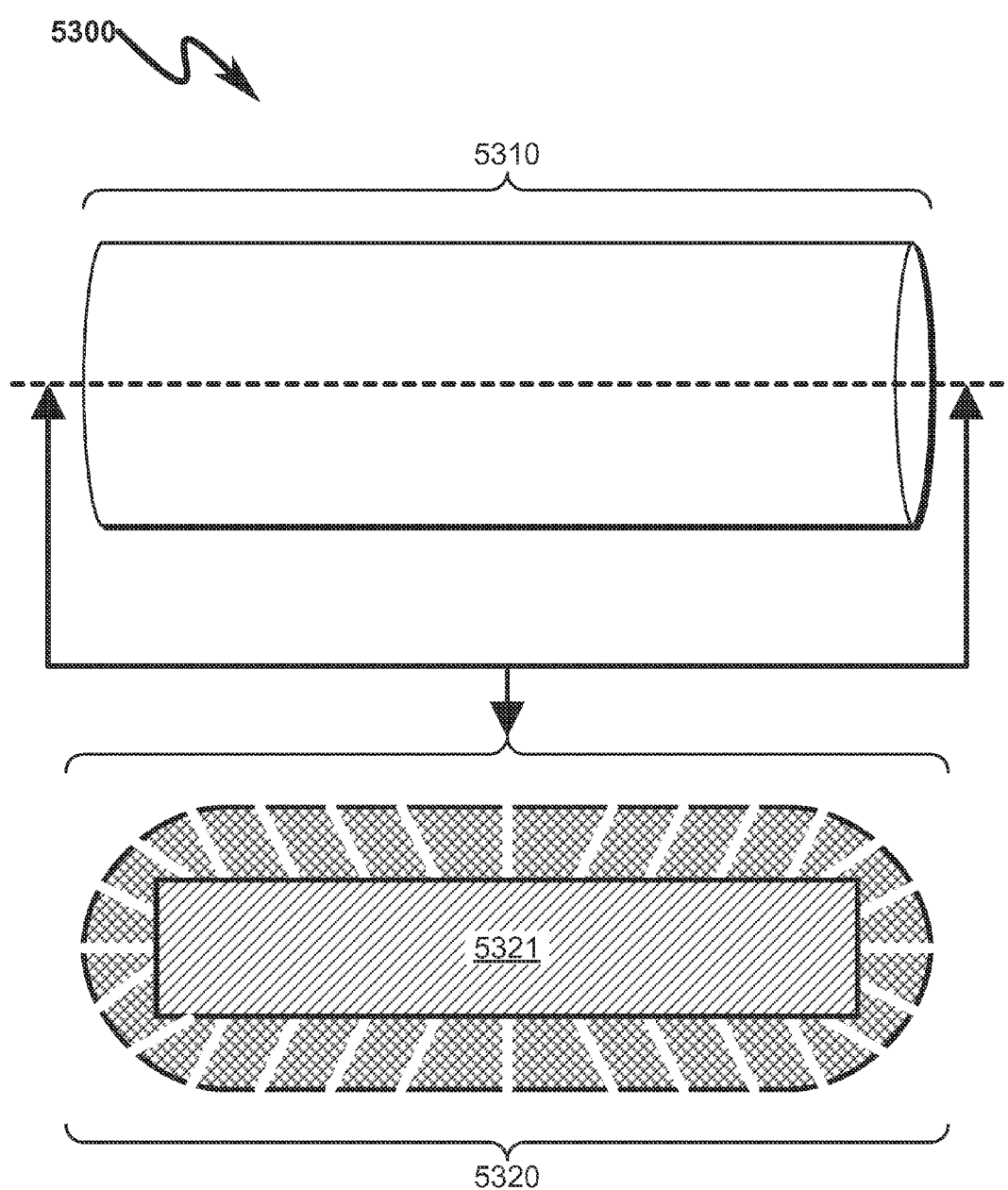
FIG. 53 illustrates perspective and sectional views of an exemplary system embodiment of the present invention incorporating "drilled" frusta.

FIG. 52 (5200), FIG. 53 (5300), and FIG. 54 (5400) illustrate that the "drilled" frusta concept can have a wide variety of configurations including sectional elements (5220, 5320, 5420) that include a variety of surface patterns built off of the basic cylindrical shape (5210, 5310, 5410). In each of these exemplary embodiments the techniques taught herein regarding the formation of frusta that direct radiation to the RSE elements (5221, 5321, 5421). Note specifically in FIG. 54 (5400) that the present invention anticipates that the "cylindrical" shape of the radiation detector housing may form an ellipse or other curved surface at each distal face of the cylinder. Thus, the term "cylinder" and "cylindrical surface" within the context of the present invention is to be given a broader meaning than is normally provided by the strict mathematical definition of the term "cylinder".

Drilled-Filled Frusta

The "drilled" frusta discussed above and detailed in FIG. 47 (4700)-FIG. 54 (5400) may be embodied in a variation termed "drilled-filled" frusta, in which the "drilled" frusta are later "filled" with a radiation-transparent material to seal the surface holes created by the drilling process, but still permit radiation to impinge the RSE through the "drilled" aperture. This "drilled-filled" frusta may be filled after drilling or in some circumstances may be injection molded using a radiation transparent material after the frusta hole configurations are evacuated during the initial injection molding of the multi-piece radiation detector housing.

Exemplary Radiation Detector Manufacturing System (5500)

Figure 55:
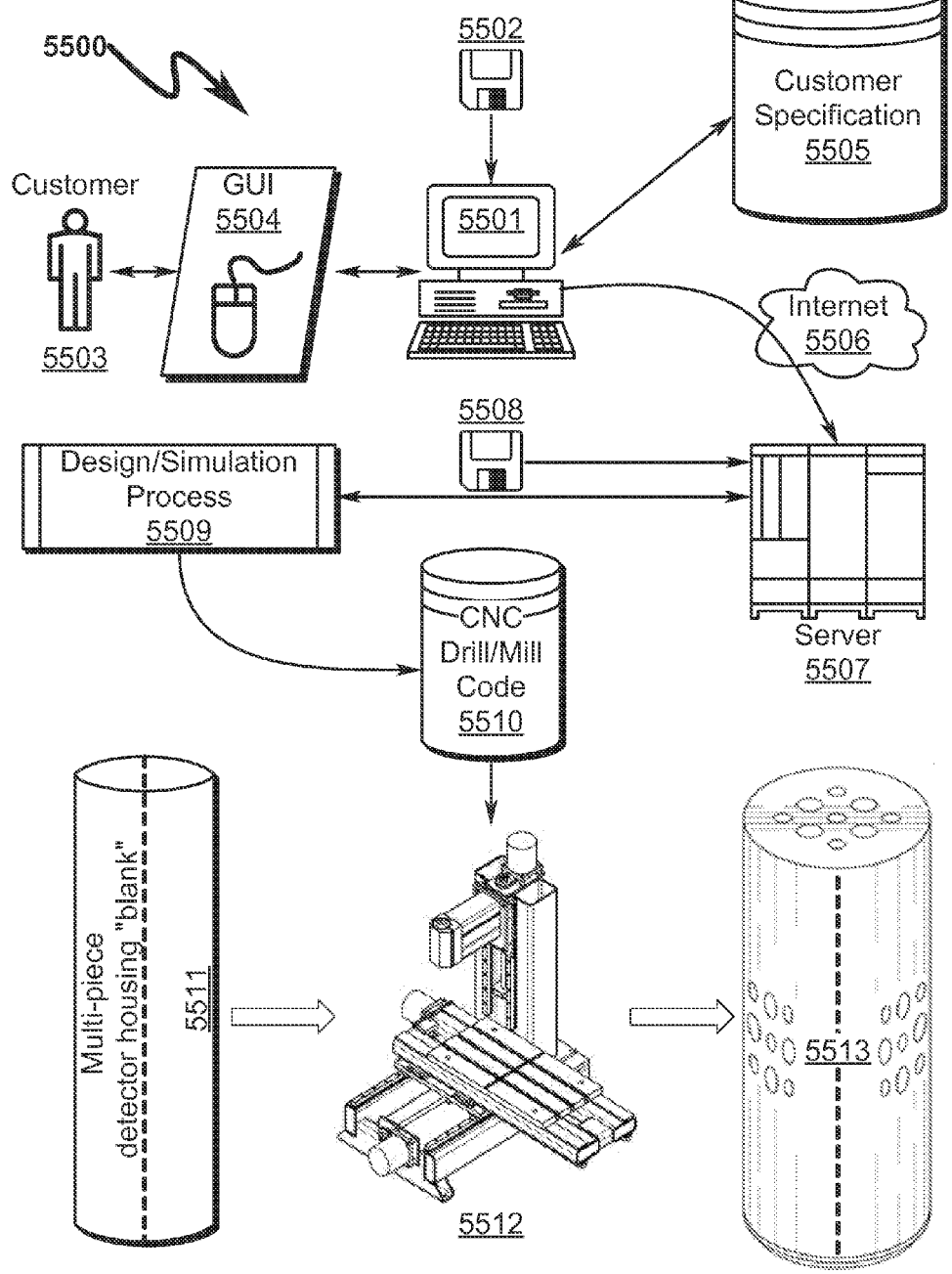
FIG. 55 illustrates a preferred exemplary system embodiment of the present invention as applied to radiation detector manufacturing.

As generally seen in the flowchart of FIG. 55 (5500), the present invention anticipates an automated manufacturing system associated with generating "drilled" frusta variations of the radiation detector housings incorporating integrated RSEs. As generally illustrated in FIG. 55 (5500), the system utilizes a computer system (5501) running under software read from a computer readable medium (5502) that interacts with a customer (5503) using a graphical user interface (5504). Within this context the customer (5503) generates a specification (5505) describing the characteristics of a desired radiation detector to be manufactured. This specification may include many pieces of information, including but not limited to the isotropy response of the radiation detector, among other things. This customer specification data (5505) is transmitted via communication network (5506) (Internet, etc.) to a computer server (5507) running under control of application software read from a computer readable medium (5508). This application software comprises a design/simulation process (5509) that takes the customer specification data (5505) and transforms it into a set of CNC drill/mill codes (5510) that are applied to a multi-piece radiation detector housing "blank" (5511) as operated on by a CNC drill/mill machine (5512). The result of this operation is a radiation detector housing (5513) that exhibits the isotropy characteristics specified by the customer (5503).

This system permits the multi-piece radiation detector housing "blanks" (5511) to be stocked in inventory and rapidly modified to meet the radiation response characteristics desired by the customer (5503) without the need for separate mold fabrication, testing, and integration into the overall radiation detector manufacturing flow.

Exemplary Radiation Detector Manufacturing Method (5600)

Figure 56:
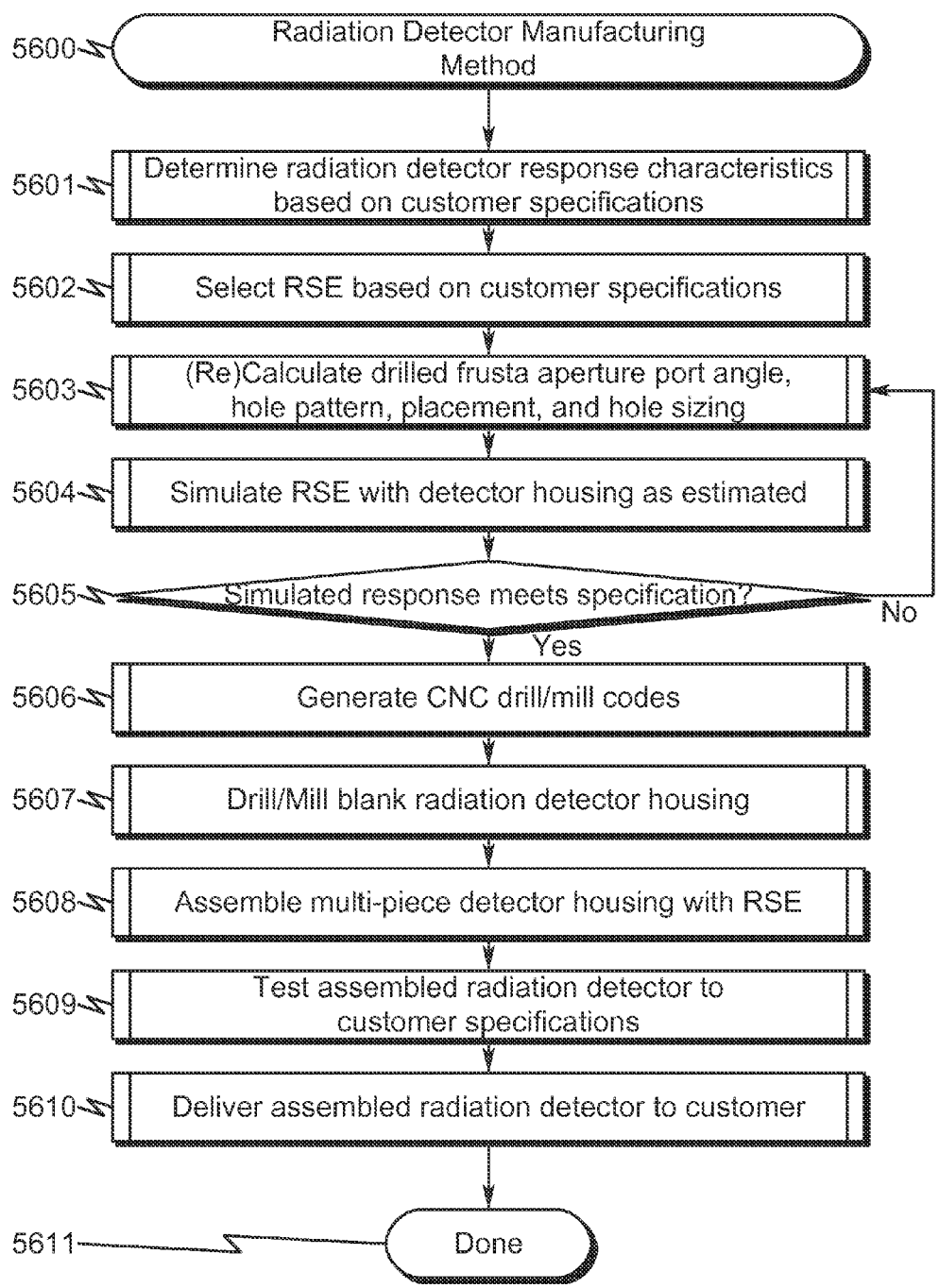
FIG. 56 illustrates a preferred exemplary method embodiment of the present invention as applied to radiation detector manufacturing.

As generally seen in the flowchart of FIG. 56 (5600), the present invention anticipates a manufacturing method that may be used with the system depicted in FIG. 55 (5500) and generally associated with generating "drilled" frusta variations of the radiation detector housings incorporating integrated RSEs that may be generally described in terms of the following steps:
 (1) Determining radiation detector response characteristics from a customer specification (5601);
 (2) Selecting a RSE based on the customer specifications (5602);
 (3) Calculating/recalculating drilled frusta parameters, including a drilled frusta aperture port angle, hole pattern, placement, and hole sizing for the blank radiation detector housing (5603);
 (4) Simulating the selected RSE with the drilled frusta parameters (5604);
 (5) Determining if the simulated response meets the customer specifications, and if not, proceeding to step (3) (5605);

(6) Generating CNC drill/mill codes corresponding to the frusta parameters as applied to the blank radiation detector housing (5607);
(7) Drilling/milling the blank radiation detector multi-piece housings using the CNC drill/mill codes (5607);
(8) Assembling the drilled/milled multi-piece radiation detector housings with the selected RSE (5608);
(9) Testing the assembled radiation detector housing/RSE combination to verify it meets customer specifications (5609);
(10) Delivering the assembled radiation detector housing/RSE combination to the customer (5610);
(11) Terminating the radiation detector manufacturing method (5611).

One skilled in the art will recognize that these method steps may be augmented or rearranged without limiting the teachings of the present invention.

This manufacturing method permits "custom" radiation detectors to be fabricated in a "just-in-time" context, allowing the radiation detector housings to be inventoried as "blanks" that are custom configured "on-the-fly" to customer specifications. This drastically reduces the time-to-market for small quantity or "rush" delivery of radiation detectors as the design/simulation/CNC process can be automated to produce a streamlined manufacturing operation that avoids the delays associated with plastic injection mold design, manufacturing, and qualification.

Exemplary Injection Molding Apparatus (5700, 5800)

Figure 57:
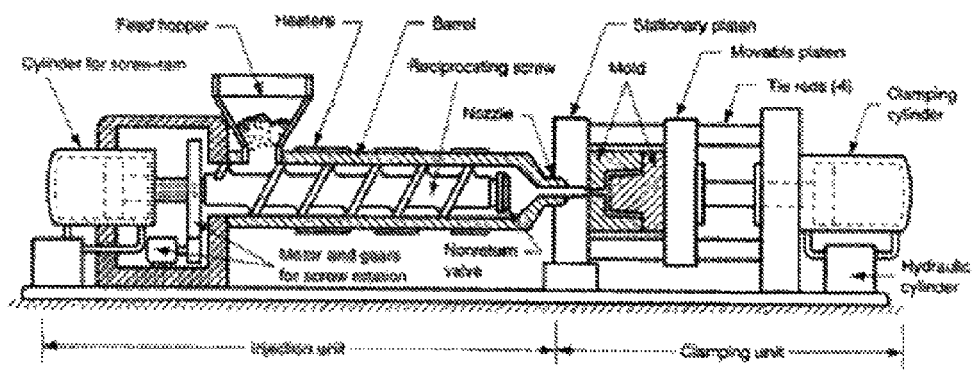
FIG. 57 illustrates a preferred exemplary screw injection molding apparatus useful in fabricating some embodiments of the present invention.
Figure 58:
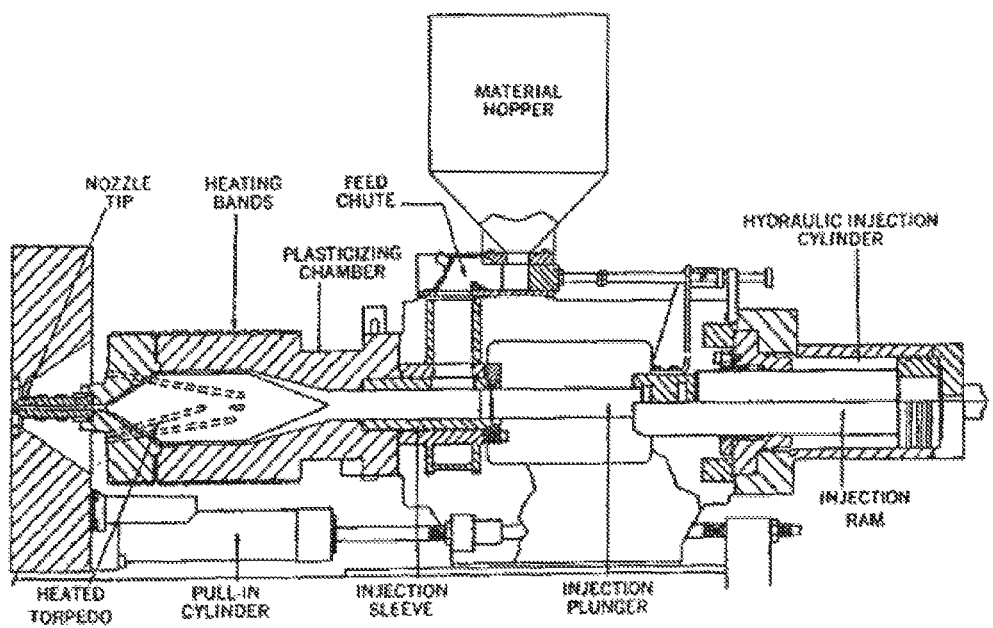
FIG. 58 illustrates a preferred exemplary hydraulic injection molding apparatus useful in fabricating some embodiments of the present invention.

While the injection molding process used to construct the present invention may vary widely, the screw injection molding apparatus generally illustrated in FIG. 57 (5700) and the hydraulic injection molding apparatus depicted in FIG. 58 (5800) are typical of mechanisms that may be used to form the radiation detector housing.

Portable Dosimeter System (5900)

As generally illustrated in FIG. 34 (3400)-FIG. 40 (4000), the present invention may be incorporated into a plastic or other housing structure to affect an isotropic radiation detector system. As generally illustrated in FIG. 34 (3400), this system generally incorporates a printed circuit board (PCB) (3406) containing interface electronics that communicates with an external computer system via a bulkhead connector (3407).

Figure 59:
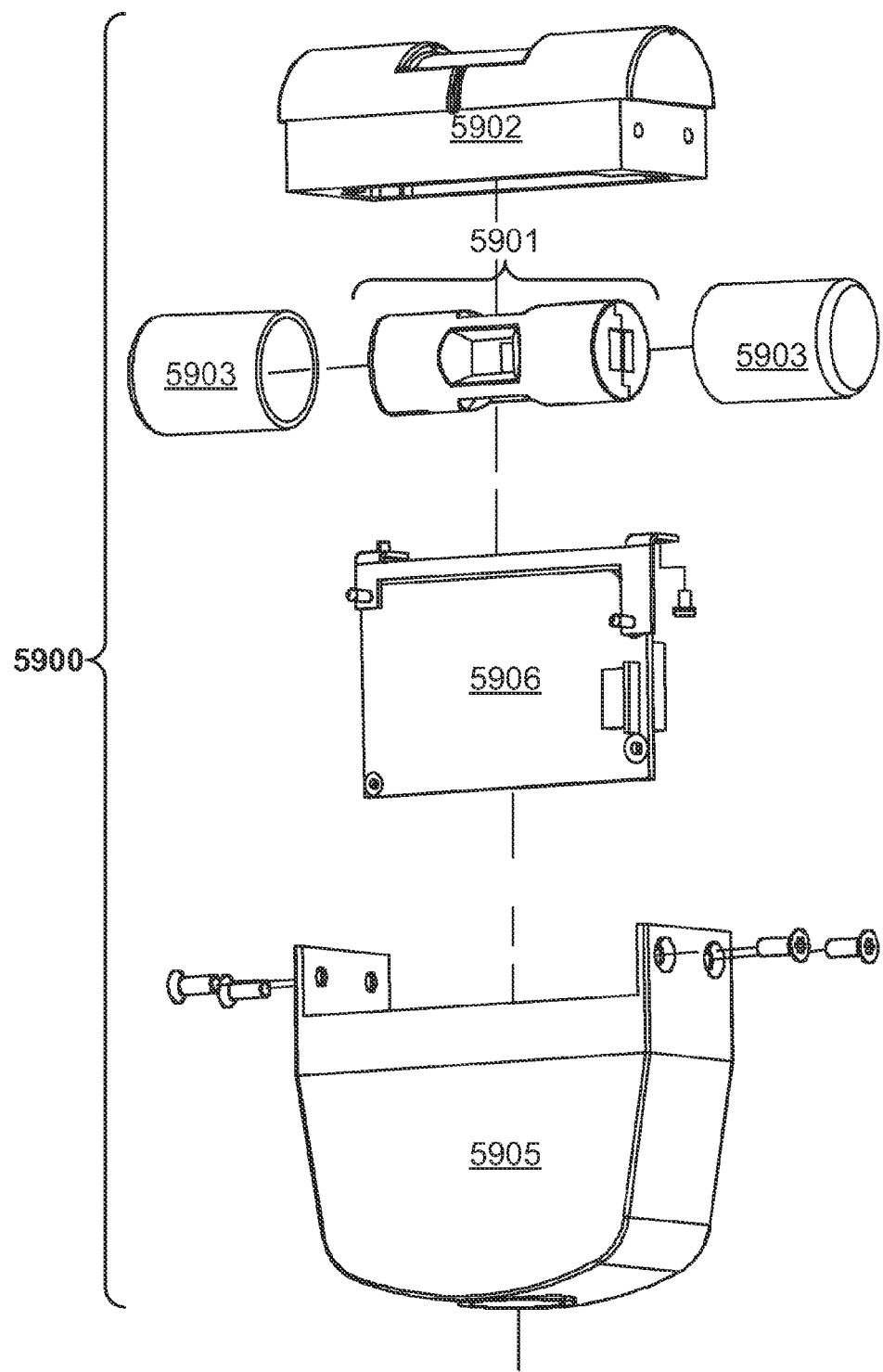
FIG. 59 illustrates a preferred exemplary system embodiment of the present invention as applied to a portable radiation dosimeter context.

However, a variant of this isotropic radiation detector as generally illustrated in FIG. 59 (5900) can incorporate a plastic shell (5902, 5905) without the bulkhead connector (3407) that integrates computational electronics on the PCB (5906) to affect a portable dosimeter system. Within this context, the radiation detector housing (5901) (which may include a TRDH (detailed in FIG. 5 (0500)-FIG. 6 (0600); FIG. 9 (0900)-FIG. 16 (1600)) as illustrated in this preferred embodiment or in some alternate preferred embodiments utilize a NRDH/ORDH normal/orthogonal housing (not shown, but generally illustrated in FIG. 7 (0700)-FIG. 8 (0800); FIG. 17 (1700)-FIG. 24 (2400))) in conjunction with the PCB electronics (5906) may fully integrate a portable dosimeter without the need for external computational support. Given that the radiation detector housing (5901) as illustrated may have dimensions of 2.0-inches×0.625-inch diameter in some embodiments, these relatively small dimensions permit the remainder of the PCB electronics (5906) and housing (5902, 5905) to be assembled in a relatively compact unit, resulting in a level of portability and uniform radiation detection not available in the prior art.

Portable Dosimeter Method Embodiment (6000)

Figure 60:
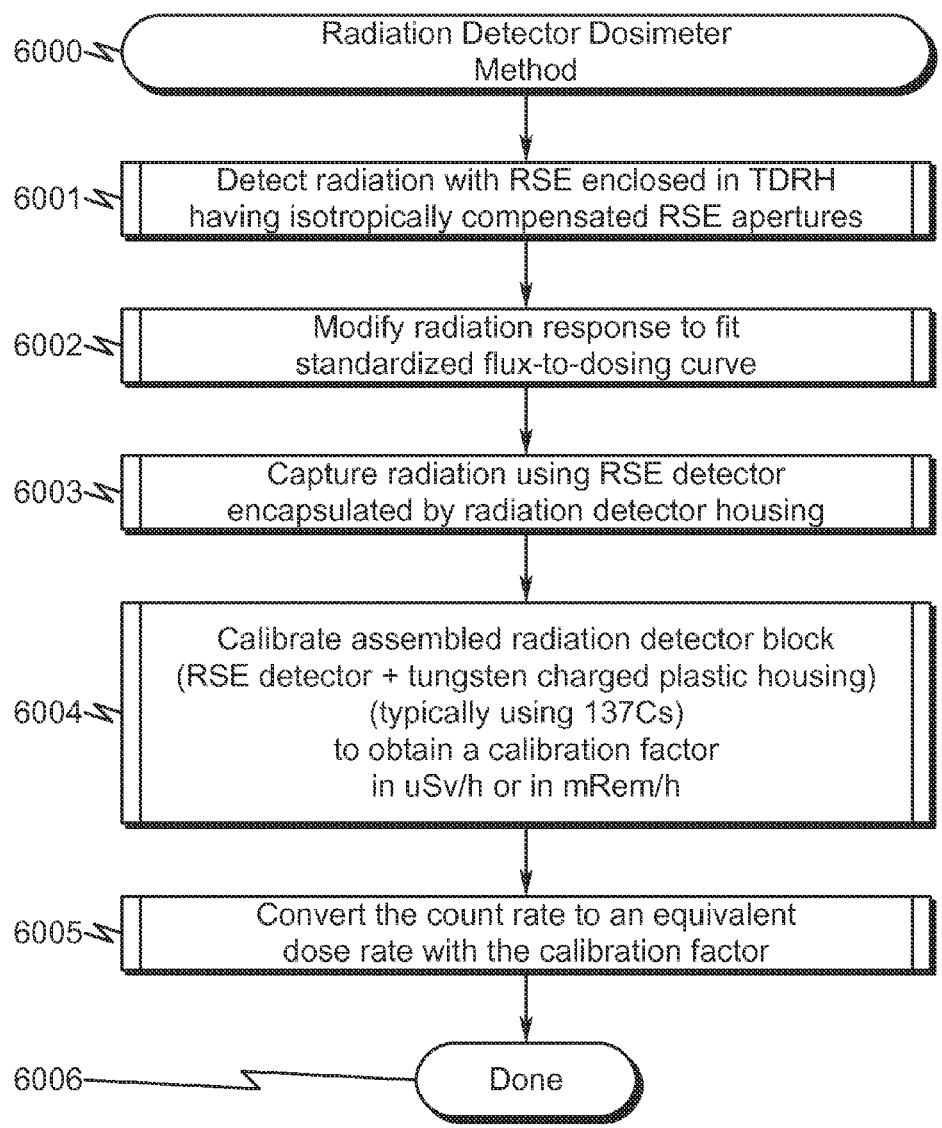
FIG. 60 illustrates a preferred exemplary method embodiment of the present invention as applied to a portable radiation dosimeter context incorporating a TRDH RSE housing.

The portable dosimeter system generally illustrated in FIG. 59 (5900) may have associated with it a corresponding method. As generally seen in the flowchart of FIG. 60 (6000), the present invention method associated with determining a radiation dose rate in this portable dosimeter context may be generally described in terms of the following steps:
(1) detecting radiation with one or more RSEs enclosed in a tubular radiation detector housing (TDRH) that incorporates isotropically compensated RSE apertures, with the TDRH incorporated into a portable dosimeter radiation system enclosure (6001);
(2) modifying the radiation response of a RSE to fit a standardized flux-to-dosing curve (6002);
(3) capturing radiation using the RSE detector encapsulated by a charged plastic molded radiation detector housing (6003);
(4) calibrating the assembled radiation detector block (RSE detector+charged plastic injection molded housing) (typically using 137Cs) to obtain a calibration factor (in uSv/h or in mRem/h) (6004);
(5) converting the count rate of the RSE to an equivalent dose rate with the calibration factor (6005); and
(6) terminating the radiation detection method (6006).

One skilled in the art will recognize that these method steps may be augmented or rearranged without limiting the teachings of the present invention.

Note that this method may incorporate displays, audible alarms, or other type of human and/or computer interfaces in conjunction with data logging and/or mathematical analysis of the collected radiation pulse count information. This general method summary may be augmented by the various elements described herein to produce a wide variety of invention embodiments consistent with this overall design description.

Alternate Portable Dosimeter Method Embodiment (6100)

The portable dosimeter system generally illustrated in FIG. 59 (5900) may have associated with it a corresponding alternate method. As generally seen in the flowchart of FIG. 61 (6100), the present invention method associated with determining a radiation dose rate in this portable dosimeter context may be generally described in terms of the following steps:
(1) detecting radiation with one or more RSEs enclosed in normal/orthogonal radiation detector housings (NDRH/ORDH) that incorporates isotropically compensated RSE apertures, with the NDRH/ORDH incorporated into a portable dosimeter radiation system enclosure (6101);
(2) modifying the radiation response of a RSE to fit a standardized flux-to-dosing curve (6102);
(3) capturing radiation using the RSE detector encapsulated by a charged plastic molded radiation detector housing (6103);
(4) calibrating the assembled radiation detector block (RSE detector+charged plastic injection molded housing) (typically using 137Cs) to obtain a calibration factor (in uSv/h or in mRem/h) (6104);
(5) converting the count rate of the RSE to an equivalent dose rate with the calibration factor (6105); and (6) Terminating the radiation detection method (6106).

One skilled in the art will recognize that these method steps may be augmented or rearranged without limiting the teachings of the present invention.

Note that this method may incorporate displays, audible alarms, or other type of human and/or computer interfaces in conjunction with data logging and/or mathematical analysis of the collected radiation pulse count information. This general method summary may be augmented by the various elements described herein to produce a wide variety of invention embodiments consistent with this overall design description.

Isotropy Enclosure Compensation

Within each application of the present invention there may exist additional software compensation of the RSE detector responses. With a perfectly energy flat detector, the analog/digital interface electronics to the RSE simply detects a count rate and translates this to a dose rate using the calibration factors detailed herein. Within the context of the present invention, because of limited space, it is necessary to measure amplitude of the signal in the RSE and in some circumstances utilize software energy compensation of the measured amplitude.

While not specifically detailed herein, it is anticipated that some preferred embodiments of the present invention may incorporate isotropy compensation associated with various attenuation characteristics of any system enclosure (as typically illustrated within FIG. 33 (3300)-FIG. 40 (4000)) that contains the radiation detector housing and associated enclosed RSE. As generally illustrated in FIG. 1 (0100), this enclosure compensation may take the form of application software (0103) operating under control of a computer system (0102) and/or additional databases (0106) containing enclosure calibration data.

Preferred Embodiment System Summary

The present invention preferred exemplary system embodiment anticipates a wide variety of variations in the basic theme of construction, but can be generalized as a radiation detector system comprising:
 (a) tubular radiation detector housing (TRDH); and
 (b) radiation sensitive elements (RSEs);
 wherein
 the TRDH comprises charged plastic;
 the TRDH comprises an outer cylindrical surface;
 the TRDH comprises end apertures located at the distal ends of the outer cylindrical surface;
 the TRDH comprises one or more circumferential apertures located at approximately the midpoint between the distal ends of the outer cylindrical surface;
 the RSEs are responsive to the presence of radiation; and
 the RSEs are inset into the end apertures and the circumferential apertures.

This general system summary may be augmented by the various elements described herein to produce a wide variety of invention embodiments consistent with this overall design description.

Alternate Preferred Embodiment System Summary

The present invention alternate preferred exemplary system embodiment anticipates a wide variety of variations in the basic theme of construction, but can be generalized as a radiation detector system comprising:
 (a) normal radiation detector housing (NRDH);
 (b) orthogonal radiation detector housing (ORDH); and
 (c) radiation sensitive elements (RSEs);
 wherein
 the NRDH and the ORDH further comprise charged plastic;
 the NRDH and the ORDH further comprise an outer cylindrical surface;
 the NRDH and the ORDH perpendicularly intersect at approximately the midpoint between the distal ends of the NRDH and the ORDH to form a cross-point plane intersection having a top plane reference and a bottom plane reference;
 the NRDH and the ORDH further comprise end apertures located at the distal ends of the NRDH and the ORDH outer cylindrical surfaces;
 the cross-point plane comprises circumferential apertures located beneath the top plane reference and the bottom plane reference;
 the RSEs are responsive to the presence of radiation; and
 the RSEs are inset into the end apertures and the circumferential apertures.

This general system summary may be augmented by the various elements described herein to produce a wide variety of invention embodiments consistent with this overall design description.

Preferred Embodiment Dosimeter System Summary

The present invention also specifically anticipates an embodiment comprising a compact portable radiation detection dosimeter system. The present invention alternate preferred exemplary dosimeter system embodiment anticipates a wide variety of variations in the basic theme of construction, but can be generalized as a radiation detector dosimeter system comprising:
 (a) system housing;
 (b) face shield;
 (c) PCB;
 (d) tubular radiation detector housing (TRDH); and
 (e) radiation sensitive elements (RSEs);
 wherein
 the TRDH comprises charged plastic;
 the TRDH comprises an outer cylindrical surface;
 the TRDH comprises end apertures located at the distal ends of the outer cylindrical surface;
 the TRDH comprises one or more circumferential apertures located at approximately the midpoint between the distal ends of the outer cylindrical surface;
 the RSEs are responsive to the presence of radiation;
 the RSEs are inset into the end apertures and the circumferential apertures;
 the PCB further comprises electronics that receives electrical signals from the RSEs and calculates an accumulated radiation dosing status from the electrical signals;
 the PCB electronics visually and/or audibly displays the accumulated radiation dosing status; and
 the PCB, the TRDH, and the RSEs are contained with a system enclosure comprising the system housing and the face shield.

This general system summary may be augmented by the various elements described herein to produce a wide variety of invention embodiments consistent with this overall design description.

Alternate Preferred Embodiment Dosimeter System Summary

The present invention also specifically anticipates an embodiment comprising a compact portable radiation detection dosimeter system. Another present invention alternate preferred exemplary dosimeter system embodiment anticipates a wide variety of variations in the basic theme of construction, but can be generalized as a radiation detector dosimeter system comprising:
- (a) system housing;
- (b) face shield;
- (c) PCB;
- (d) normal radiation detector housing (NRDH);
- (e) orthogonal radiation detector housing (ORDH); and
- (f) radiation sensitive elements (RSEs);

wherein the NRDH and the ORDH further comprise charged plastic;

the NRDH and the ORDH further comprise an outer cylindrical surface;

the NRDH and the ORDH perpendicularly intersect at approximately the midpoint between the distal ends of the NRDH and the ORDH to form a cross-point plane intersection having a top plane reference and a bottom plane reference;

the NRDH and the ORDH further comprise end apertures located at the distal ends of the NRDH and the ORDH outer cylindrical surfaces;

the cross-point plane comprises circumferential apertures located beneath the top plane reference and the bottom plane reference;

the RSEs are responsive to the presence of radiation;

the RSEs are inset into the end apertures and the circumferential apertures;

the PCB further comprises electronics that receives electrical signals from the RSEs and calculates an accumulated radiation dosing status from the electrical signals;

the PCB electronics visually and/or audibly displays the accumulated radiation dosing status; and the PCB, the TRDH, and the RSEs are contained with a system enclosure comprising the system housing and the face shield.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a radiation detector method, the method operating in conjunction with a radiation detector system comprising:
- (a) tubular radiation detector housing (TRDH); and
- (b) radiation sensitive elements (RSEs);

wherein the TRDH comprises charged plastic;

the TRDH comprises an outer cylindrical surface;

the TRDH comprises end apertures located at the distal ends of the outer cylindrical surface;

the TRDH comprises one or more circumferential apertures located at approximately the midpoint between the distal ends of the outer cylindrical surface;

the RSEs are responsive to the presence of radiation; and the RSEs are inset into the end apertures and the circumferential apertures;

wherein the method comprises the steps of:
(1) Modifying the radiation response of a RSE to fit a standardized flux-to-dosing curve (0401);
(2) Capturing radiation using the RSE detector encapsulated by a charged plastic molded plastic radiation detector housing (0402);
(3) Calibrating the assembled radiation detector block (RSE detector+charged plastic injection molded plastic housing) (typically using 137Cs) to obtain a calibration factor (in uSv/h or in mRem/h)
(4) Converting the count rate of the RSE to an equivalent dose rate with the calibration factor (0404); and
(5) Terminating the radiation detection method (0405).

One skilled in the art will recognize that these method steps may be augmented or rearranged without limiting the teachings of the present invention.

Note that this method may incorporate displays, audible alarms, or other type of human and/or computer interfaces in conjunction with data logging and/or mathematical analysis of the collected radiation pulse count information. This general method summary may be augmented by the various elements described herein to produce a wide variety of invention embodiments consistent with this overall design description.

Alternate Preferred Embodiment Method Summary

The present invention alternate preferred exemplary method embodiment anticipates a wide variety of variations in the basic theme of implementation, but can be generalized as a radiation detector method, the method operating in conjunction with a radiation detector system comprising:
- (a) normal radiation detector housing (NRDH);
- (b) orthogonal radiation detector housing (ORDH); and
- (c) radiation sensitive elements (RSEs);

wherein the NRDH and the ORDH further comprise charged plastic;

the NRDH and the ORDH further comprise an outer cylindrical surface;

the NRDH and the ORDH perpendicularly intersect at approximately the midpoint between the distal ends of the NRDH and the ORDH to form a cross-point plane intersection having a top plane reference and a bottom plane reference;

the NRDH and the ORDH further comprise end apertures located at the distal ends of the NRDH and the ORDH outer cylindrical surfaces;

the cross-point plane comprises circumferential apertures located beneath the top plane reference and the bottom plane reference;

the RSEs are responsive to the presence of radiation; and the RSEs are inset into the end apertures and the circumferential apertures;

wherein the method comprises the steps of:
(1) Modifying the radiation response of a RSE to fit a standardized flux-to-dosing curve (0401);
(2) Capturing radiation using the RSE detector encapsulated by a charged plastic molded radiation detector housing (0402);
(3) Calibrating the assembled radiation detector block (RSE detector+charged plastic injection molded housing) (typically using 137Cs) to obtain a calibration factor (in uSv/h or in mRem/h) (0403);
(4) Converting the count rate of the RSE to an equivalent dose rate with the calibration factor (0404); and
(5) Terminating the radiation detection method (0405).

Note that this method may incorporate displays, audible alarms, or other type of human and/or computer interfaces in conjunction with data logging and/or mathematical analysis of the collected radiation pulse count information. This general method summary may be augmented by the various elements described herein to produce a wide variety of invention embodiments consistent with this overall design description.

Preferred Embodiment Dosimeter Method Summary

The present invention also specifically anticipates an embodiment comprising a compact portable radiation detection dosimeter system implementing a radiation detection dosimeter method. The present invention alternate preferred exemplary dosimeter method embodiment anticipates a wide variety of variations in the basic theme of implementation, but can be generalized as a radiation detector dosimeter method, the method operating in conjunction with a radiation detector dosimeter system comprising:
  (a) system housing;
  (b) face shield;
  (c) PCB;
  (d) tubular radiation detector housing (TRDH); and
  (e) radiation sensitive elements (RSEs);
  wherein
  the TRDH comprises charged plastic;
  the TRDH comprises an outer cylindrical surface;
  the TRDH comprises end apertures located at the distal ends of the outer cylindrical surface;
  the TRDH comprises one or more circumferential apertures located at approximately the midpoint between the distal ends of the outer cylindrical surface;
  the RSEs are responsive to the presence of radiation;
  the RSEs are inset into the end apertures and the circumferential apertures;
  the PCB further comprises electronics that receives electrical signals from the RSEs and calculates an accumulated radiation dosing status from the electrical signals;
  the PCB electronics visually and/or audibly displays the accumulated radiation dosing status; and
  the PCB, the TRDH, and the RSEs are contained with a system enclosure comprising the system housing and the face shield;
  wherein the method comprises the steps of:
  (1) Modifying the radiation response of a RSE to fit a standardized flux-to-dosing curve (0401);
  (2) Capturing radiation using the RSE detector encapsulated by a charged plastic molded radiation detector housing (0402);
  (3) Calibrating the assembled radiation detector block (RSE detector+charged plastic injection molded housing) (typically using 137Cs) to obtain a calibration factor (in uSv/h or in mRem/h) (0403);
  (4) Converting the count rate of the RSE to an equivalent dose rate with the calibration factor (0404); and
  (5) Terminating the radiation detection method (0405).

Note that this method may incorporate displays, audible alarms, or other type of human and/or computer interfaces in conjunction with data logging and/or mathematical analysis of the collected radiation pulse count information. This general method summary may be augmented by the various elements described herein to produce a wide variety of invention embodiments consistent with this overall design description.

Alternate Preferred Embodiment Dosimeter Method Summary

The present invention also specifically anticipates an embodiment comprising a compact portable radiation detection dosimeter system implementing a radiation detection dosimeter method. Another present invention alternate preferred exemplary dosimeter method embodiment anticipates a wide variety of variations in the basic theme of implementation, but can be generalized as a radiation detector dosimeter method, the method operating in conjunction with a radiation detector dosimeter system comprising:
  (a) system housing;
  (b) face shield;
  (c) PCB;
  (d) normal radiation detector housing (NRDH);
  (e) orthogonal radiation detector housing (ORDH); and
  (f) radiation sensitive elements (RSEs);
  wherein
  the NRDH and the ORDH further comprise charged plastic;
  the NRDH and the ORDH further comprise an outer cylindrical surface;
  the NRDH and the ORDH perpendicularly intersect at approximately the midpoint between the distal ends of the NRDH and the ORDH to form a cross-point plane intersection having a top plane reference and a bottom plane reference;
  the NRDH and the ORDH further comprise end apertures located at the distal ends of the NRDH and the ORDH outer cylindrical surfaces;
  the cross-point plane comprises circumferential apertures located beneath the top plane reference and the bottom plane reference;
  the RSEs are responsive to the presence of radiation;
  the RSEs are inset into the end apertures and the circumferential apertures;
  the PCB further comprises electronics that receives electrical signals from the RSEs and calculates an accumulated radiation dosing status from the electrical signals;
  the PCB electronics visually and/or audibly displays the accumulated radiation dosing status; and
  the PCB, the TRDH, and the RSEs are contained with a system enclosure comprising the system housing and the face shield.
  wherein the method comprises the steps of:
  (1) modifying the radiation response of the RSEs to fit a standardized flux-to-dosing curve;
  (2) capturing radiation using the RSEs encapsulated within the NRDH and the ORDH;
  (3) calibrating an assembled radiation detector block comprising the RSEs and the TRDH to obtain a calibration factor; and
  (4) converting the count rate of the RSEs to an equivalent dose rate with the calibration factor.

Note that this method may incorporate displays, audible alarms, or other type of human and/or computer interfaces in conjunction with data logging and/or mathematical analysis of the collected radiation pulse count information. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

- An embodiment wherein the RSEs are selected from a group consisting of: organic scintillators; inorganic scintillators; gas detectors; and semiconductor detectors.
- An embodiment wherein the charged plastic further comprises an element selected from a group consisting of: elements within Row 6 or Row 7 of the Periodic Table.
- An embodiment wherein the charged plastic further comprises an element selected from a group consisting of: tungsten; uranium; and lead.
- An embodiment wherein the RSEs are inset into the end apertures and the circumferential apertures with an aperture port angle between approximately 15-degrees and 90-degrees.
- An embodiment wherein the RSEs are inset into the end apertures and the circumferential apertures with an aperture port angle of 45-degrees.
- An embodiment wherein the end apertures and the circumferential apertures comprise aperture ports selected from a group consisting of: evacuated frusta; filled frusta; drilled frusta; and drilled-filled frusta.
- An embodiment wherein the TRDH comprises a multi-piece assembly.
- An embodiment wherein the TRDH comprises a two-piece assembly.
- An embodiment wherein the TRDH comprises a two-piece symmetric assembly.
- An embodiment wherein the TRDH comprises a two-piece anti-symmetric assembly.
- An embodiment wherein the TRDH comprises two equally spaced circumferential apertures located at approximately the midpoint between the distal ends of the outer cylindrical surface.
- An embodiment wherein the TRDH comprises three equally spaced circumferential apertures located at approximately the midpoint between the distal ends of the outer cylindrical surface.
- An embodiment wherein the TRDH comprises four equally spaced circumferential apertures located at approximately the midpoint between the distal ends of the outer cylindrical surface.
- An embodiment wherein the NRDH and the ORDH comprise a multi-piece assembly.
- An embodiment wherein the NRDH and the ORDH comprise a two-piece assembly.
- An embodiment wherein the NRDH and the ORDH comprise a two-piece symmetric assembly.
- An embodiment wherein the NRDH and the ORDH comprise a two-piece anti-symmetric assembly.

One skilled in the art will recognize that other embodiments are possible based on combinations of elements taught within the above invention description.

System/Method Advantages

When incorporated within a handheld radiation detection and/or monitoring and/or dosimeter system/method, the present invention provides a number of advantages over the prior art:

- The compact nature of the encapsulated radiation detection housing makes use of handheld radiation monitors much more convenient than possible with the prior art, as this new configuration can be manipulated with a single hand.
- Because of the lack of orientation control in handheld radiation detectors, the ability to produce uniform annular radiation detection responses in light of varying probe orientations is a significant advantage of the present invention as compared to the prior art.
- The energy compensation characteristics of the present invention provide for greater sensitivity than possible with prior art radiation detectors.
- The utilization of injection molded plastic as the radiation detection housing provides for significant improvement in vibration resistance and significant improvement in shock protection for the encapsulated RSE as compared to the prior art.
- The use of CNC machining to affect just-in-time manufacturing with the present invention permits customized radiation detector housings to be fabricated at much lower cost than possible with the prior art.
- Adjustment of energy compensation with the present invention is superior to the prior art as the "nude" window of RSE exposure can be easily modified by manipulating the aperture port characteristics. This can be done "on-the-fly" by machining the plastic detector enclosure, a technique not easily accomplished with prior art radiation detector enclosures constructed of high density difficult-to-machine materials. For example aperture size and port angle can be reduced to provide additional compensation for high energy radiation events.

One skilled in the art will recognize that this list is not exhaustive and that some invention embodiments will exhibit some of these characteristics while others do not. Thus, this list is only exemplary of how some embodiments of the present invention may compare to those of the prior art.

CONCLUSION

A radiation detector system/method implementing a corrected energy response detector has been disclosed. The system incorporates charged (typically tungsten impregnated) injection molded plastic that may be formed into arbitrary detector configurations to affect radiation detection and dose rate functionality at a drastically reduced cost compared to the prior art, while simultaneously permitting the radiation detectors to compensate for radiation intensity and provide accurate radiation dose rate measurements. Various preferred system embodiments include configurations in which the energy response of the detector is nominally isotropic, allowing the detector to be utilized within a wide range of application orientations. The method incorporates utilization of a radiation detector so configured to compensate for radiation counts and generate accurate radiation dosing rate measurements.

What is claimed is:

1. A radiation detector dosimeter system comprising:
   (a) system housing;
   (b) face shield;
   (c) PCB;
   (d) tubular radiation detector housing (TRDH); and
   (e) radiation sensitive elements (RSEs);
   wherein
   said TRDH comprises charged plastic;
   said TRDH comprises an outer cylindrical surface;
   said TRDH comprises end apertures located at the distal ends of said outer cylindrical surface;
   said TRDH comprises one or more circumferential apertures located at approximately the midpoint between said distal ends of said outer cylindrical surface;
   said RSEs are responsive to the presence of radiation;

said RSEs are inset into said end apertures and said circumferential apertures;

said PCB further comprises electronics that receives electrical signals from said RSEs and calculates an accumulated radiation dosing status from said electrical signals;

said PCB electronics visually and/or audibly displays said accumulated radiation dosing status; and said PCB, said TRDH, and said RSEs are contained with a system enclosure comprising said system housing and said face shield.

2. The radiation detector dosimeter system of claim 1 wherein said RSEs are selected from a group consisting of: organic scintillators; inorganic scintillators; gas detectors; and semiconductor detectors.

3. The radiation detector dosimeter system of claim 1 wherein said charged plastic further comprises an element selected from a group consisting of: elements within Row 6 or Row 7 of the Periodic Table.

4. The radiation detector dosimeter system of claim 1 wherein said charged plastic further comprises an element selected from a group consisting of: tungsten; uranium; and lead.

5. The radiation detector dosimeter system of claim 1 wherein said RSEs are inset into said end apertures and said circumferential apertures with an aperture port angle between approximately 15-degrees and approximately 90-degrees.

6. The radiation detector dosimeter system of claim 1 wherein said RSEs are inset into said end apertures and said circumferential apertures with an aperture port angle of 45-degrees.

7. The radiation detector dosimeter system of claim 1 wherein said end apertures and said circumferential apertures comprise aperture ports selected from a group consisting of: evacuated frusta; filled frusta; drilled frusta; and drilled-filled frusta.

8. The radiation detector dosimeter system of claim 1 wherein said TRDH comprises a multi-piece assembly.

9. The radiation detector dosimeter system of claim 1 wherein said TRDH comprises a two-piece anti-symmetric assembly.

10. The radiation detector dosimeter system of claim 1 wherein said TRDH comprises two equally spaced circumferential apertures located at approximately the midpoint between said distal ends of said outer cylindrical surface.

11. The radiation detector dosimeter system of claim 1 wherein said TRDH comprises three equally spaced circumferential apertures located at approximately the midpoint between said distal ends of said outer cylindrical surface.

12. The radiation detector dosimeter system of claim 1 wherein said TRDH comprises four equally spaced circumferential apertures located at approximately the midpoint between said distal ends of said outer cylindrical surface.

13. A radiation detector dosimeter system comprising:
(a) system housing;
(b) face shield;
(c) PCB;
(d) normal radiation detector housing (NRDH);
(e) orthogonal radiation detector housing (ORDH); and
(f) radiation sensitive elements (RSEs);
wherein
said NRDH and said ORDH further comprise charged plastic;
said NRDH and said ORDH further comprise an outer cylindrical surface;
said NRDH and said ORDH perpendicularly intersect at approximately the midpoint between the distal ends of said NRDH and said ORDH to form a cross-point plane intersection having a top plane reference and a bottom plane reference;

said NRDH and said ORDH further comprise end apertures located at the distal ends of said NRDH and said ORDH outer cylindrical surfaces;

said cross-point plane comprises circumferential apertures located beneath said top plane reference and said bottom plane reference;

said RSEs are responsive to the presence of radiation;

said RSEs are inset into said end apertures and said circumferential apertures;

said PCB further comprises electronics that receives electrical signals from said RSEs and calculates an accumulated radiation dosing status from said electrical signals;

said PCB electronics visually and/or audibly displays said accumulated radiation dosing status; and said PCB, said TRDH, and said RSEs are contained with a system enclosure comprising said system housing and said face shield.

14. The radiation detector dosimeter system of claim 13 wherein said RSEs are selected from a group consisting of: organic scintillators; inorganic scintillators; gas detectors; and semiconductor detectors.

15. The radiation detector dosimeter system of claim 13 wherein said charged plastic further comprises an element selected from a group consisting of: elements within Row 6 or Row 7 of the Periodic Table.

16. The radiation detector dosimeter system of claim 13 wherein said charged plastic further comprises an element selected from a group consisting of: tungsten; uranium; and lead.

17. The radiation detector dosimeter system of claim 13 wherein said RSEs are inset into said end apertures and said circumferential apertures with an aperture port angle between approximately 15-degrees and approximately 90-degrees.

18. The radiation detector dosimeter system of claim 13 wherein said RSEs are inset into said end apertures and said circumferential apertures with an aperture port angle of 45-degrees.

19. The radiation detector dosimeter system of claim 13 wherein said end apertures and said circumferential apertures comprise aperture ports selected from a group consisting of: evacuated frusta; filled frusta; drilled frusta; and drilled-filled frusta.

20. The radiation detector dosimeter system of claim 13 wherein said NRDH and said ORDH comprise a multi-piece assembly.

21. A radiation detector dosimeter method, said method operating in conjunction with a radiation detector dosimeter system, said system comprising:
(a) system housing;
(b) face shield;
(c) PCB;
(d) tubular radiation detector housing (TRDH); and
(e) radiation sensitive elements (RSEs);
wherein
said TRDH comprises charged plastic;
said TRDH comprises an outer cylindrical surface;
said TRDH comprises end apertures located at the distal ends of said outer cylindrical surface;
said TRDH comprises one or more circumferential apertures located at approximately the midpoint between said distal ends of said outer cylindrical surface;
said RSEs are responsive to the presence of radiation;
said RSEs are inset into said end apertures and said circumferential apertures;

said PCB further comprises electronics that receives electrical signals from said RSEs and calculates an accumulated radiation dosing status from said electrical signals;

said PCB electronics visually and/or audibly displays said accumulated radiation dosing status; and said PCB, said TRDH, and said RSEs are contained with a system enclosure comprising said system housing and said face shield;

wherein said method comprises the steps of:

(1) modifying the radiation response of said RSEs to fit a standardized flux-to-dosing curve;

(2) capturing radiation using said RSEs encapsulated within said TRDH;

(3) calibrating an assembled radiation detector block comprising said RSEs and said TRDH to obtain a calibration factor; and (4) converting the count rate of said RSEs to an equivalent dose rate with said calibration factor.

22. The radiation detector dosimeter method of claim 21 wherein said RSEs are selected from a group consisting of: organic scintillators; inorganic scintillators; gas detectors; and semiconductor detectors.

23. The radiation detector dosimeter method of claim 21 wherein said charged plastic further comprises an element selected from a group consisting of: elements within Row 6 or Row 7 of the Periodic Table.

24. The radiation detector dosimeter method of claim 21 wherein said charged plastic further comprises an element selected from a group consisting of: tungsten; uranium; and lead.

25. The radiation detector dosimeter method of claim 21 wherein said RSEs are inset into said end apertures and said circumferential apertures with an aperture port angle between approximately 15-degrees and approximately 90-degrees.

26. The radiation detector dosimeter method of claim 21 wherein said RSEs are inset into said end apertures and said circumferential apertures with an aperture port angle of 45-degrees.

27. The radiation detector dosimeter method of claim 21 wherein said end apertures and said circumferential apertures comprise aperture ports selected from a group consisting of: evacuated frusta; filled frusta; drilled frusta; and drilled-filled frusta.

28. The radiation detector dosimeter method of claim 21 wherein said TRDH comprises a multi-piece assembly.

29. The radiation detector dosimeter method of claim 21 wherein said TRDH comprises a two-piece anti-symmetric assembly.

30. The radiation detector dosimeter method of claim 21 wherein said TRDH comprises two equally spaced circumferential apertures located at approximately the midpoint between said distal ends of said outer cylindrical surface.

31. The radiation detector dosimeter method of claim 21 wherein said TRDH comprises three equally spaced circumferential apertures located at approximately the midpoint between said distal ends of said outer cylindrical surface.

32. The radiation detector dosimeter method of claim 21 wherein said TRDH comprises four equally spaced circumferential apertures located at approximately the midpoint between said distal ends of said outer cylindrical surface.

33. A radiation detector dosimeter method, said method operating in conjunction with a radiation detector dosimeter system, said system comprising:

(a) system housing;
(b) face shield;
(c) PCB;
(d) normal radiation detector housing (NRDH);
(e) orthogonal radiation detector housing (ORDH); and
(f) radiation sensitive elements (RSEs);

wherein said NRDH and said ORDH further comprise charged plastic;

said NRDH and said ORDH further comprise an outer cylindrical surface;

said NRDH and said ORDH perpendicularly intersect at approximately the midpoint between the distal ends of said NRDH and said ORDH to form a cross-point plane intersection having a top plane reference and a bottom plane reference;

said NRDH and said ORDH further comprise end apertures located at the distal ends of said NRDH and said ORDH outer cylindrical surfaces;

said cross-point plane comprises circumferential apertures located beneath said top plane reference and said bottom plane reference;

said RSEs are responsive to the presence of radiation;

said RSEs are inset into said end apertures and said circumferential apertures;

said PCB further comprises electronics that receives electrical signals from said RSEs and calculates an accumulated radiation dosing status from said electrical signals;

said PCB electronics visually and/or audibly displays said accumulated radiation dosing status; and said PCB, said TRDH, and said RSEs are contained with a system enclosure comprising said system housing and said face shield, wherein said method comprises the steps of:

(1) modifying the radiation response of said RSEs to fit a standardized flux-to-dosing curve;

(2) capturing radiation using said RSEs encapsulated within said NRDH and said ORDH;

(3) calibrating an assembled radiation detector block comprising said RSEs and said TRDH to obtain a calibration factor; and (4) converting the count rate of said RSEs to an equivalent dose rate with said calibration factor.

34. The radiation detector dosimeter method of claim 33 wherein said RSEs are selected from a group consisting of: organic scintillators; inorganic scintillators; gas detectors; and semiconductor detectors.

35. The radiation detector dosimeter method of claim 33 wherein said charged plastic further comprises an element selected from a group consisting of: elements within Row 6 or Row 7 of the Periodic Table.

36. The radiation detector dosimeter method of claim 33 wherein said charged plastic further comprises an element selected from a group consisting of: tungsten; uranium; and lead.

37. The radiation detector dosimeter method of claim 33 wherein said RSEs are inset into said end apertures and said circumferential apertures with an aperture port angle between approximately 15-degrees and approximately 90-degrees.

38. The radiation detector dosimeter method of claim 33 wherein said RSEs are inset into said end apertures and said circumferential apertures with an aperture port angle of 45-degrees.

39. The radiation detector dosimeter method of claim 33 wherein said end apertures and said circumferential apertures comprise aperture ports selected from a group consisting of: evacuated frusta; filled frusta; drilled frusta; and drilled-filled frusta.

40. The radiation detector dosimeter method of claim 33 wherein said NRDH and said ORDH comprise a multi-piece assembly.

\* \* \* \* \*